（12）United States Patent
Tran et al.

(10) Patent No.: US 12,469,523 B2
(45) Date of Patent: Nov. 11, 2025

(54) CURRENT-TO-VOLTAGE CONVERTER COMPRISING COMMON MODE CIRCUIT

(71) Applicant: Silicon Storage Technology, Inc., San Jose, CA (US)

(72) Inventors: Hieu Van Tran, San Jose, CA (US); Hoa Vu, Milpitas, CA (US); Stephen Trinh, San Jose, CA (US); Stanley Hong, San Jose, CA (US); Thuan Vu, San Jose, CA (US); Nghia Le, Ho Chi Minh (VN); Duc Nguyen, Ho Chi Minh (VN); Hien Pham, Ho Chi Minh (VN)

(73) Assignee: Silicon Storage Technology, Inc., San Jose, CA (US)

( * ) Notice: Subject to any disclaimer, the term of this patent is extended or adjusted under 35 U.S.C. 154(b) by 220 days.

(21) Appl. No.: 18/137,370

(22) Filed: Apr. 20, 2023

(65) Prior Publication Data

US 2024/0265951 A1 Aug. 8, 2024

Related U.S. Application Data

(60) Provisional application No. 63/442,810, filed on Feb. 2, 2023.

(51) Int. Cl.
*G11C 11/00* (2006.01)
*G11C 5/14* (2006.01)
(Continued)

(52) U.S. Cl.
CPC .............. *G11C 5/147* (2013.01); *G11C 7/02* (2013.01); *G11C 13/004* (2013.01)

(58) Field of Classification Search
CPC .......... G11C 5/147; G11C 7/02; G11C 13/004; G11C 11/54; G11C 16/24
See application file for complete search history.

(56) References Cited

U.S. PATENT DOCUMENTS

| 5,029,130 | A | 7/1991 | Yeh |
| 6,747,310 | B2 | 6/2004 | Fan |

(Continued)

FOREIGN PATENT DOCUMENTS

TW 430812 B 4/2001

OTHER PUBLICATIONS

PCT Search Report & Written Opinion mailed on Jan. 5, 2024 corresponding to the related PCT Patent Application No. PCT/US2023/019846.

(Continued)

*Primary Examiner* — Hien N Nguyen
(74) *Attorney, Agent, or Firm* — Vedder Price P.C.

(57) ABSTRACT

In one example, a system comprises a current-to-voltage converter to generate differential voltages from differential currents comprising a first current and a second current, the current-to-voltage converter comprising: a first bitline to provide the first current; a second bitline to provide the second current; a first regulator to apply a first voltage to the first bitline; a second regulator to apply a second voltage to the second bitline; a regulating circuit comprising a first input terminal, a second input terminal, a first output terminal, and a second output terminal, the first output terminal and the second output terminal providing the differential voltages; and a common mode circuit.

17 Claims, 45 Drawing Sheets

(51) Int. Cl.
*G11C 7/02* (2006.01)
*G11C 13/00* (2006.01)

(56) References Cited

U.S. PATENT DOCUMENTS

| | | | |
|---|---|---|---|
| 10,748,630 | B2 | 8/2020 | Tran et al. |
| 2010/0315274 | A1 | 12/2010 | Werking |
| 2011/0286271 | A1* | 11/2011 | Chen .................. G11C 11/5642 365/185.09 |
| 2014/0347912 | A1 | 11/2014 | Siau |
| 2017/0337466 | A1* | 11/2017 | Bayat ...................... G06N 3/04 |
| 2018/0123535 | A1 | 5/2018 | Handa |
| 2018/0286870 | A1 | 10/2018 | Kim |
| 2020/0065650 | A1* | 2/2020 | Tran ........................ G11C 11/54 |
| 2022/0374161 | A1* | 11/2022 | Tran ...................... G06N 3/044 |
| 2024/0282351 | A1* | 8/2024 | Tran ......................... G11C 7/16 |

OTHER PUBLICATIONS

U.S. Appl. No. 17/875,281, filed Jul. 27, 2022 entitled "Precise Data Tuning Method and Apparatus for Analog Neural Memory in an Artificial Neural Network," Tran, et al.

U.S. Appl. No. 18/080,545, filed Dec. 13, 2022 entitled "Verification Method and System in Artificial Neural Network Array," Tran, et al.

PCT Invitation to Pay Additional Fees mailed on Nov. 6, 2023 corresponding to the related PCT Patent Application No. PCT/US2023/019846.

Taiwanese Office Action mailed on Nov. 13, 2024 corresponding to the related Taiwanese Patent Application No. 113101663. (Attached are the Google English Translations and the Taiwanese Office Action.).

\* cited by examiner

1500

2100

VMM System 2410 w+ array 2411

2413 w- array 2412

CURRENT-TO-VOLTAGE CONVERTER COMPRISING COMMON MODE CIRCUIT

PRIORITY CLAIM

This application claims priority from U.S. Provisional Patent Application No. 63/442,810, filed on Feb. 2, 2023, and titled, "Common Mode Circuit Decoupled From Bitlines in Neural Network Array," which is incorporated by reference herein.

FIELD OF THE INVENTION

Numerous examples are disclosed of a current-to-voltage converter comprising a common mode circuit. The current-to-voltage converter can be used in the output block of a neural network array, where the common mode circuit is decoupled from the bitlines of the neural network array.

BACKGROUND OF THE INVENTION

Artificial neural networks mimic biological neural networks (the central nervous systems of animals, in particular the brain) and are used to estimate or approximate functions that can depend on a large number of inputs and are generally unknown. Artificial neural networks generally include layers of interconnected "neurons" which exchange messages between each other.

FIG. 1 illustrates an artificial neural network, where the circles represent the inputs or layers of neurons. The connections (called synapses) are represented by arrows and have numeric weights that can be tuned based on experience. This makes neural networks adaptive to inputs and capable of learning. Typically, neural networks include a layer of multiple inputs. There are typically one or more intermediate layers of neurons, and an output layer of neurons that provide the output of the neural network. The neurons at each level individually or collectively make a decision based on the received data from the synapses.

One of the major challenges in the development of artificial neural networks for high-performance information processing is a lack of adequate hardware technology. Indeed, practical neural networks rely on a very large number of synapses, enabling high connectivity between neurons, i.e., a very high computational parallelism. In principle, such complexity can be achieved with digital supercomputers or specialized graphics processing unit clusters. However, in addition to high cost, these approaches also suffer from mediocre energy efficiency as compared to biological networks, which consume much less energy primarily because they perform low-precision analog computation. CMOS analog circuits have been used for artificial neural networks, but most CMOS-implemented synapses have been too bulky given the high number of neurons and synapses.

Applicant previously disclosed an artificial (analog) neural network that utilizes one or more non-volatile memory arrays as the synapses in U.S. Patent Application Publication 2017/0337466A1, which is incorporated by reference. The non-volatile memory arrays operate as an analog neural memory and comprise non-volatile memory cells arranged in rows and columns. The neural network includes a first plurality of synapses configured to receive a first plurality of inputs and to generate therefrom a first plurality of outputs, and a first plurality of neurons configured to receive the first plurality of outputs. The first plurality of synapses includes a plurality of memory cells, wherein each of the memory cells includes spaced apart source and drain regions formed in a semiconductor substrate with a channel region extending there between, a floating gate disposed over and insulated from a first portion of the channel region and a non-floating gate disposed over and insulated from a second portion of the channel region. Each of the plurality of memory cells store a weight value corresponding to a number of electrons on the floating gate. The plurality of memory cells multiply the first plurality of inputs by the stored weight values to generate the first plurality of outputs.

Non-Volatile Memory Cells

Non-volatile memories are well known. For example, U.S. Pat. No. 5,029,130 ("the '130 patent"), which is incorporated herein by reference, discloses an array of split gate non-volatile memory cells, which are a type of flash memory cells. Such a memory cell 210 is shown in FIG. 2. Each memory cell 210 includes source region 14 and drain region 16 formed in semiconductor substrate 12, with channel region 18 there between. Floating gate 20 is formed over and insulated from (and controls the conductivity of) a first portion of the channel region 18, and over a portion of the source region 14. Word line terminal 22 (which is typically coupled to a word line) has a first portion that is disposed over and insulated from (and controls the conductivity of) a second portion of the channel region 18, and a second portion that extends up and over the floating gate 20. The floating gate 20 and word line terminal 22 are insulated from the substrate 12 by a gate oxide. Bitline 24 is coupled to drain region 16.

Memory cell 210 is erased (where electrons are removed from the floating gate) by placing a high positive voltage on the word line terminal 22, which causes electrons on the floating gate 20 to tunnel through the intermediate insulation from the floating gate 20 to the word line terminal 22 via Fowler-Nordheim (FN) tunneling.

Memory cell 210 is programmed by source side injection (SSI) with hot electrons (where electrons are placed on the floating gate) by placing a positive voltage on the word line terminal 22, and a positive voltage on the source region 14. Electron current will flow from the drain region 16 towards the source region 14. The electrons will accelerate and become heated when they reach the gap between the word line terminal 22 and the floating gate 20. Some of the heated electrons will be injected through the gate oxide onto the floating gate 20 due to the attractive electrostatic force from the floating gate 20.

Memory cell 210 is read by placing positive read voltages on the drain region 16 and word line terminal 22 (which turns on the portion of the channel region 18 under the word line terminal). If the floating gate 20 is positively charged (i.e., erased of electrons), then the portion of the channel region 18 under the floating gate 20 is turned on as well, and current will flow across the channel region 18, which is sensed as the erased or "1" state. If the floating gate 20 is negatively charged (i.e., programmed with electrons), then the portion of the channel region under the floating gate 20 is mostly or entirely turned off, and current will not flow (or there will be little flow) across the channel region 18, which is sensed as the programmed or "0" state.

Table No. 1 depicts typical voltage and current ranges that can be applied to the terminals of memory cell 210 for performing read, erase, and program operations:

TABLE 1

Operation of Flash Memory Cell 210 of FIG. 2

|  | WL | BL | SL |
|---|---|---|---|
| Read | 2-3 V | 0.6-2 V | 0 V |
| Erase | ~11-13 V | 0 V | 0 V |
| Program | 1-2 V | 10.5-3 µA | 9-10 V |

Other split gate memory cell configurations, which are other types of flash memory cells, are known. For example, FIG. 3 depicts a four-gate memory cell 310 comprising source region 14, drain region 16, floating gate 20 over a first portion of channel region 18, a select gate 22 (typically coupled to a word line, WL) over a second portion of the channel region 18, a control gate 28 over the floating gate 20, and an erase gate 30 over the source region 14. This configuration is described in U.S. Pat. No. 6,747,310, which is incorporated herein by reference for all purposes. Here, all gates are non-floating gates except floating gate 20, meaning that they are electrically connected or connectable to a voltage source. Programming is performed by heated electrons from the channel region 18 injecting themselves onto the floating gate 20. Erasing is performed by electrons tunneling from the floating gate 20 to the erase gate 30.

Table No. 2 depicts typical voltage and current ranges that can be applied to the terminals of memory cell 310 for performing read, erase, and program operations:

TABLE 2

Operation of Flash Memory Cell 310 of FIG. 3

|  | WL/SG | BL | CG | EG | SL |
|---|---|---|---|---|---|
| Read | 1.0-2 V | 0.6-2 V | 0-2.6 V | 0-2.6 V | 0 V |
| Erase | −0.5 V/0 V | 0 V | 0 V/−8 V | 8-12 V | 0 V |
| Program | 1 V | 0.1-1 µA | 8-11 V | 4.5-9 V | 4.5-5 V |

FIG. 4 depicts a three-gate memory cell 410, which is another type of flash memory cell. Memory cell 410 is identical to the memory cell 310 of FIG. 3 except that memory cell 410 does not have a separate control gate. The erase operation (whereby erasing occurs through use of the erase gate) and read operation are similar to that of the FIG. 3 except there is no control gate bias applied. The programming operation also is done without the control gate bias, and as a result, a higher voltage is applied on the source line during a program operation to compensate for a lack of control gate bias.

Table No. 3 depicts typical voltage and current ranges that can be applied to the terminals of memory cell 410 for performing read, erase, and program operations:

TABLE 3

Operation of Flash Memory Cell 410 of FIG. 4

|  | WL/SG | BL | EG | SL |
|---|---|---|---|---|
| Read | 0.7-2.2 V | 0.6-2 V | 0-2.6 V | 0 V |
| Erase | −0.5 V/0 V | 0 V | 11.5 V | 0 V |
| Program | 1 V | 0.2-3 µA | 4.5 V | 7-9 V |

FIG. 5 depicts stacked gate memory cell 510, which is another type of flash memory cell. Memory cell 510 is similar to memory cell 210 of FIG. 2, except that floating gate 20 extends over the entire channel region 18, and control gate 22 (which here will be coupled to a word line) extends over floating gate 20, separated by an insulating layer (not shown). The erase is done by FN tunneling of electrons from FG to substrate, programming is by channel hot electron (CHE) injection at region between the channel 18 and the drain region 16, by the electrons flowing from the source region 14 towards to drain region 16 and read operation which is similar to that for memory cell 210 with a higher control gate voltage.

Table No. 4 depicts typical voltage ranges that can be applied to the terminals of memory cell 510 and substrate 12 for performing read, erase, and program operations:

TABLE 4

Operation of Flash Memory Cell 510 of FIG. 5

|  | CG | BL | SL | Substrate |
|---|---|---|---|---|
| Read | 2-5 V | 0.6-2 V | 0 V | 0 V |
| Erase | −8 to −10 V/0 V | FLT | FLT | 8-10 V/15-20 V |
| Program | 8-12 V | 3-5 V | 0 V | 0 V |

The methods and means described herein may apply to other non-volatile memory technologies such as FINFET split gate flash or stack gate flash memory, NAND flash, SONOS (silicon-oxide-nitride-oxide-silicon, charge trap in nitride), MONOS (metal-oxide-nitride-oxide-silicon, metal charge trap in nitride), ReRAM (resistive ram), PCM (phase change memory), MRAM (magnetic ram), FeRAM (ferroelectric ram), CT (charge trap) memory, CN (carbon-tube) memory, OTP (bi-level or multi-level one time programmable), and CeRAM (correlated electron ram), without limitation.

In order to utilize the memory arrays comprising one of the types of non-volatile memory cells described above in an artificial neural network, two modifications are made. First, the lines are configured so that each memory cell can be individually programmed, erased, and read without adversely affecting the memory state of other memory cells in the array, as further explained below. Second, continuous (analog) programming of the memory cells is provided.

Specifically, the memory state (i.e., charge on the floating gate) of each memory cell in the array can be continuously changed from a fully erased state to a fully programmed state, and vice-versa, independently and with minimal disturbance of other memory cells. This means the cell storage is effectively analog or at the very least can store one of many discrete values (such as 16 or 64 different values), which allows for very precise and individual tuning of all the memory cells in the memory array, and which makes the memory array ideal for storing and making fine tuning adjustments to the synapsis weights of the neural network.
Neural Networks Employing Non-Volatile Memory Cell Arrays FIG. 6 conceptually illustrates a non-limiting example of a neural network utilizing a non-volatile memory array of the present examples. This example uses the non-volatile memory array neural network for a facial recognition application, but any other appropriate application could be implemented using a non-volatile memory array based neural network.

S0 is the input layer, which for this example is a 32×32 pixel RGB image with 5 bit precision (i.e. three 32×32 pixel arrays, one for each color R, G and B, each pixel being 5 bit precision). The synapses CB1 going from input layer S0 to layer C1 apply different sets of weights in some instances and shared weights in other instances and scan the input image with 3×3 pixel overlapping filters (kernel), shifting the filter by 1 pixel (or more than 1 pixel as dictated by the model). Specifically, values for 9 pixels in a 3×3 portion of the image (i.e., referred to as a filter or kernel) are provided to the synapses CB1, where these 9 input values are multiplied by the appropriate weights and, after summing the outputs of that multiplication, a single output value is determined and provided by a first synapse of CB1 for generating a pixel of one of the feature maps of layer C1. The 3×3 filter is then shifted one pixel to the right within input layer S0 (i.e., adding the column of three pixels on the right, and dropping the column of three pixels on the left), whereby the 9 pixel values in this newly positioned filter are provided to the synapses CB1, where they are multiplied by the same weights and a second single output value is determined by the associated synapse. This process is continued until the 3×3 filter scans across the entire 32×32 pixel image of input layer S0, for all three colors and for all bits (precision values). The process is then repeated using different sets of weights to generate a different feature map of layer C1, until all the features maps of layer C1 have been calculated.

In layer C1, in the present example, there are 16 feature maps, with 30×30 pixels each. Each pixel is a new feature pixel extracted from multiplying the inputs and kernel, and therefore each feature map is a two dimensional array, and thus in this example layer C1 constitutes 16 layers of two dimensional arrays (keeping in mind that the layers and arrays referenced herein are logical relationships, not necessarily physical relationships—i.e., the arrays are not necessarily oriented in physical two dimensional arrays). Each of the 16 feature maps in layer C1 is generated by one of sixteen different sets of synapse weights applied to the filter scans. The C1 feature maps could all be directed to different aspects of the same image feature, such as boundary identification. For example, the first map (generated using a first weight set, shared for all scans used to generate this first map) could identify circular edges, the second map (generated using a second weight set different from the first weight set) could identify rectangular edges, or the aspect ratio of certain features, and so on.

An activation function P1 (pooling) is applied before going from layer C1 to layer S1, which pools values from consecutive, non-overlapping 2×2 regions in each feature map. The purpose of the pooling function P1 is to average out the nearby location (or a max function can also be used), to reduce the dependence of the edge location for example and to reduce the data size before going to the next stage. At layer S1, there are 16 15×15 feature maps (i.e., sixteen different arrays of 15×15 pixels each). The synapses CB2 going from layer S1 to layer C2 scan maps in layer S1 with 4×4 filters, with a filter shift of 1 pixel. At layer C2, there are 22 12×12 feature maps. An activation function P2 (pooling) is applied before going from layer C2 to layer S2, which pools values from consecutive non-overlapping 2×2 regions in each feature map. At layer S2, there are 22 6×6 feature maps. An activation function (pooling) is applied at the synapses CB3 going from layer S2 to layer C3, where every neuron in layer C3 connects to every map in layer S2 via a respective synapse of CB3. At layer C3, there are 64 neurons. The synapses CB4 going from layer C3 to the output layer S3 fully connects C3 to S3, i.e. every neuron in layer C3 is connected to every neuron in layer S3. The output at S3 includes 10 neurons, where the highest output neuron determines the class. This output could, for example, be indicative of an identification or classification of the contents of the original image.

Each layer of synapses is implemented using an array, or a portion of an array, of non-volatile memory cells.

FIG. 7 is a block diagram of an array that can be used for that purpose. Vector-by-matrix multiplication (VMM) array 32 includes non-volatile memory cells and is utilized as the synapses (such as CB1, CB2, CB3, and CB4 in FIG. 6) between one layer and the next layer. Specifically, VMM array 32 includes an array of non-volatile memory cells 33, erase gate and word line gate decoder 34, control gate decoder 35, bitline decoder 36 and source line decoder 37, which decode the respective inputs for the non-volatile memory cell array 33. Input to VMM array 32 can be from the erase gate and wordline gate decoder 34 or from the control gate decoder 35. Source line decoder 37 in this example also decodes the output of the non-volatile memory cell array 33. Alternatively, bitline decoder 36 can decode the output of the non-volatile memory cell array 33.

Non-volatile memory cell array 33 serves two purposes. First, it stores the weights that will be used by the VMM array 32. Second, the non-volatile memory cell array 33 effectively multiplies the inputs by the weights stored in the non-volatile memory cell array 33 and adds them up per output line (source line or bitline) to produce the output, which will be the input to the next layer or input to the final layer. By performing the multiplication and addition function, the non-volatile memory cell array 33 negates the need for separate multiplication and addition logic circuits and is also power efficient due to its in-situ memory computation.

The output of non-volatile memory cell array 33 is supplied to a differential summer (such as a summing op-amp or a summing current mirror) 38, which sums up the outputs of the non-volatile memory cell array 33 to create a single value for that convolution. The differential summer 38 is arranged to perform summation of positive weight and negative weight.

The summed-up output values of differential summer 38 are then supplied to an activation function block 39, which rectifies the output. The activation function block 39 may provide sigmoid, tan h, or ReLU functions. The rectified output values of activation function block 39 become an element of a feature map as the next layer (e.g. C1 in FIG. 6), and are then applied to the next synapse to produce the next feature map layer or final layer. Therefore, in this example, non-volatile memory cell array 33 constitutes a plurality of synapses (which receive their inputs from the prior layer of neurons or from an input layer such as an image database), and summing op-amp 38 and activation function block 39 constitute a plurality of neurons.

The input to VMM array 32 in FIG. 7 (WLx, EGx, CGx, and optionally BLx and SLx) can be analog level, binary level, or digital bits (in which case a DAC is provided to convert digital bits to appropriate input analog level) and the output can be analog level, binary level, or digital bits (in which case an output ADC is provided to convert output analog level into digital bits).

FIG. 8 is a block diagram depicting the usage of numerous layers of VMM arrays 32, here labeled as VMM arrays 32a, 32b, 32c, 32d, and 32e. As shown in FIG. 8, the input, denoted Inputx, is converted from digital to analog by a digital-to-analog converter 31 and provided to input VMM array 32a. The converted analog inputs could be voltage or current. The input D/A conversion for the first layer could be done by using a function or a LUT (look up table) that maps the inputs Inputx to appropriate analog levels for the matrix multiplier of input VMM array 32a. The input conversion could also be done by an analog to analog (A/A) converter to convert an external analog input to a mapped analog input to the input VMM array 32a.

The output generated by input VMM array 32a is provided as an input to the next VMM array (hidden level 1) 32b, which in turn generates an output that is provided as an input to the next VMM array (hidden level 2) 32c, and so on. The various layers of VMM array 32 function as different layers of synapses and neurons of a convolutional neural network (CNN). Each VMM array 32a, 32b, 32c, 32d, and 32e can be a stand-alone, physical non-volatile memory array, or multiple VMM arrays could utilize different portions of the same physical non-volatile memory array, or multiple VMM arrays could utilize overlapping portions of the same physical non-volatile memory array. The example shown in FIG. 8 contains five layers (32a,32b,32c,32d,32e): one input layer (32a), two hidden layers (32b,32c), and two fully connected layers (32d,32e). One of ordinary skill in the art will appreciate that this is merely an example and that a system instead could comprise more than two hidden layers and more than two fully connected layers.

Vector-by-Matrix Multiplication (VMM) Arrays

FIG. 9 depicts neuron VMM array 900, which is particularly suited for memory cells 310 as shown in FIG. 3 and is utilized as the synapses and parts of neurons between an input layer and the next layer. VMM array 900 comprises memory array 901 of non-volatile memory cells and reference array 902 (at the top of the array) of non-volatile reference memory cells. Alternatively, another reference array can be placed at the bottom.

In VMM array 900, control gate lines, such as control gate line 903, run in a vertical direction (hence reference array 902 in the row direction is orthogonal to control gate line 903), and erase gate lines, such as erase gate line 904, run in a horizontal direction. Here, the inputs to VMM array 900 are provided on the control gate lines (CG0, CG1, CG2, CG3), and the output of VMM array 900 emerges on the source lines (SL0, SL1). In one example, only even rows are used, and in another example, only odd rows are used. The current placed on each source line (SL0, SL1, respectively) performs a summing function of all the currents from the memory cells connected to that particular source line.

As described herein for neural networks, the non-volatile memory cells of VMM array 900, i.e., the memory cells 310 of VMM array 900, may be configured to operate in a sub-threshold region.

The non-volatile reference memory cells and the non-volatile memory cells described herein are biased in weak inversion (sub threshold region):

$$Ids = Io * e^{(Vg-Vth)/nVt} = w * Io * e^{(Vg)/nVt},$$

where $w = e^{(-Vth)/nVt}$ where Ids is the drain to source current; Vg is gate voltage on the memory cell; Vth is threshold voltage of the memory cell; Vt is thermal voltage=k*T/q with k being the Boltzmann constant, T the temperature in Kelvin, and q the electronic charge; n is a slope factor=1+(Cdep/Cox) with Cdep=capacitance of the depletion layer, and Cox capacitance of the gate oxide layer; Io is the memory cell current at gate voltage equal to threshold voltage, Io is proportional to (Wt/L)*u*Cox*(n−1)*Vt² where u is carrier mobility and Wt and L are width and length, respectively, of the memory cell.

For an I-to-V log converter using a memory cell (such as a reference memory cell or a peripheral memory cell) or a transistor to convert input current into an input voltage:

$$Vg = n * Vt * \log[Ids/wp * Io]$$

where, wp is w of a reference or peripheral memory cell.

For a memory array used as a vector matrix multiplier VMM array with the current input, the output current is:

$$Iout = wa * Io * e^{(Vg)/nVt},$$

namely $Iout = (wa/wp) * Iin = W * Iin$ $$W = e^{(Vthp-Vtha)/nVt}$$

Here, wa=w of each memory cell in the memory array.

Vthp is effective threshold voltage of the peripheral memory cell and Vtha is effective threshold voltage of the main (data) memory cell. Note that the threshold voltage of a transistor is a function of substrate body bias voltage and the substrate body bias voltage, denoted Vsb, can be modulated to compensate for various conditions, on such temperature. The threshold voltage Vth can be expressed as:

$$Vth = Vth0 + \text{gamma} (SQRT | Vsb - 2*\varphi F) - SQRT|2*\varphi F|)$$

where Vth0 is threshold voltage with zero substrate bias, φF is a surface potential, and gamma is a body effect parameter.

A wordline or control gate can be used as the input for the memory cell for the input voltage.

Alternatively, the flash memory cells of VMM arrays described herein can be configured to operate in the linear region:

$$Ids = \text{beta} * (Vgs-Vth) * Vds; \text{beta} = u * Cox * Wt/L$$

$$W = \alpha(Vgs-Vth)$$

meaning weight W in the linear region is proportional to (Vgs-Vth)

A wordline or control gate or bitline or sourceline can be used as the input for the memory cell operated in the linear region. The bitline or sourceline can be used as the output for the memory cell.

For an I-to-V linear converter, a memory cell (such as a reference memory cell or a peripheral memory cell) or a transistor operating in the linear region can be used to linearly convert an input/output current into an input/output voltage.

Alternatively, the memory cells of VMM arrays described herein can be configured to operate in the saturation region:

$$Ids = 1/2 * \text{beta} * (Vgs-Vth)^2; \text{beta} = u * Cox * Wt/L$$

$$W\alpha(Vgs-Vth)^2,$$

meaning weight W is proportional to (Vgs-Vth)²

A wordline, control gate, or erase gate can be used as the input for the memory cell operated in the saturation region. The bitline or sourceline can be used as the output for the output neuron.

Alternatively, the memory cells of VMM arrays described herein can be used in all regions or a combination thereof (sub threshold, linear, or saturation) for each layer or multi layers of a neural network.

Other examples for VMM array 32 of FIG. 7 are described in U.S. Pat. No. 10,748,630, which is incorporated by reference herein. As described in that application. a sourceline or a bitline can be used as the neuron output (current summation output).

FIG. 10 depicts neuron VMM array 1000, which is particularly suited for memory cells 210 as shown in FIG. 2 and is utilized as the synapses between an input layer and the next layer. VMM array 1000 comprises a memory array 1003 of non-volatile memory cells, reference array 1001 of first non-volatile reference memory cells, and reference array 1002 of second non-volatile reference memory cells. Reference arrays 1001 and 1002, arranged in the column direction of the array, serve to convert current inputs flowing into terminals BLR0, BLR1, BLR2, and BLR3 into voltage inputs WL0, WL1, WL2, and WL3. In effect, the first and second non-volatile reference memory cells are diode-connected through multiplexors 1014 (only partially depicted) with current inputs flowing into them. The reference cells are tuned (e.g., programmed) to target reference levels. The target reference levels are provided by a reference mini-array matrix (not shown).

Memory array 1003 serves two purposes. First, it stores the weights that will be used by the VMM array 1000 on respective memory cells thereof. Second, memory array 1003 effectively multiplies the inputs (i.e. current inputs provided in terminals BLR0, BLR1, BLR2, and BLR3, which reference arrays 1001 and 1002 convert into the input voltages to supply to wordlines WL0, WL1, WL2, and WL3) by the weights stored in the memory array 1003 and then adds all the results (memory cell currents) to produce the output on the respective bitlines (BL0-BLN), which will be the input to the next layer or input to the final layer. By performing the multiplication and addition function, memory array 1003 negates the need for separate multiplication and addition logic circuits and is also power efficient. Here, the voltage inputs are provided on the word lines WL0, WL1, WL2, and WL3, and the output emerges on the respective bitlines BL0-BLN during a read (inference) operation. The current placed on each of the bitlines BL0-BLN performs a summing function of the currents from all non-volatile memory cells connected to that particular bitline.

Table No. 5 depicts operating voltages and currents for VMM array 1000. The columns in the table indicate the voltages placed on word lines for selected cells, word lines for unselected cells, bitlines for selected cells, bitlines for unselected cells, source lines for selected cells, and source lines for unselected cells. The rows indicate the operations of read, erase, and program.

TABLE NO. 5

| Operation of VMM Array 1000 of FIG. 10: | | | | | | |
|---|---|---|---|---|---|---|
| | WL | WL -unsel | BL | BL -unsel | SL | SL -unsel |
| Read | 1-3.5 V | −0.5 V/0 V | 0.6-2 V (Ineuron) | 0.6 V-2 V/0 V | 0 V | 0 V |
| Erase | ~5-13 V | 0 V | 0 V | 0 V | 0 V | 0 V |
| Program | 1-2 V | −0.5 V/0 V | 0.1-3 uA | Vinh ~2.5 V | 4-10 V | 0-1 V/FLT |

FIG. 11 depicts neuron VMM array 1100, which is particularly suited for memory cells 210 as shown in FIG. 2 and is utilized as the synapses and parts of neurons between an input layer and the next layer. VMM array 1100 comprises a memory array 1103 of non-volatile memory cells, reference array 1101 of first non-volatile reference memory cells, and reference array 1102 of second non-volatile reference memory cells. Reference arrays 1101 and 1102 run in row direction of the VMM array 1100. VMM array is similar to VMM 1000 except that in VMM array 1100, the word lines run in the vertical direction. Here, the inputs are provided on the word lines (WLA0, WLB0, WLA1, WLB2, WLA2, WLB2, WLA3, WLB3), and the output emerges on the source line (SL0, SL1) during a read operation. The current placed on each source line performs a summing function of all the currents from the memory cells connected to that particular source line.

Table No. 6 depicts operating voltages and currents for VMM array 1100. The columns in the table indicate the voltages placed on word lines for selected cells, word lines for unselected cells, bitlines for selected cells, bitlines for unselected cells, source lines for selected cells, and source lines for unselected cells. The rows indicate the operations of read, erase, and program.

TABLE NO. 6

| Operation of VMM Array 1100 of FIG. 11 | | | | | | |
|---|---|---|---|---|---|---|
| | WL | WL -unsel | BL | BL -unsel | SL | SL -unsel |
| Read | 1-3.5 V | −0.5 V/0 V | 0.6-2 V | 0.6 V-2 V/0 V | ~0.3-1 V (Ineuron) | 0 V |
| Erase | ~5-13 V | 0 V | 0 V | 0 V | 0 V | SL-inhibit (~4-8 V) |
| Program | 1-2 V | −0.5 V/0 V | 0.1-3 uA | Vinh ~2.5 V | 4-10 V | 0-1 V/FLT |

FIG. 12 depicts neuron VMM array 1200, which is particularly suited for memory cells 310 as shown in FIG. 3 and is utilized as the synapses and parts of neurons between an input layer and the next layer. VMM array 1200 comprises a memory array 1203 of non-volatile memory cells, reference array 1201 of first non-volatile reference memory cells, and reference array 1202 of second non-volatile reference memory cells. Reference arrays 1201 and 1202 serve to convert current inputs flowing into terminals BLR0, BLR1, BLR2, and BLR3 into voltage inputs CG0, CG1, CG2, and CG3. In effect, the first and second non-volatile reference memory cells are diode-connected through multiplexors 1212 (only partially shown) with current inputs flowing into them through BLR0, BLR1, BLR2, and BLR3.

Table No. 7 depicts operating voltages and currents for VMM array 1200. The columns in the table indicate the voltages placed on word lines for selected cells, word lines for unselected cells, bitlines for selected cells, bitlines for unselected cells, control gates for selected cells, control gates for unselected cells in the same sector as the selected cells, control gates for unselected cells in a different sector than the selected cells, erase gates for selected cells, erase gates for unselected cells, source lines for selected cells, and source lines for unselected cells. The rows indicate the operations of read, erase, and program.

TABLE NO. 7

| | | | | | | | | | | | |
|---|---|---|---|---|---|---|---|---|---|---|---|
| | | Operation of VMM Array 1200 of FIG. 12 | | | | | | | | | |
| | WL | WL - unsel | BL | BL - unsel | CG | CG - unsel same sector | CG - unsel | EG | EG - unsel | SL | SL - unsel |
| Read | 1.0-2 V | −0.5 V/ 0 V | 0.6-2 V (Ineuron) | 0 V | 0-2.6 V | 0-2.6 V | 0-2.6 V | 0-2.6 V | 0-2.6 V | 0 V | 0 V |
| Erase | 0 V | 0 V | 0 V | 0 V | 0 V | 0-2.6 V | 0-2.6 V | 5-12 V | 0-2.6 V | 0 V | 0 V |
| Program | 0.7-1 V | −0.5 V/0 V | 0.1-1 uA | Vinh (1-2 V) | 4-11 V | 0-2.6 V | 0-2.6 V | 4.5-5 V | 0-2.6 V | 4.5-5 V | 0-1 V |

Multiplexors 1212 each include a respective multiplexor 1205 and a cascoding transistor 1204 to ensure a constant voltage on the bitline (such as BLR0) of each of the first and second non-volatile reference memory cells during a read operation. The reference cells are tuned to target reference levels.

Memory array 1203 serves two purposes. First, it stores the weights that will be used by the VMM array 1200. Second, memory array 1203 effectively multiplies the inputs (current inputs provided to terminals BLR0, BLR1, BLR2, and BLR3, for which reference arrays 1201 and 1202 convert these current inputs into the input voltages to supply to the control gates (CG0, CG1, CG2, and CG3) by the weights stored in the memory array and then add all the results (cell currents) to produce the output, which appears on BL0-BLN, and will be the input to the next layer or input to the final layer. By performing the multiplication and addition function, the memory array negates the need for separate multiplication and addition logic circuits and is also power efficient. Here, the inputs are provided on the control gate lines (CG0, CG1, CG2, and CG3), and the output emerges on the bitlines (BL0-BLN) during a read operation. The current placed on each bitline performs a summing function of all the currents from the memory cells connected to that particular bitline.

VMM array 1200 implements uni-directional tuning for non-volatile memory cells in memory array 1203. That is, each non-volatile memory cell is erased and then partially programmed until the desired charge on the floating gate is reached. If too much charge is placed on the floating gate (such that the wrong value is stored in the cell), the cell is erased and the sequence of partial programming operations starts over. As shown, two rows sharing the same erase gate (such as EG0 or EG1) are erased together (which is known as a page erase), and thereafter, each cell is partially programmed until the desired charge on the floating gate is reached.

FIG. 13 depicts neuron VMM array 1300, which is particularly suited for memory cells 310 as shown in FIG. 3 and is utilized as the synapses and parts of neurons between an input layer and the next layer. VMM array 1300 comprises a memory array 1303 of non-volatile memory cells, reference array 1301 or first non-volatile reference memory cells, and reference array 1302 of second non-volatile reference memory cells. EG lines EGR0, EG0, EG1 and EGR1 are run vertically while CG lines CG0, CG1, CG2 and CG3 and SL lines WL0, WL1, WL2 and WL3 are run horizontally. VMM array 1300 is similar to VMM array 1400, except that VMM array 1300 implements bi-directional tuning, where each individual cell can be completely erased, partially programmed, and partially erased as needed to reach the desired amount of charge on the floating gate due to the use of separate EG lines. As shown, reference arrays 1301 and 1302 convert input current in the terminal BLR0, BLR1, BLR2, and BLR3 into control gate voltages CG0, CG1, CG2, and CG3 (through the action of diode-connected reference cells through multiplexors 1314) to be applied to the memory cells in the row direction. The current output (neuron) is in the bitlines BL0-BLN, where each bitline sums all currents from the non-volatile memory cells connected to that particular bitline.

Table No. 8 depicts operating voltages and currents for VMM array 1300. The columns in the table indicate the voltages placed on word lines for selected cells, word lines for unselected cells, bitlines for selected cells, bitlines for unselected cells, control gates for selected cells, control gates for unselected cells in the same sector as the selected cells, control gates for unselected cells in a different sector than the selected cells, erase gates for selected cells, erase gates for unselected cells, source lines for selected cells, and source lines for unselected cells. The rows indicate the operations of read, erase, and program.

TABLE NO. 8

Operation of VMM Array 1300 of FIG. 13

|  | WL | WL - unsel | BL | BL - unsel | CG | CG - unsel same sector | CG - unsel | EG | EG - unsel | SL | SL - unsel |
|---|---|---|---|---|---|---|---|---|---|---|---|
| Read | 1.0-2 V | −0.5 V/0 V | 0.6-2 V (Ineuron) | 0 V | 0-2.6 V | 0-2.6 V | 0-2.6 V | 0-2.6 V | 0-2.6 V | 0 V | 0 V |
| Erase | 0 V | 0 V | 0 V | 0 V | 0 V | 4-9 V | 0-2.6 V | 5-12 V | 0-2.6 V | 0 V | 0 V |
| Program | 0.7-1 V | −0.5 V/0 V | 0.1-1 uA | Vinh (1-2 V) | 4-11 V | 0-2.6 V | 0-2.6 V | 4.5-5 V | 0-2.6 V | 4.5-5 V | 0-1 V |

FIG. 14 depicts VMM array 1400, which is particularly suited for memory cells 210 as shown in FIG. 2 and is utilized as the synapses and parts of neurons between an input layer and the next layer. In VMM array 1400, the inputs $INPUT_0 \ldots, INPUT_N$ are received on bitlines $BL_0, \ldots BL_N$, respectively, and the outputs $OUTPUT_1$, $OUTPUT_2$, $OUTPUT_3$, and $OUTPUT_4$ are generated on source lines $SL_0$, $SL_1$, $SL_2$, and $SL_3$, respectively.

FIG. 15 depicts VMM array 1500, which is particularly suited for memory cells 210 as shown in FIG. 2 and is utilized as the synapses and parts of neurons between an input layer and the next layer. In this example, the inputs $INPUT_0$, $INPUT_1$. $INPUT_2$, and $INPUT_3$ are received on source lines $SL_0$, $SL_1$, $SL_2$, and $SL_3$, respectively, and the outputs $OUTPUT_0, \ldots, OUTPUT_N$ are generated on bitlines $BL_0, \ldots, BL_N$.

FIG. 16 depicts VMM array 1600, which is particularly suited for memory cells 210 as shown in FIG. 2 and is utilized as the synapses and parts of neurons between an input layer and the next layer. In this example, the inputs $INPUT_0, \ldots, INPUT_M$ are received on word lines $WL_0, \ldots, WL_M$, respectively, and the outputs $OUTPUT_0, \ldots OUTPUT_N$ are generated on bitlines $BL_0, \ldots, BL_N$.

FIG. 17 depicts VMM array 1700, which is particularly suited for memory cells 310 as shown in FIG. 3 and is utilized as the synapses and parts of neurons between an input layer and the next layer. In this example, the inputs $INPUT_0, \ldots, INPUT_M$ are received on word lines $WL_0, \ldots, WL_M$, respectively, and the outputs $OUTPUT_0, \ldots OUTPUT_N$ are generated on bitlines $BL_0, \ldots, BL_N$.

FIG. 18 depicts VMM array 1800, which is particularly suited for memory cells 410 as shown in FIG. 4 and is utilized as the synapses and parts of neurons between an input layer and the next layer. In this example, the inputs $INPUT_0, \ldots, INPUT_n$ are received on vertical control gate lines $CG_0, \ldots, CG_N$, respectively, and the outputs $OUTPUT_1$ and $OUTPUT_2$ are generated on source lines $SL_0$ and $SL_1$.

FIG. 19 depicts VMM array 1900, which is particularly suited for memory cells 410 as shown in FIG. 4 and is utilized as the synapses and parts of neurons between an input layer and the next layer. In this example, the inputs $INPUT_0, \ldots, INPUT_N$ are received on the gates of bitline control gates 1901-1, 1901-2, ..., 1901-(N−1), and 1901-N, respectively, which are coupled to bitlines $BL_0, \ldots, BL_N$, respectively. Example outputs $OUTPUT_1$ and $OUTPUT_2$ are generated on source lines $SL_0$ and $SL_1$.

FIG. 20 depicts VMM array 2000, which is particularly suited for memory cells 310 as shown in FIG. 3, memory cells 510 as shown in FIG. 5, and memory cells 710 as shown in FIG. 7, and is utilized as the synapses and parts of neurons between an input layer and the next layer. In this example, the inputs $INPUT_0, \ldots, INPUT_M$ are received on word lines $WL_0, \ldots, WL_M$, and the outputs $OUTPUT_0, \ldots, OUTPUT_N$ are generated on bitlines $BL_0, \ldots, BL_N$, respectively.

FIG. 21 depicts VMM array 2100, which is particularly suited for memory cells 310 as shown in FIG. 3, memory cells 510 as shown in FIG. 5, and memory cells 710 as shown in FIG. 7, and is utilized as the synapses and parts of neurons between an input layer and the next layer. In this example, the inputs $INPUT_0, \ldots, INPUT_M$ are received on control gate lines $CG_0, \ldots, CG_M$. Outputs $OUTPUT_0, \ldots, OUTPUT_N$ are generated on vertical source lines $SL_0, \ldots, SL_N$, respectively, where each source line $SL_i$ is coupled to the source lines of all memory cells in column i.

FIG. 22 depicts VMM array 2200, which is particularly suited for memory cells 310 as shown in FIG. 3, memory cells 510 as shown in FIG. 5, and memory cells 710 as shown in FIG. 7, and is utilized as the synapses and parts of neurons between an input layer and the next layer. In this example, the inputs $INPUT_0, \ldots, INPUT_M$ are received on control gate lines $CG_0, \ldots, CG_M$. Outputs $OUTPUT_0, \ldots, OUTPUT_N$ are generated on vertical bitlines $BL_0, \ldots, BL_N$, respectively, where each bitline $BL_i$ is coupled to the bitlines of all memory cells in column i.

The input to the VMM arrays can be an analog level, a binary level, a pulse, a time modulated pulse, or digital bits (in this case a DAC is needed to convert digital bits to appropriate input analog level) and the output can be an analog level, a binary level, a timing pulse, pulses, or digital bits (in this case an output ADC is needed to convert output analog level into digital bits).

In general, for each memory cell in a VMM array, each weight W can be implemented by a single memory cell or by a differential cell or by two blend memory cells (average of 2 cells). In the differential cell case, two memory cells are needed to implement a weight W as a differential weight (W=W+−W−). In the two blend memory cells, two memory cells are needed to implement a weight W as an average of two cells.

FIG. 23 depicts VMM system 2300 (which comprises VMM array 2301 and summation circuits 2301 and 2302). In some examples, the weights, W, stored in a VMM array are stored as differential pairs, W+ (positive weight) and W− (negative weight), where W=(W+)−(W−). In VMM system 2300, half of the bitlines are designated as W+ lines, that is, bitlines connecting to memory cells that will store positive weights W+, and the other half of the bitlines are designated as W− lines, that is, bitlines connecting to memory cells implementing negative weights W−. The W− lines are interspersed among the W+ lines in an alternating fashion. The subtraction operation is performed by a summation circuit that receives current from a W+ line and a W− line, such as summation circuits 2301 and 2302. The output of a W+ line and the output of a W− line are combined together to give effectively W=W+−W− for each pair of (W+, W−) cells for all pairs of (W+, W−) lines. While the above has been described in relation to W− lines interspersed among the W+ lines in an alternating fashion, in other examples W+ lines and W− lines can be arbitrarily located anywhere in the array.

FIG. 24 depicts another example. In VMM system 2410, positive weights W+ are implemented in first array 2411 and negative weights W− are implemented in a second array 2412, second array 2412 separate from the first array, and the resulting weights are appropriately combined together by summation circuits 2413.

FIG. 25 depicts VMM system 2500. the weights, W, stored in a VMM array are stored as differential pairs, W+ (positive weight) and W− (negative weight), where W=(W+)−(W−). VMM system 2500 comprises array 2501 and array 2502. Half of the bitlines in each of array 2501 and 2502 are designated as W+ lines, that is, bitlines connecting to memory cells that will store positive weights W+, and the other half of the bitlines in each of array 2501 and 2502 are designated as W− lines, that is, bitlines connecting to memory cells implementing negative weights W−. The W− lines are interspersed among the W+ lines in an alternating fashion. The subtraction operation is performed by a summation circuit that receives current from a W+ line and a W− line, such as summation circuits 2503, 2504, 2505, and 2506. The output of a W+ line and the output of a W− line from each array 2501, 2502 are respectively combined together to give effectively W=W+−W− for each pair of (W+, W−) cells for all pairs of (W+, W−) lines. In addition, the W values from each array 2501 and 2502 can be further combined through summation circuits 2507 and 2508, such that each W value is the result of a W value from array 2501 minus a W value from array 2502, meaning that the end result from summation circuits 2507 and 2508 is a differential value of two differential values.

Each non-volatile memory cells used in the analog neural memory system is to be erased and programmed to hold a very specific and precise amount of charge, i.e., the number of electrons, in the floating gate. For example, each floating gate should hold one of N different values, where N is the number of different weights that can be indicated by each cell. Examples of N include 16, 32, 64, 128, and 256.

The output block preferably should precisely and consistently be able to perform verify and read operations, since each cell can hold one of N different values. In the prior art, the inputs to the output blocks vary in voltage depending on the current being drawn by the memory array, as shown below with reference to FIG. 26, which depicts the relationship between changes in bitline voltage with changes in current drawn by the bitline through the memory cells coupled to that bitline. As can be seen, bitline voltage varies significantly as bitline current varies. This leads to imprecision and also an asymmetrical condition between verify operations, when one or a handful of cells are being read, and neural read operations, where all cells are being read.

SUMMARY OF THE INVENTION

Numerous examples are disclosed of a current-to-voltage converter comprising a common mode circuit.

DETAILED DESCRIPTION OF THE INVENTION

VMM System Architecture

Figure 27:
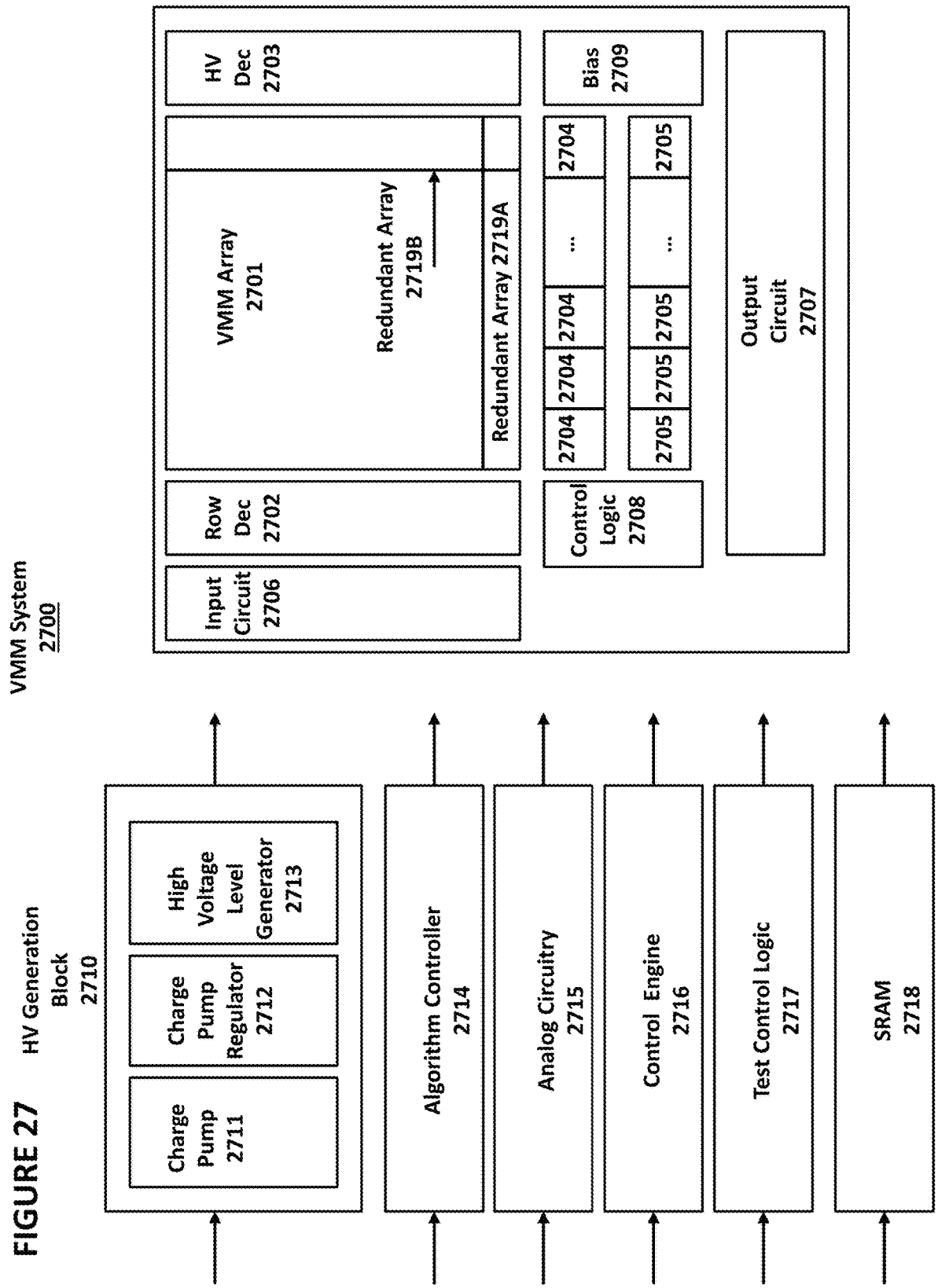
FIG. 27 depicts a VMM system.

FIG. 27 depicts a block diagram of VMM system 2700. VMM system 2700 comprises VMM array 2701, redundant arrays 2719A (row redundant array) and 2719B (column redundant array), row decoder 2702, high voltage decoder 2703, column decoders 2704, bitline drivers 2705 (such as bitline control circuitry for programming), input circuit 2706, output circuit 2707, control logic 2708, and bias generator 2709. VMM system 2700 further comprises high voltage generation block 2710, which comprises charge pump 2711, charge pump regulator 2712, and high voltage level generator 2713. VMM system 2700 further comprises (program/erase, or weight tuning) algorithm controller 2714, analog circuitry 2715, control engine 2716 (that may include special functions such as arithmetic functions, activation functions, embedded microcontroller logic, without limitation), test control logic 2717, and static random access memory (SRAM) block 2718 to store intermediate data such as for input circuits (e.g., activation data) or output circuits (neuron output data, partial sum output neuron data) or data in for programming (such as data in for a whole row or for multiple rows). Here, redundant arrays 2719A and 2719B are shown as part of the same physical array as VMM array 2701, but a person of ordinary skill in the art will appreciate that redundant arrays 2719A and 2719B and VMM array 2701 instead could be located in separate physical arrays.

The input circuit 2706 may include circuits such as a DAC (digital to analog converter), DPC (digital to pulses converter, digital to time modulated pulse converter), AAC (analog to analog converter, such as a current to voltage converter, logarithmic converter), PAC (pulse to analog level converter), or any other type of converters. The input circuit 2706 may implement one or more of normalization, linear or non-linear up/down scaling functions, or arithmetic functions. The input circuit 2706 may implement a temperature compensation function for input levels. The input circuit 2706 may implement an activation function such as ReLU or sigmoid. Input circuit 2706 may store digital activation data to be applied as, or combined with, an input signal during a program or read operation. The digital activation data can be stored in registers. Input circuit 2706 may comprise circuits to drive the array terminals, such as CG, WL, EG, and SL lines, which may include sample-and-hold circuits and buffers. A DAC can be used to convert digital activation data into an analog input voltage to be applied to the array.

The output circuit 2707 may include circuits such as an ITV (current-to-voltage circuit), ADC (analog to digital converter, to convert neuron analog output to digital bits), AAC (analog to analog converter, such as a current to voltage converter, logarithmic converter), APC (analog to pulse(s) converter, analog to time modulated pulse converter), or any other type of converters. The output circuit 2707 may convert array outputs into activation data. The output circuit 2707 may implement an activation function such as rectified linear activation function (ReLU) or sigmoid. The output circuit 2707 may implement one or more of statistic normalization, regularization, up/down scaling/ gain functions, statistical rounding, or arithmetic functions (e.g., add, subtract, divide, multiply, shift, log) for neuron outputs. The output circuit 2707 may implement a temperature compensation function for neuron outputs or array outputs (such as bitline output) so as to keep power consumption of the array approximately constant or to improve precision of the array (neuron) outputs such as by keeping the IV slope approximately the same over temperature. The output circuit 2707 may comprise registers for storing output data.

Figure 28:
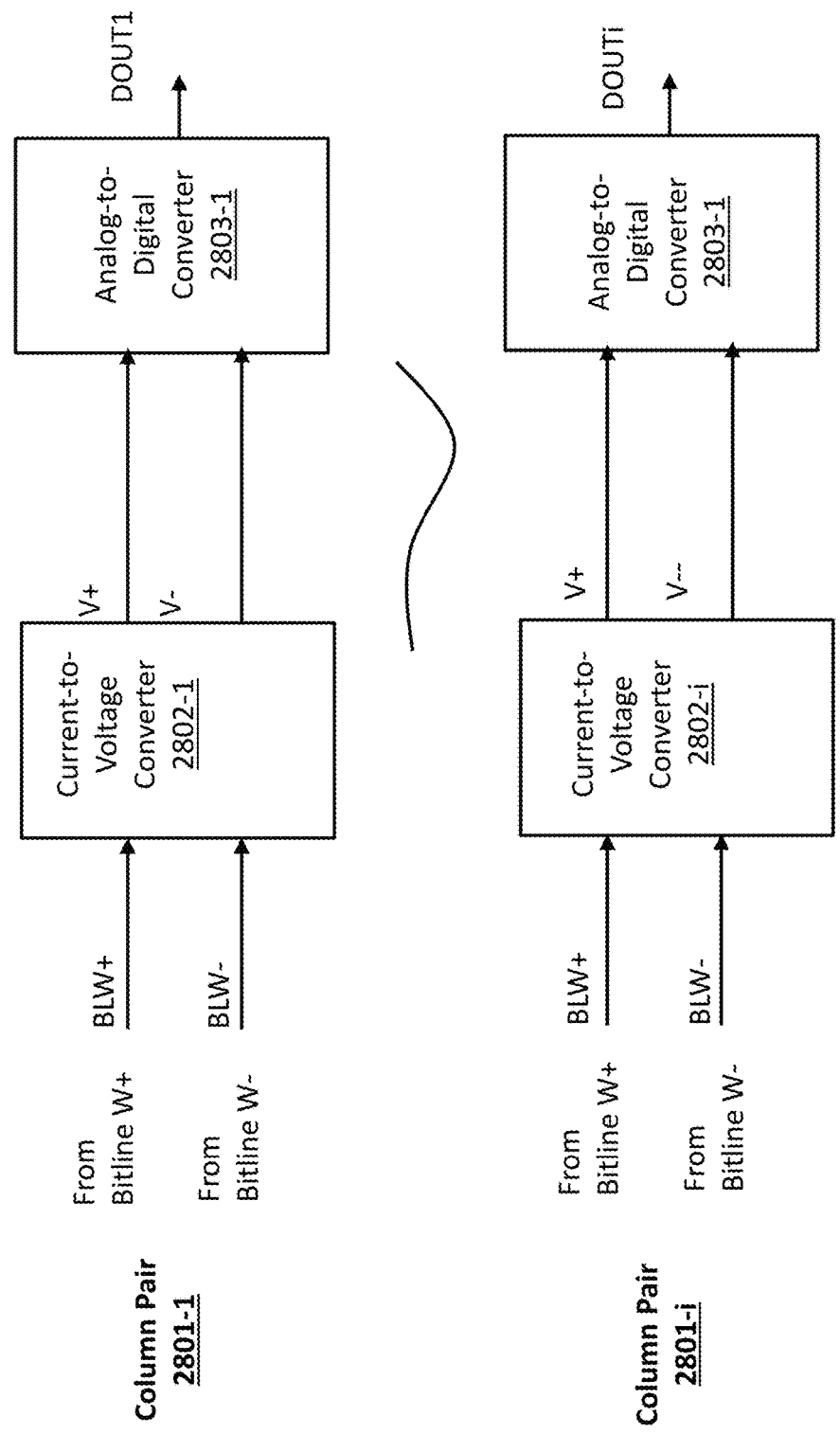
FIG. 28 depicts an output block in a VMM system.

FIG. 28 depicts output block 2800 that receives analog signals from a VMM array and generates a digital output. Columns in the VMM array are paired together, with one column providing current BLW+ from bitline W+ (which can be referred to herein as a first bitline) and one column providing current BLW− from bitline W− (which can be referred to herein as a second bitline). There are i column pairs, labeled column pair 2801-1, . . . , 2801-i, where each pair comprises a W+ bitline and a W− bitline. Current-to-voltage converters 2802-1, . . . , 2802-i convert the received currents from respective column pairs 2801-1, . . . , 2801-i, into respective pairs of voltages V+ and V−. Analog-to-digital converters 2803-1, . . . , 2803-i receive pairs of voltages V+ and V− from current-to-voltage converters 2802-1, . . . , 2802-i, respectively, and generate respective digital outputs DOUT1, . . . , DOUTi. The use of differential cells (one storing a W+ value and another storing a W− value, which together store a value W according to the formula W=W+−W−) is disclosed in U.S. patent application Ser. No. 17/875,281, filed on Jul. 27, 2022, published as US 2022/0374699A1, and titled, "Precise Data Tuning Method and Apparatus for Analog Neural Memory in an Artificial Neural Network," which is incorporated by reference herein.

Figure 29:
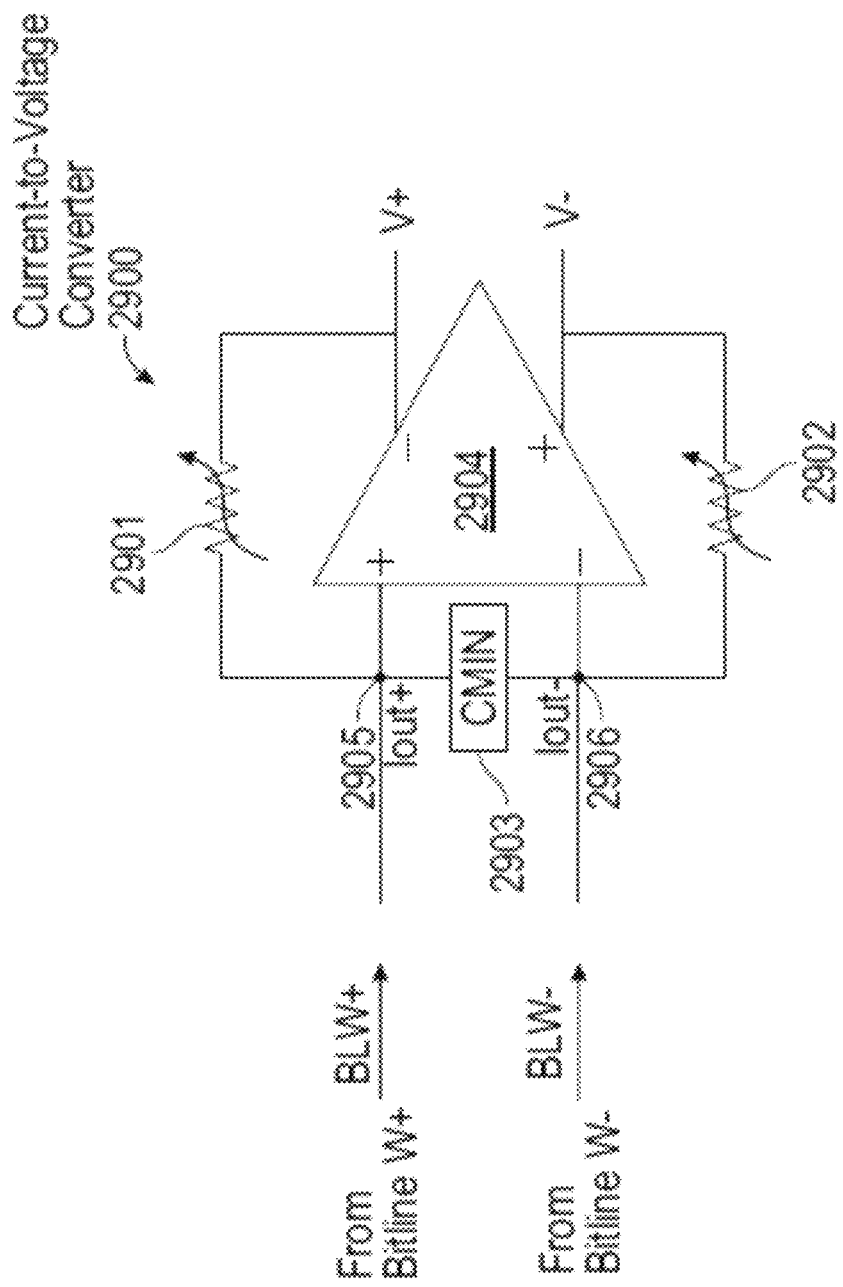
FIG. 29 depicts a current-to-voltage converter.
Figure 30:
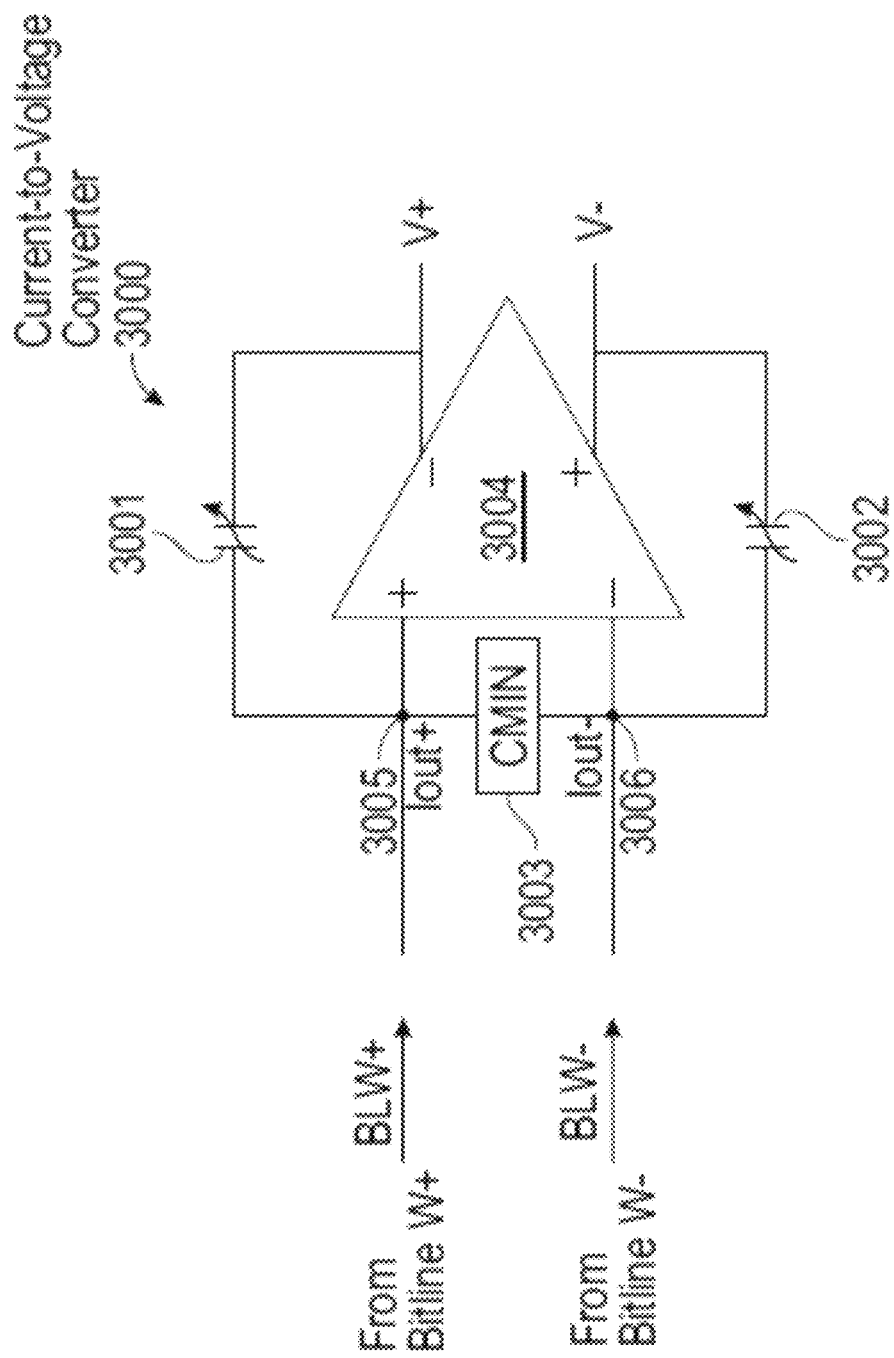
FIG. 30 depicts a current-to-voltage converter.
Figure 31:
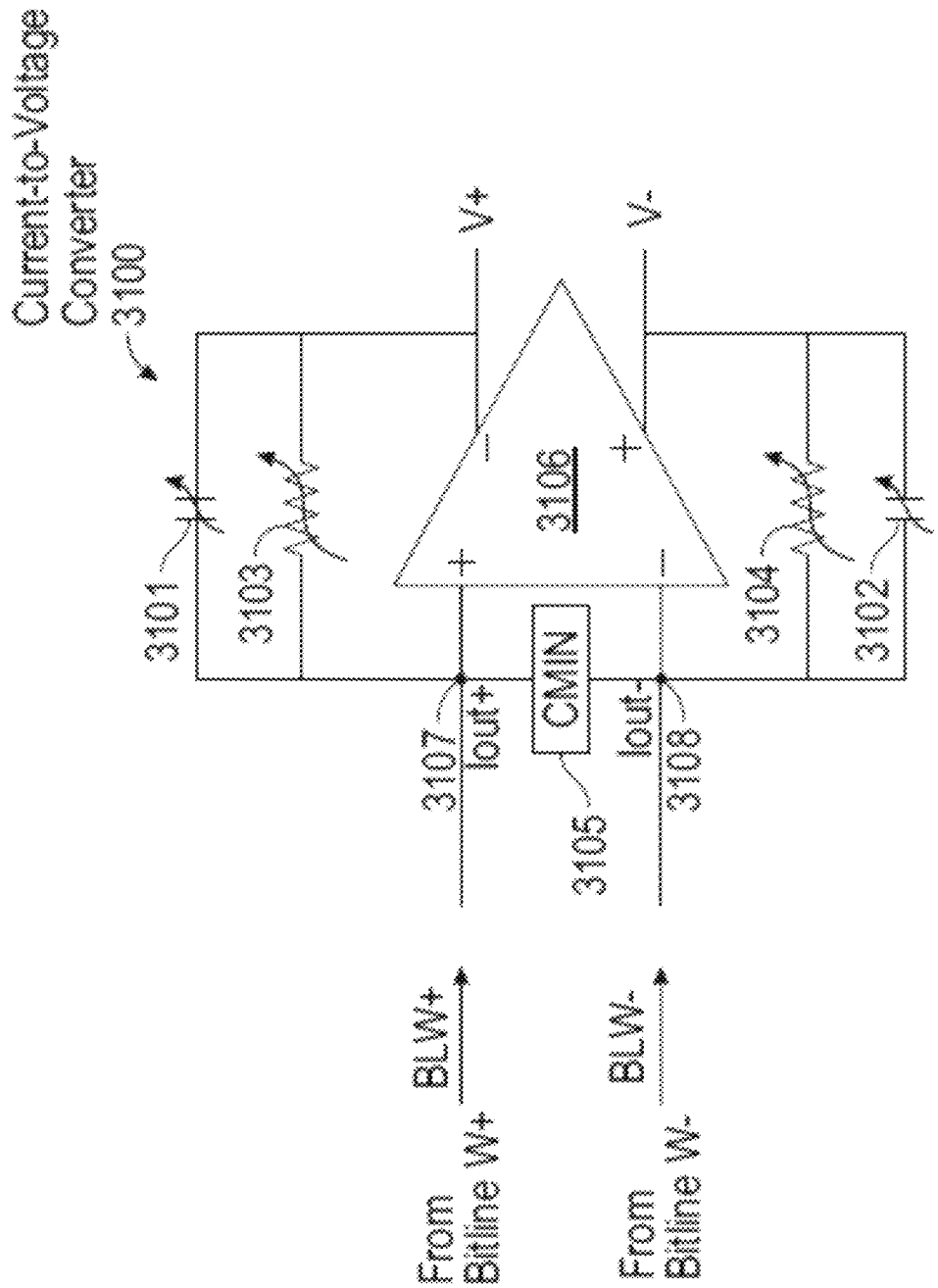
FIG. 31 depicts a current-to-voltage converter.

FIGS. 29, 30, and 31 disclose three examples of current-to-voltage converters that can be used as current-to-voltage converters 2802 in output block 2800 in FIG. 28. The inputs are currents BLW+ and BLW− from bitlines W+ and W−, respectively, and the outputs are voltages V+ and V−. V+ and V− are complementary, meaning one is positive and the other is negative around an output common mode voltage, VCM (which can be ground or can be another voltage). The inverting and non-inverting inputs to operational amplifiers 2904, 3004, and 3106 are maintained at a common reference voltage dictated by common mode circuits 2903, 3003, and 3105, respectively.

FIG. 29 depicts current-to-voltage converter 2900, which comprises variable resistor 2901, variable resistor 2902, common mode circuit 2903, and operational amplifier 2904. A first output of common mode circuit 2903 is coupled to node 2905, which node 2905 is coupled to the non-inverting input of operational amplifier 2904 and a second output of common mode circuit 2903 is coupled to node 2906, which node 2906 is coupled to the inverting input of operational amplifier 2904. Common mode circuit 2903 maintains the same voltage at nodes 2905 and 2906, meaning that the voltages on the non-inverting input and the inverting input of operational amplifier 2904 are equal. Common mode circuit 2903 receives a reference voltage, VCIMREF, and outputs a current Iout+ into node 2905 and a current Iout− into node 2906, where Iout+ and Iout− are equal. The equal voltage at nodes 2905 and 2906 and the equal currents Iout+ and Iout− lead to the generation of a common mode component, VCM, in the output voltage around which V+ and V− are centered. Current-to-voltage converter 2900 converts currents BLW+ and BLW− into voltages V+ and V−. The output voltages minus the common mode component, dV+=V+−VCIMREF and dV−=V−−VCIMREF, are proportional to half of the difference between BLW+ and BLW− multiplied by the resistance of the respective feedback resistor (2901/2902), specifically:

$$dV += \{(BLW + -BLW -)/2\} * R\_2901,$$

$$\text{and } dV -= \{(BLW - -BLW +)/2\} * R\_2902$$

FIG. 30 depicts current-to-voltage converter 3000, which comprises variable capacitor 3001, variable capacitor 3002, common mode circuit 3003, and operational amplifier 3004. A first output of common mode circuit 3003 is coupled to node 3005, which node 3005 is coupled to the non-inverting input of operational amplifier 3004 and a second output of common mode circuit 3003 is coupled to node 3006, which node 3006 is coupled to the inverting input of operational amplifier 2904. Common mode circuit 3003 maintains the same voltage at nodes 3005 and 3006, meaning that the voltages on the non-inverting input and the inverting input of operational amplifier 3004 are equal. Common mode circuit 3003 receives a reference voltage, VCIMREF, and outputs a current Iout+ into node 3005 and a current Iout− into node 3006, where Iout+=Iout−. The equal voltage at nodes 3005 and 3006 and the equal currents Iout+ and Iout− lead to the generation of a common mode component, VCM, in the output voltage around which V+ and V− are centered. Current-to-voltage converter 3000 converts currents BLW+ and BLW− into voltages V+ and V−. The output voltages minus the common mode component, dV+=V+−VCIMREF) and dV−=V−−VCIMREF, are proportional to half of the difference between BLW+ and BLW− multiplied by the capacitance value of feedback capacitors (3001/3002), specifically:

$$dV\mathrel{+}= \{(BLW+ - BLW-)/2\} * C\_3001,$$
$$\text{and } dV\mathrel{-}= \{(BLW- - BLW+)/2\} * C\_3003$$

FIG. 31 depicts current-to-voltage converter 3100, which comprises variable capacitor 3101, variable capacitor 3102, variable resistor 3103, variable resistor 3104, common mode circuit 3105, and operational amplifier 3106. A first output of common mode circuit 3105 is coupled to node 3107, which node 3107 is coupled to the non-inverting input of operational amplifier 3106 and a second output of common mode circuit 3105 is coupled to node 3108, which node 3108 is coupled to the inverting input of operational amplifier 3106. Common mode circuit 3105 maintains the same voltage at nodes 3107 and 3108, meaning that the voltages on the non-inverting input and the inverting input of operational amplifier 3106 are equal. Common mode circuit 3105 receives a reference voltage, VCIMREF, and outputs a current Iout+ into node 3107 and a current Iout− into node 3108, where Iout+=Iout−. The equal voltage at nodes 3107 and 3108 and the equal currents Iout+ and Iout− lead to the generation of a common mode component, VCM, in the output voltage around which V+ and V− are centered. Current-to-voltage converter 3100 converts current on BLW+ and BLW− into voltages V+ and V−. The output voltages minus the common mode component, dV+=V+−VCIMREF and dV−=V−−VCIMREF, are proportional to half of the difference between BLW+ and BLW− multiplied by the resistance value of the feedback resistors (3103/3104), specifically:

$$dV\mathrel{+}= \{(BLW+ - BLW-)/2\} * R\_3101,$$
$$\text{and } dV\mathrel{-}= \{(BLW- - BLW+)/2\} * R\_3102$$

Thus, resistors 3103 and 3104 convert current to voltage. After the conversion is complete, resistors 3103 and 3104 are shut off by switches (not shown), and capacitors 3101 and 3102 are used to hold the converted voltage.

FIGS. 32-36 depict examples of common mode circuits that can be used as common mode circuits 2903, 3003, and 3105 in current-to-voltage converters 2900, 3000, and 3100 in FIGS. 29-31, respectively.

Figure 32:
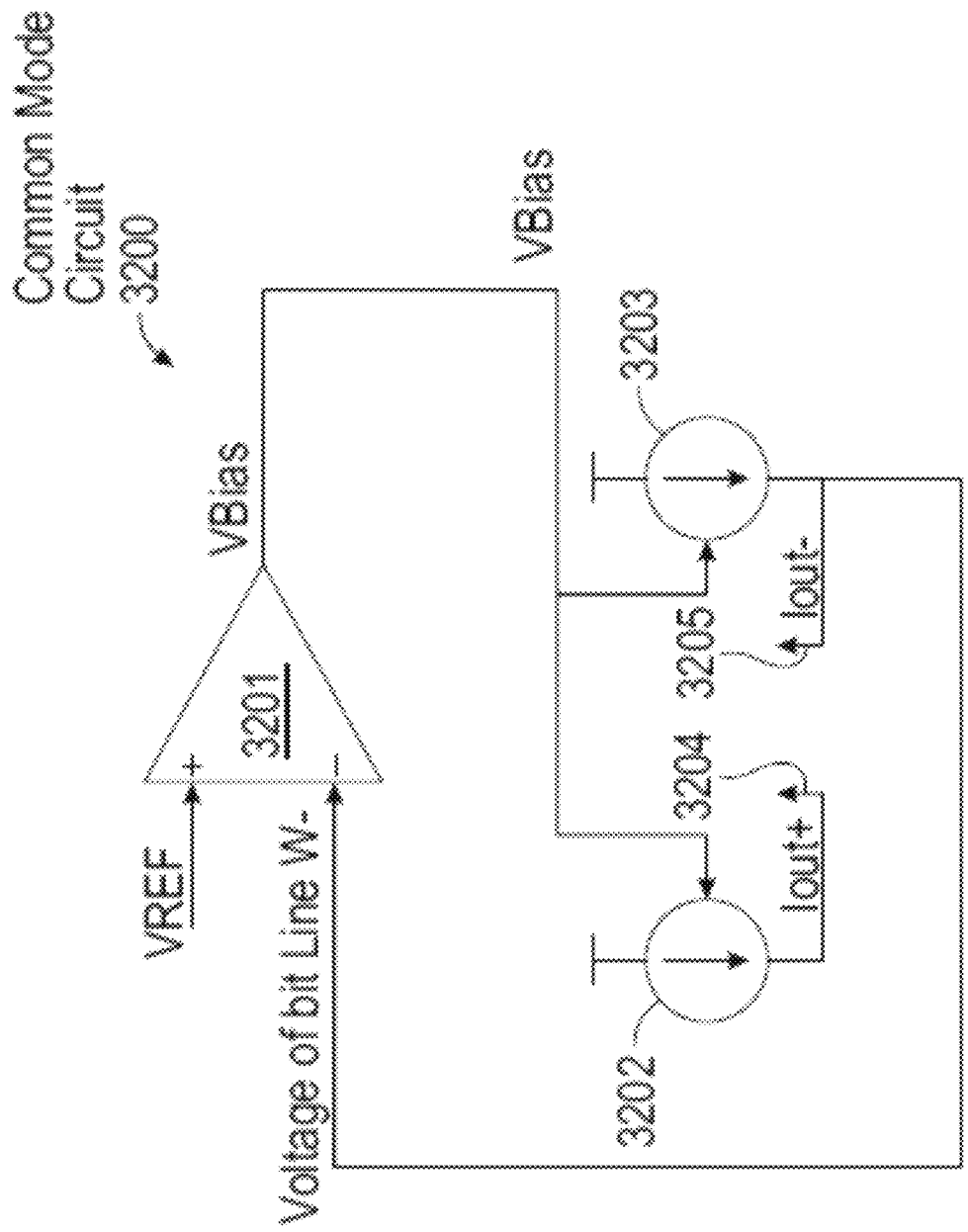
FIG. 32 depicts a common mode circuit for current-to-voltage converters.

FIG. 32 depicts common mode circuit 3200, which comprises operational amplifier 3201 (which is an example of a regulating circuit), current source 3202, current source 3203, node 3204 (which corresponds to nodes 2905, 3005, and 3107 in FIGS. 29, 30, and 31), and node 3205 (which corresponds to nodes 2906, 3006, and 3108 in FIGS. 29, 30, and 31). Operational amplifier 3201 receives voltage VCIMREF as an input on its non-inverting input and the voltage of node 3205 on its inverting input. Due to the high input impedance of operational amplifier 3201, no current flows from BLw− into operational amplifier 3201. Operational amplifier 3201 generates voltage output Vbias (a voltage bias), which is applied as a bias signal to current sources 3202 and 3203 to control their current magnitudes, Iout+ and Iout−, respectively. Operational amplifier 3201 will modify Vbias until the voltage of bitline W−, which is the voltage at node 3205, equals VCIMREF.

Figure 33:
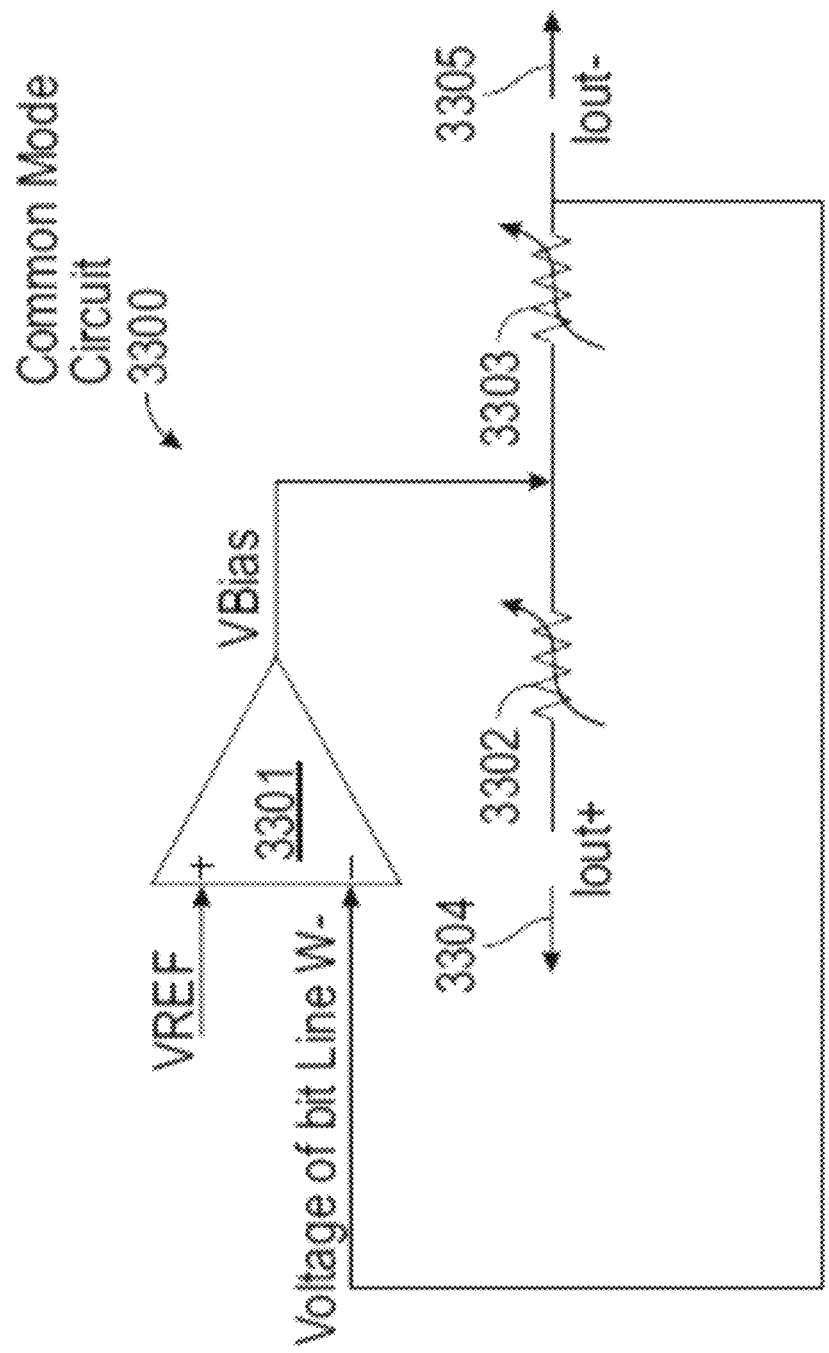
FIG. 33 depicts a common mode circuit for current-to-voltage converters.

FIG. 33 depicts common mode circuit 3300, which comprises operational amplifier 3301 (which is an example of a regulating circuit), variable resistor 3302, variable resistor 3303, node 3304 (which corresponds to nodes 2905, 3005, and 3107 in FIGS. 29, 30, and 31), and node 3305 (which corresponds to nodes 2906, 3006, and 3108 in FIGS. 29, 30, and 31). Vbias (a voltage bias) is applied at a node between variable resistor 3302 and variable resistor 3303. The current through variable resistors 3302 and 3303 are Iout+ and Iout−, respectively, where Iout+=Iout−. The variable resistors are set during a configuration mode to ensure that the voltages at nodes 3304 and 3305 are equal, which will also cause Iout+ and Iout- to be equal. Operational amplifier 3301 receives voltage VCIMREF as an input on its non-inverting input and the voltage of node 3305 on its inverting input. Due to the high input impedance of operational amplifier 3301, no current flows from node 3305 (or the bitline W−) into operational amplifier 3301. Operational amplifier 3301 generates voltage output Vbias and will modify Vbias until the voltage of bitline W−, which is the voltage at node 3305, equals VCIMREF.

Figure 34:
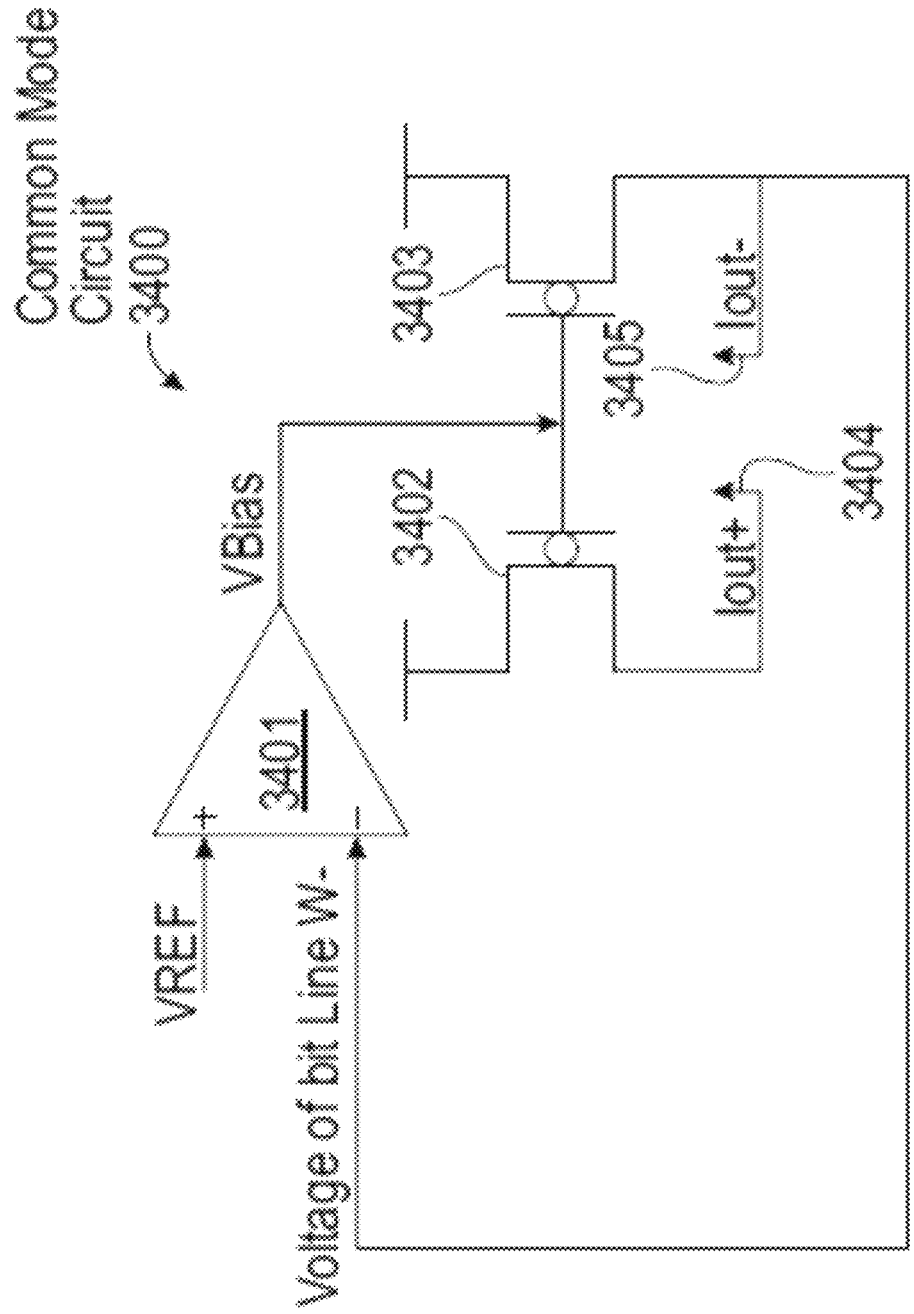
FIG. 34 depicts a common mode circuit for current-to-voltage converters.

FIG. 34 depicts common mode circuit 3400, which comprises operational amplifier 3401 (which is an example of a regulating circuit), PMOS transistor 3402, PMOS transistor 3403, node 3404 (which corresponds to nodes 2905, 3005, and 3107 in FIGS. 29, 30, and 31), and node 3405 (which corresponds to nodes 2906, 3006, and 3108 in FIGS. 29, 30, and 31). Vbias (a voltage bias) is applied at a node coupled to the gates of PMOS transistors 3402 and 3403, resulting in currents Iout+ and Iout−, where Iout+=Iout−. The voltages at nodes 3404 and 3405 are equal. Operational amplifier 3401 receives voltage VCIMREF as an input on its non-inverting input and the voltage of node 3405 on its inverting input. Due to the high input impedance of operational amplifier 3401, no current flows from node 3405 (or the bitline W−) into operational amplifier 3401. Operational amplifier 3401 generates voltage output Vbias and will modify Vbias until the voltage of bitline W−, which is the voltage at node 3405, equals VCIMREF.

Figure 35:
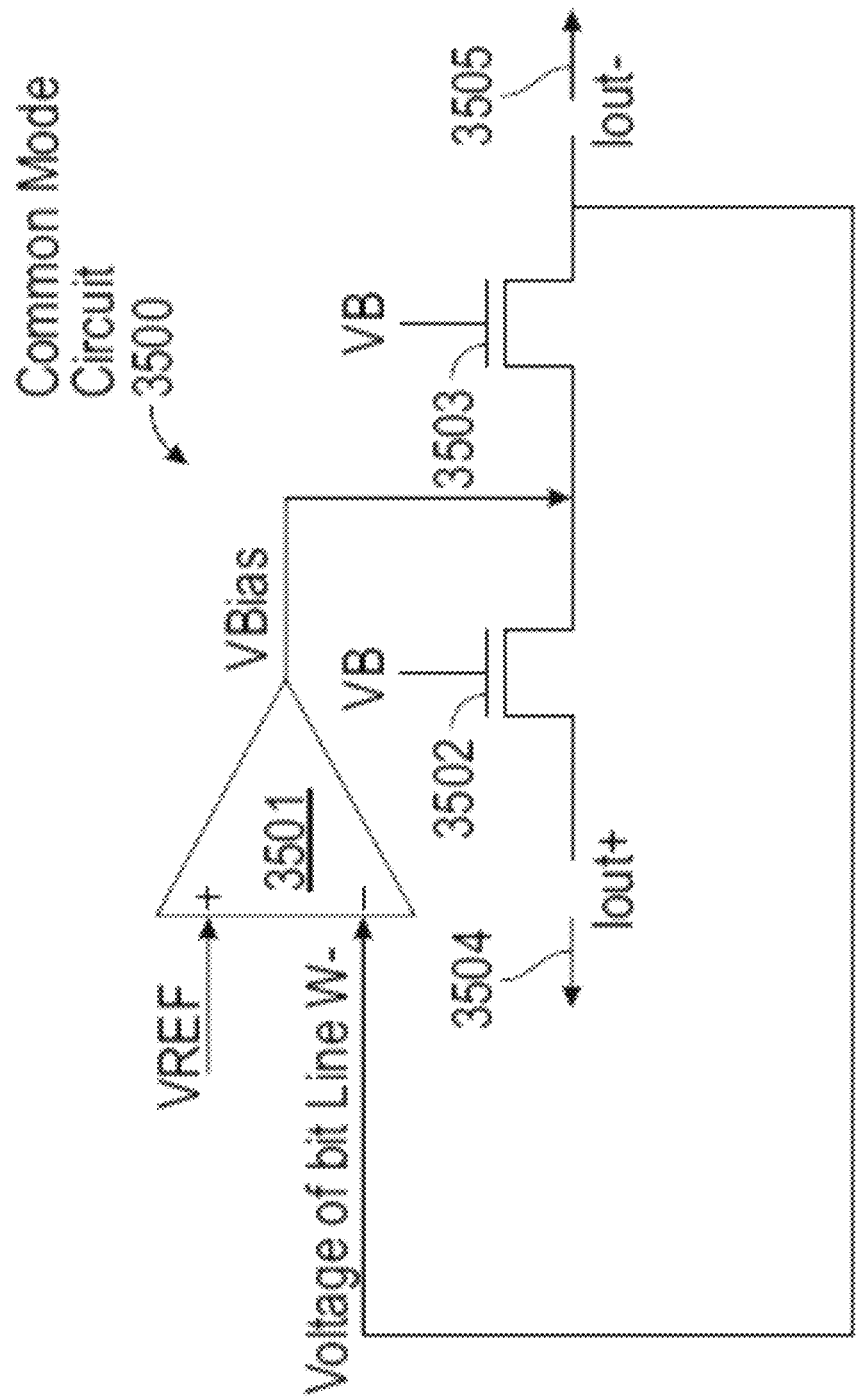
FIG. 35 depicts a common mode circuit for current-to-voltage converters.

FIG. 35 depicts common mode circuit 3500, which comprises operational amplifier 3501 (which is an example of a regulating circuit), NMOS transistor 3502, NMOS transistor 3503, node 3504 (which corresponds to nodes 2905, 3005, and 3107 in FIGS. 29, 30, and 31), and node 3505 (which corresponds to nodes 2906, 3006, and 3108 in FIGS. 29, 30, and 31). Vbias (a voltage bias) is applied at a node between NMOS transistors 3502 and 3503 and VB is a bias voltage applied to turn on NMOS transistors 3502 and 3503 during operation, resulting in currents Iout+ and Iout−, where Iout+=Iout−. The voltages at nodes 3504 and 3505 are equal.

Operational amplifier 3501 receives voltage VCIMREF as an input on its non-inverting input and the voltage of node 3505 on its inverting input. Due to the high input impedance of operational amplifier 3501, no current flows from node 3505 (or the bitline W−) into operational amplifier 3501. Operational amplifier 3501 generates voltage output Vbias and will modify Vbias until the voltage of bitline W−, which is the voltage at node 3505, equals VREF.

Figure 36:
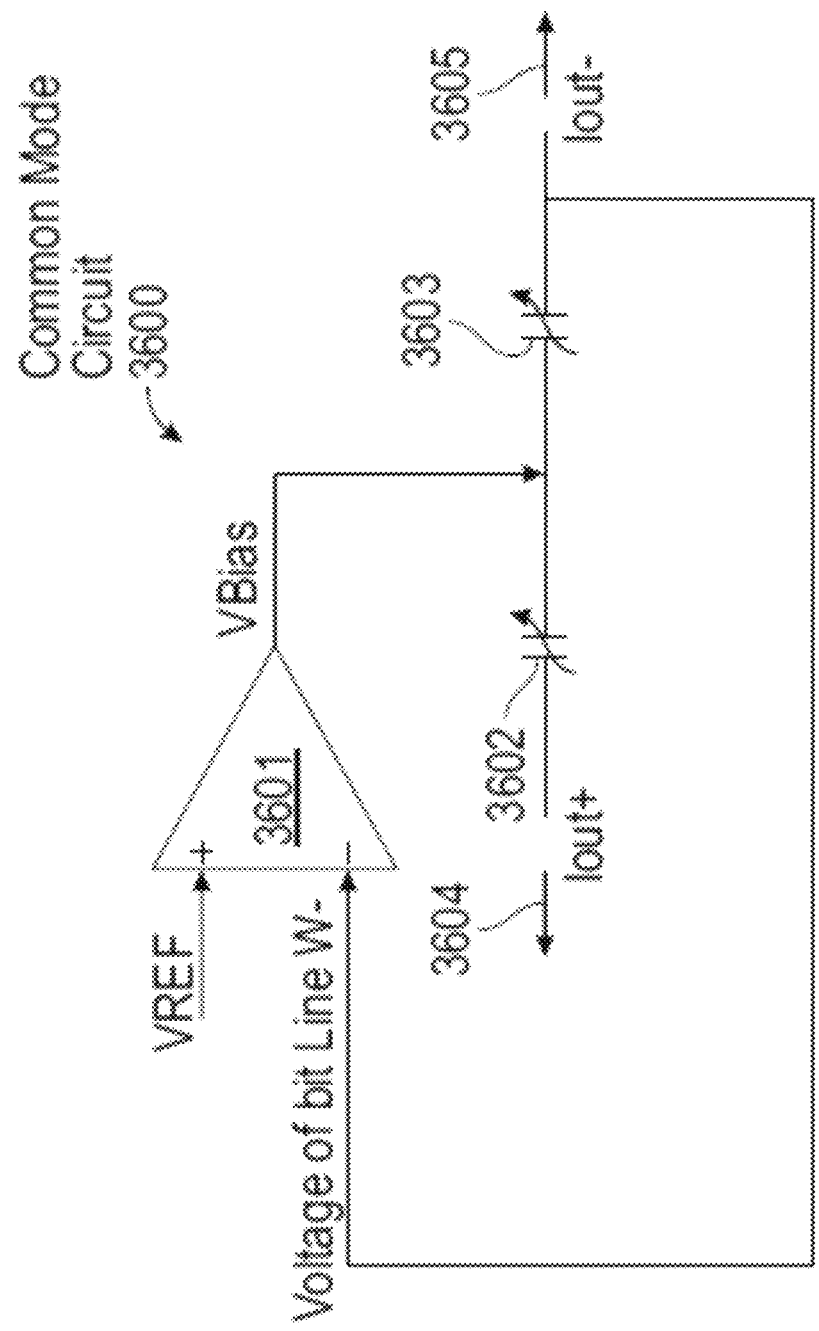
FIG. 36 depicts a common mode circuit for current-to-voltage converters.

FIG. 36 depicts common mode circuit 3600, which comprises operational amplifier 3601 (which is an example of a regulating circuit), variable capacitor 3602, variable capacitor 3603, node 3604 (which corresponds to nodes 2905, 3005, and 3107 in FIGS. 29, 30, and 31), and node 3605 (which corresponds to nodes 2906, 3006, and 3108 in FIGS. 29, 30, and 31). Vbias (a voltage bias) is applied at a node between variable capacitor 3602 and variable capacitor 3603. The current out of variable capacitors 3602 and 3603 are Iout+ and Iout−, respectively, where Iout+=Iout−. The variable capacitors are set during a configuration mode to ensure that the voltages at nodes 3604 and 3605 are equal, which will also cause Iout+ and Iout− to be equal. Operational amplifier 3601 receives voltage VCIMREF as an input on its non-inverting input and the voltage of node 3605 on its inverting input. Due to the high input impedance of operational amplifier 3601, no current flows from node 3605 (or the bitline W−) into operational amplifier 3601. Operational amplifier 3601 generates voltage output Vbias and will modify Vbias until the voltage of bitline W−, which is the voltage at node 3605, equals VCIMREF.

Figure 37:
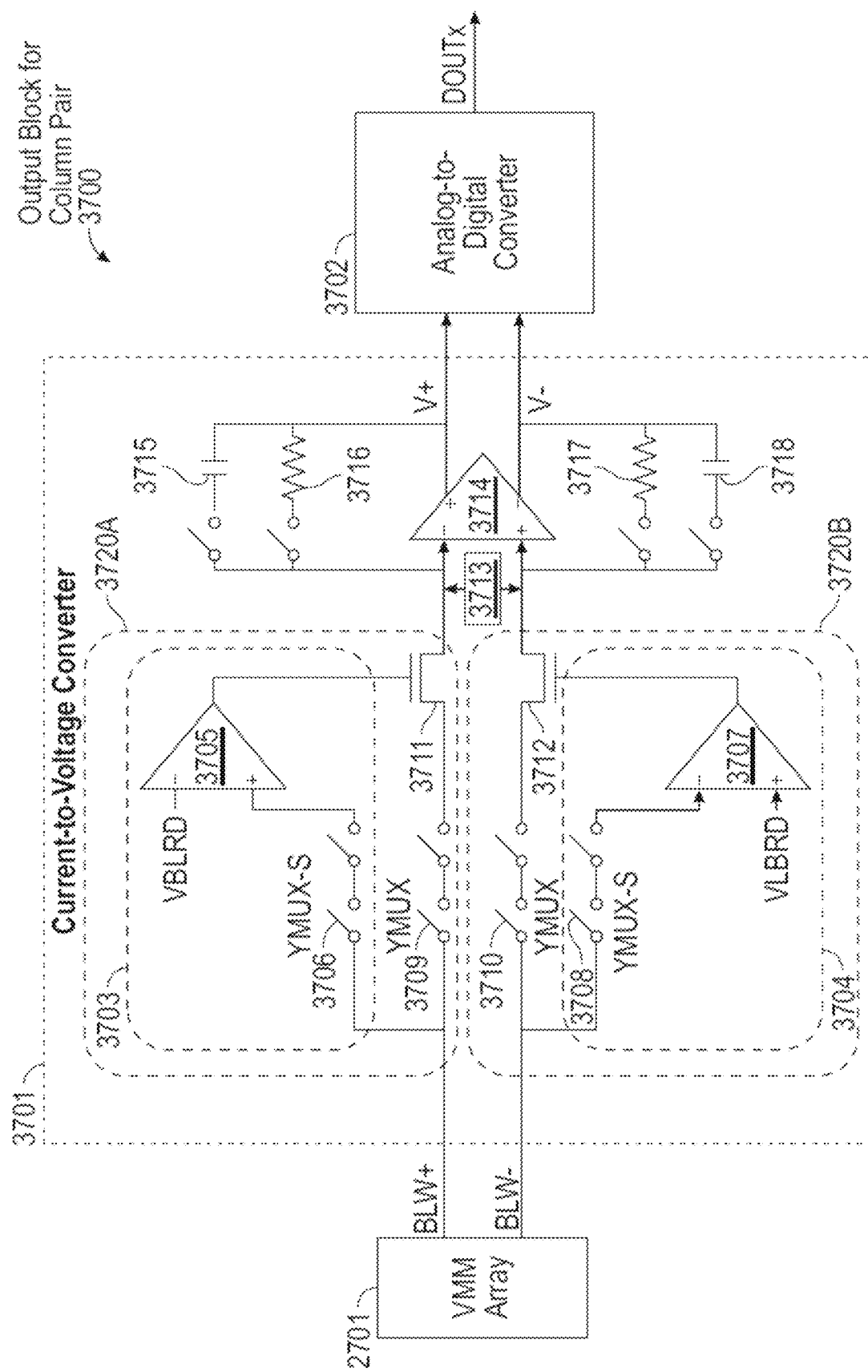
FIG. 37 depicts a current-to-voltage converter.

FIG. 37 depicts an example output block for column pair 3700. Only one output block for column pair 3700 is shown, but it is to be understood that an instantiation of output block for column pair 3700 would be used for each pair of columns in VMM array 2701. Output block for column pair 3700 receives current BLW+ (a first current) from one column and current BLW− (a second current) from another column in VMM array 2701 and generates DOUTx, a digital output.

Output block for column pair 3700 comprises current-to-voltage (ITV) converter 3701 and analog-to-digital converter (ADC) 3702. Current-to-voltage converter 3701 comprises regulator 3703 (a first regulator), regulator 3704 (a second regulator), common mode circuit 3713, switches 3709, switches 3710, NMOS transistor 3711, NMOS transistor 3712, operational amplifier (which may be referred to as opamp) (which is an example of a regulating circuit) 3714, switched capacitor 3715 (a first capacitor), switched resistor 3716 (a first resistor), switched resistor 3717 (a second resistor), and switched capacitor 3718 (a second capacitor). Operational amplifier 3713 comprises a first input terminal, a second input terminal, a first output terminal, and a second output terminal, the first output terminal and the second output terminal providing the differential voltages.

Switched capacitors 3715 and 3718 may be variable capacitors or fixed capacitors. Switched resistors 3716 and 3717 may be variable resistors or fixed resistors. Optionally, switched capacitors 3715 and 3718 can be removed. Optionally, switched resistors 3716 and 3717 can be removed. Regulator 3703 comprises switches 3706 and operational amplifier 3705 (which is an example of a regulating circuit). Regulator 3704 comprises switches 3708 and operational amplifier 3707 (which is an example of a regulating circuit). BL+ regulation circuit 3720A comprises regulator 3703, switches 3709, and NMOS transistor 3711. BL− regulation circuit 3720B comprises regulator 3704, switches 3710, and NMOS transistor 3712.

For the circuit path connecting bitline BL+ (a first bitline), the switches 3709 and 3706 are portions of a column multiplexor that multiplexes the bitlines from VMM array 2701 into the current-to-voltage converter 3701. Specifically, the column multiplexor selects bitline BL+ by closing switches 3706 and 3709. A conventional column multiplexor only uses the equivalent of switches 3709 which conduct the bitline current from VMM array 2701 to the current-to-voltage converter 3701 (which may also be known as an output circuit, or a sensing circuit). The example shown here adds switches 3706 which is part of a sensing multiplexor (YMUX-S) that carries no current due to the high impedance of operational amplifier 3705. Under this configuration switches 3706 and 3709 will have the same voltage but switches 3709 will carry current while switches 3706 will not carry current. When switches 3706 and 3709 are closed, the voltage of the bitline will initially be lower than VBLRD, which causes the output of operational amplifier 3705 to increase and turns on NMOS transistor 3711. The increase in voltage on the gate of NMOS transistor 3711 causes the voltage of the source of NMOS transistor 3711 to also increase until the voltage of the bitline equals VBLRD.

For the circuit path connecting bitline BL− (a second bitline), the switches 3710 and 3708 are portions of a column multiplexor that multiplexes the bitlines from VMM array 2701 into the current-to-voltage converter 3701. Specifically, the column multiplexor selects bitline BL− by closing switches 3708 and 3710. A conventional column multiplexor only uses the equivalent of switches 3710 which conduct the bitline current from VMM array 2701 to the current-to-voltage converter 3701 (which may also be known as an output circuit, or a sensing circuit). The example shown here adds switches 3708 which is part of a sensing multiplexor (YMUX-S) that carries no current due to the high impedance of operational amplifier 3707. Under this configuration, switches 3708 and 3710 will have the same voltage but switches 3710 will carry current while switches 3708 will not carry current. When switches 3708 and 3710 are closed, the voltage of the bitline will initially be lower than VBLRD, which causes the output of operational amplifier 3707 to increase and turns on NMOS transistor 3712. The increase in voltage on the gate of NMOS transistor 3712 causes the voltage of the source of NMOS transistor 3712 to also increase until the voltage of the bitline equals VBLRD.

Alternatively, transistors 3711 and 3712 can be PMOS transistors instead of NMOS transistors.

Figure 1:
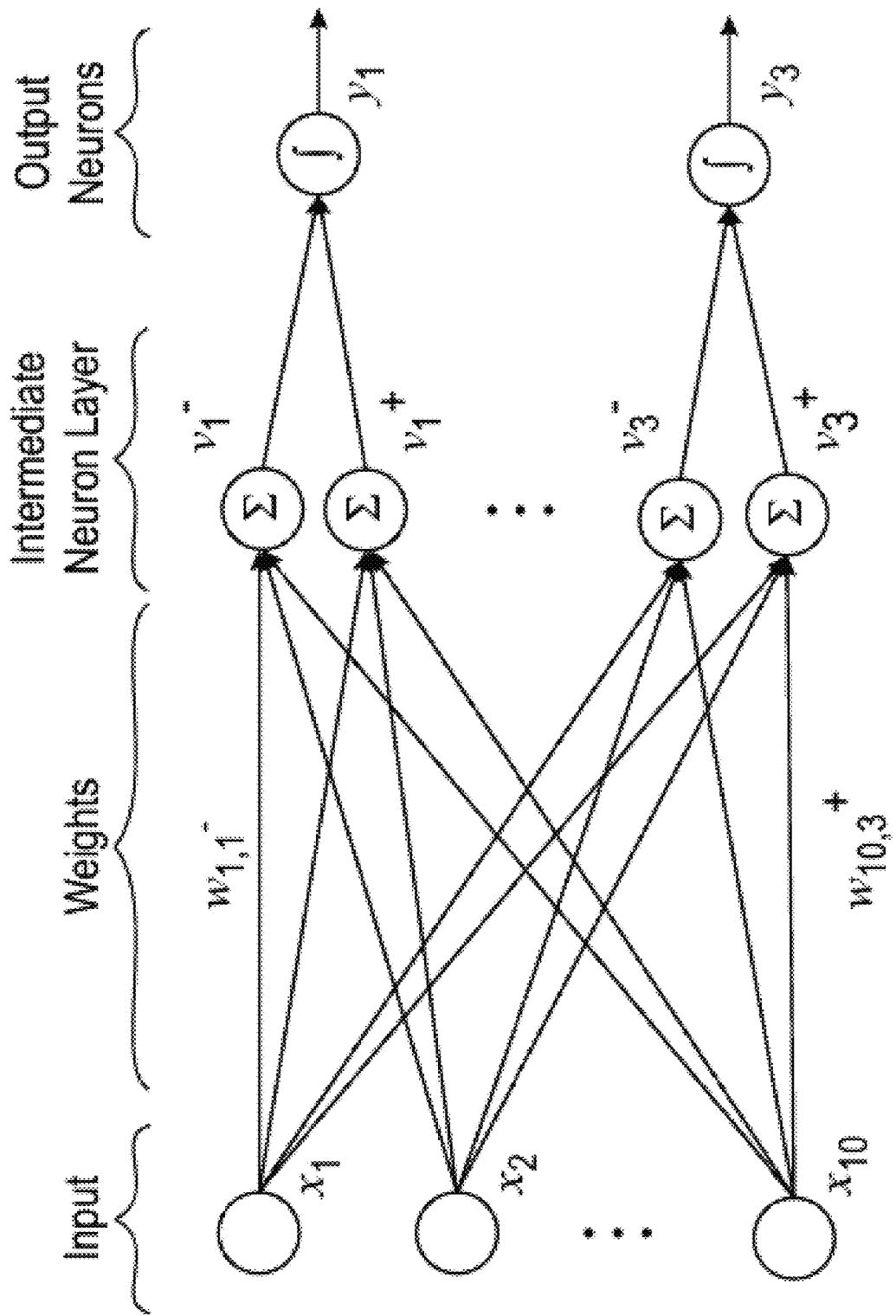
FIG. 1 is a diagram that illustrates an artificial neural network.
Figure 2:
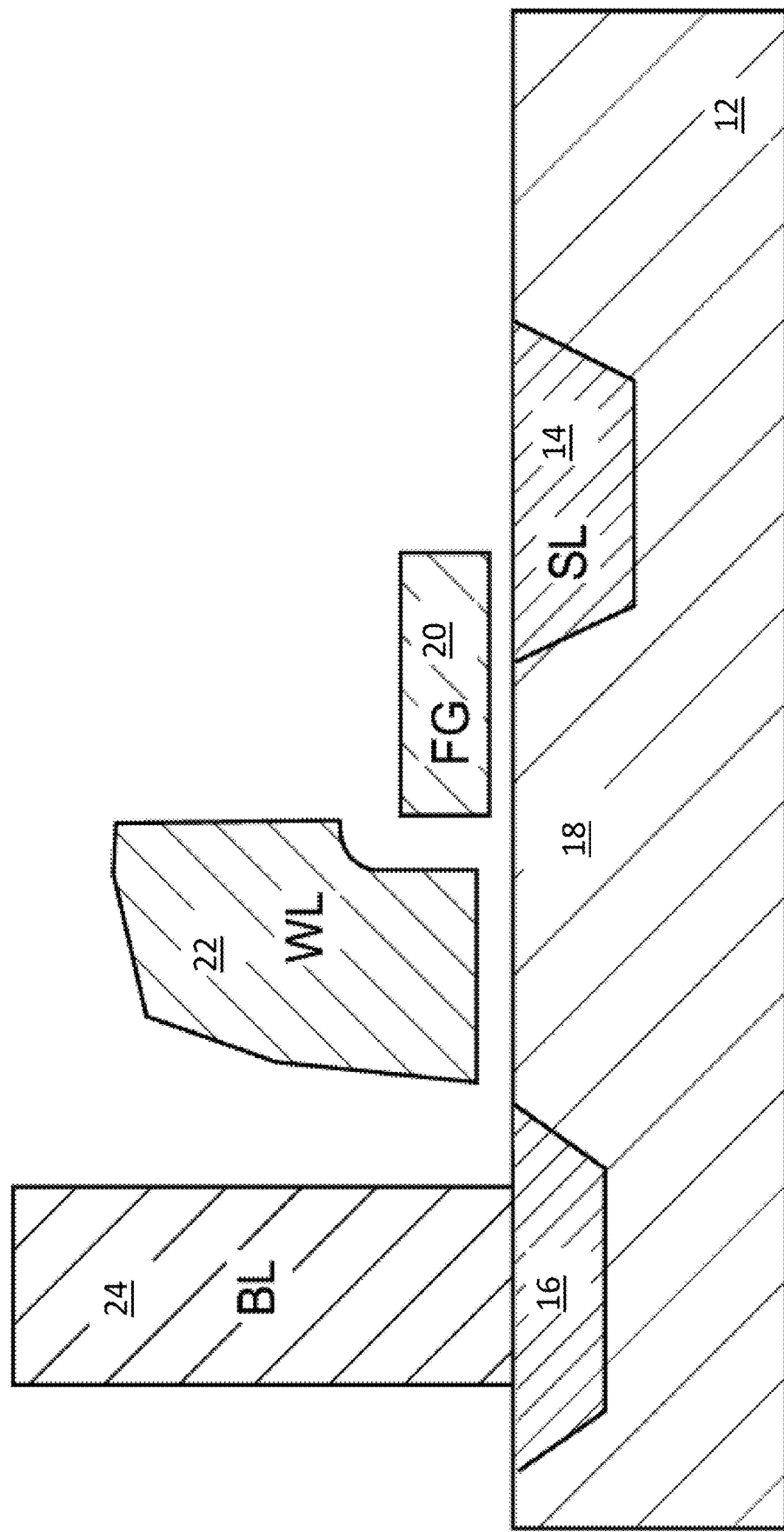
FIG. 2 depicts a prior art split gate flash memory cell.
Figure 3:
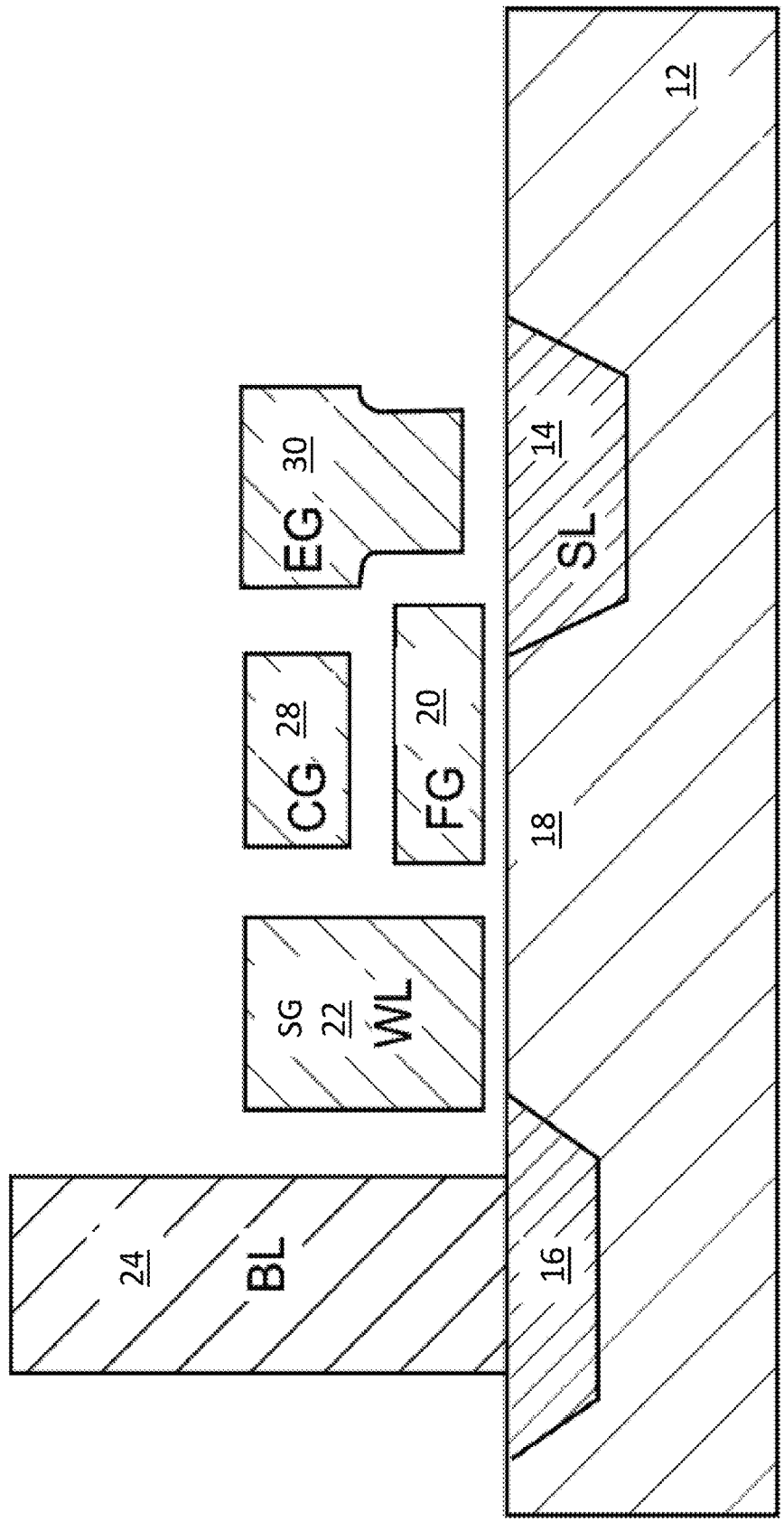
FIG. 3 depicts another prior art split gate flash memory cell.
Figure 4:
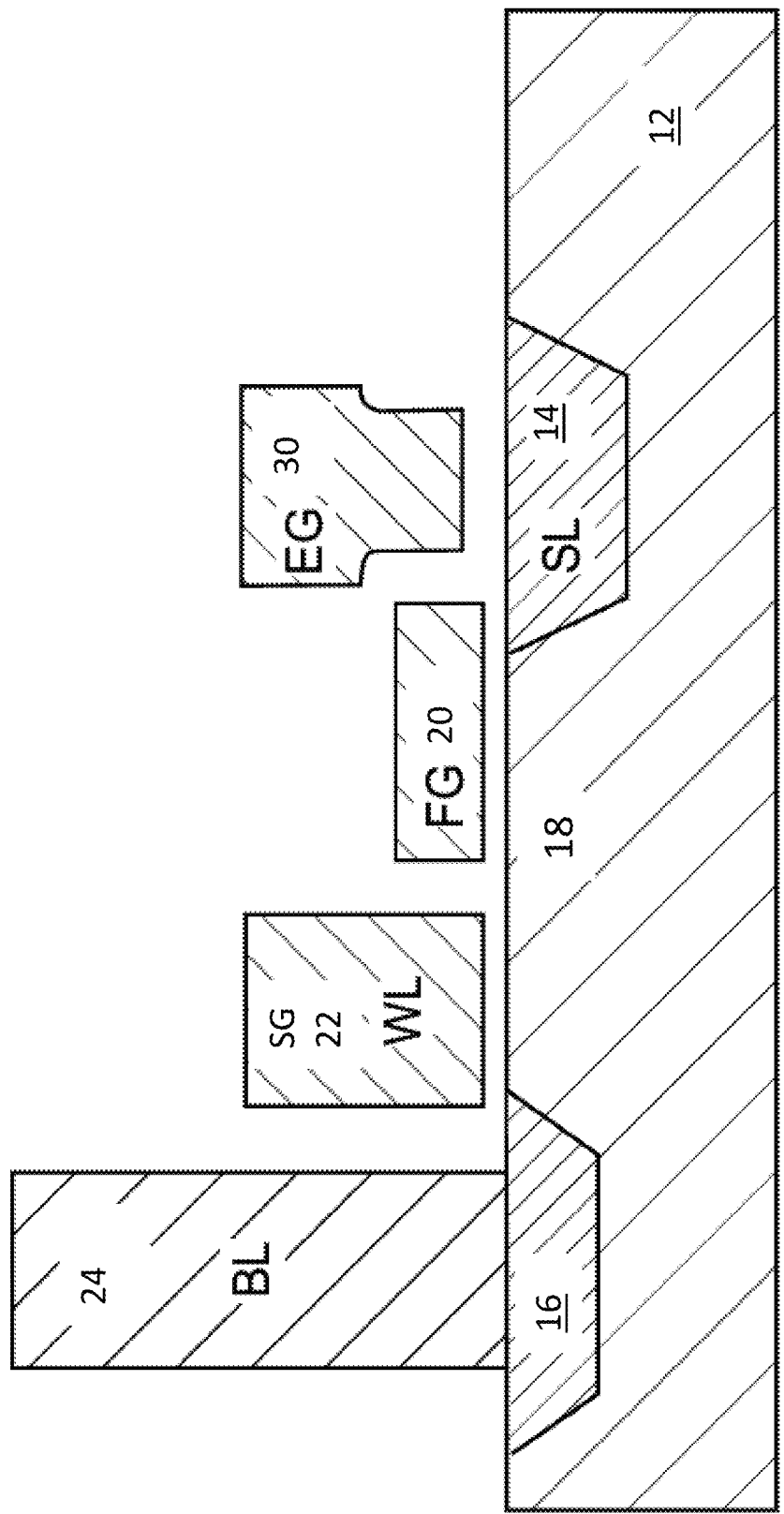
FIG. 4 depicts another prior art split gate flash memory cell.
Figure 5:
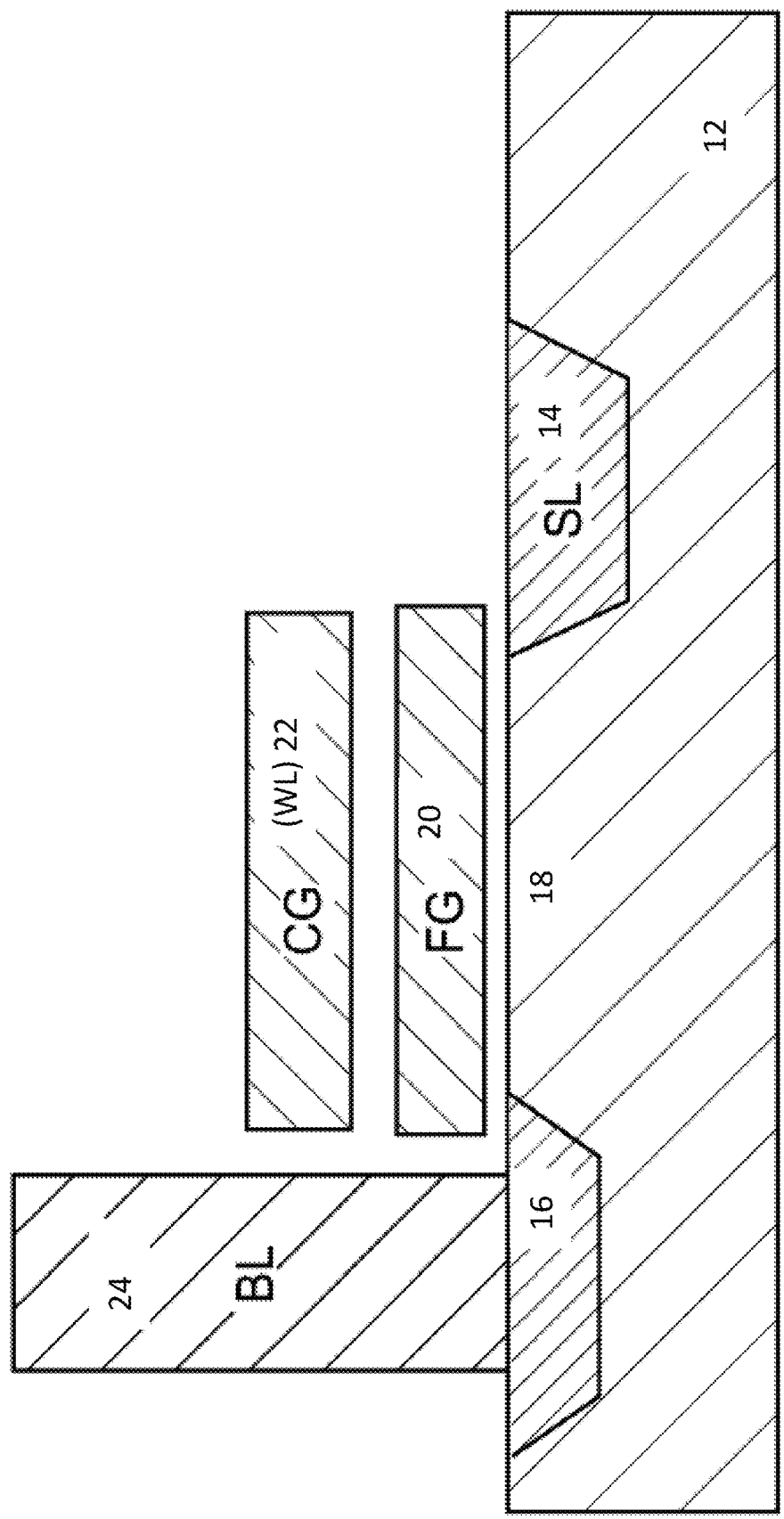
FIG. 5 depicts another prior art split gate flash memory cell.
Figure 6:
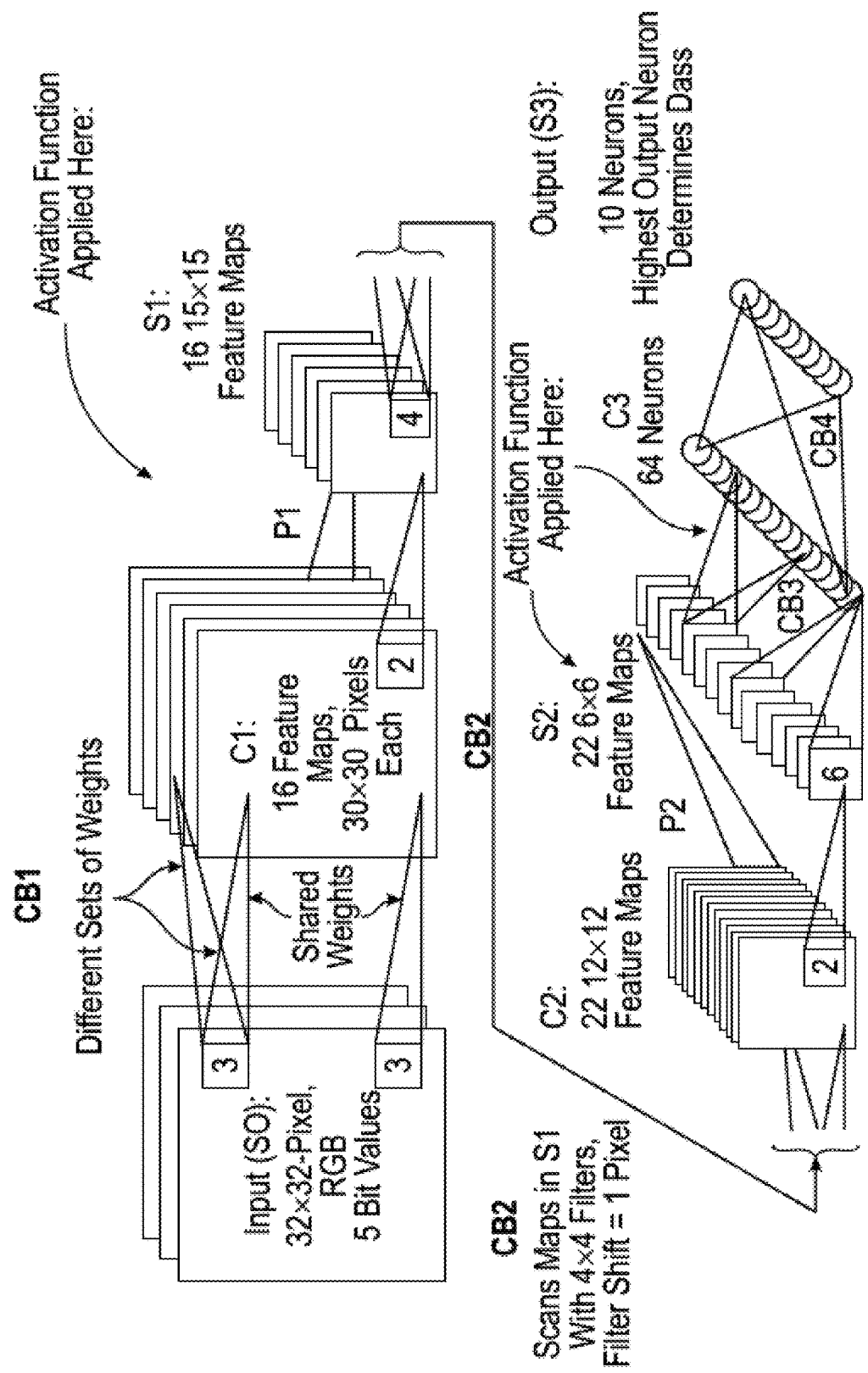
FIG. 6 is a diagram illustrating the different levels of an exemplary artificial neural network utilizing one or more non-volatile memory arrays.
Figure 7:
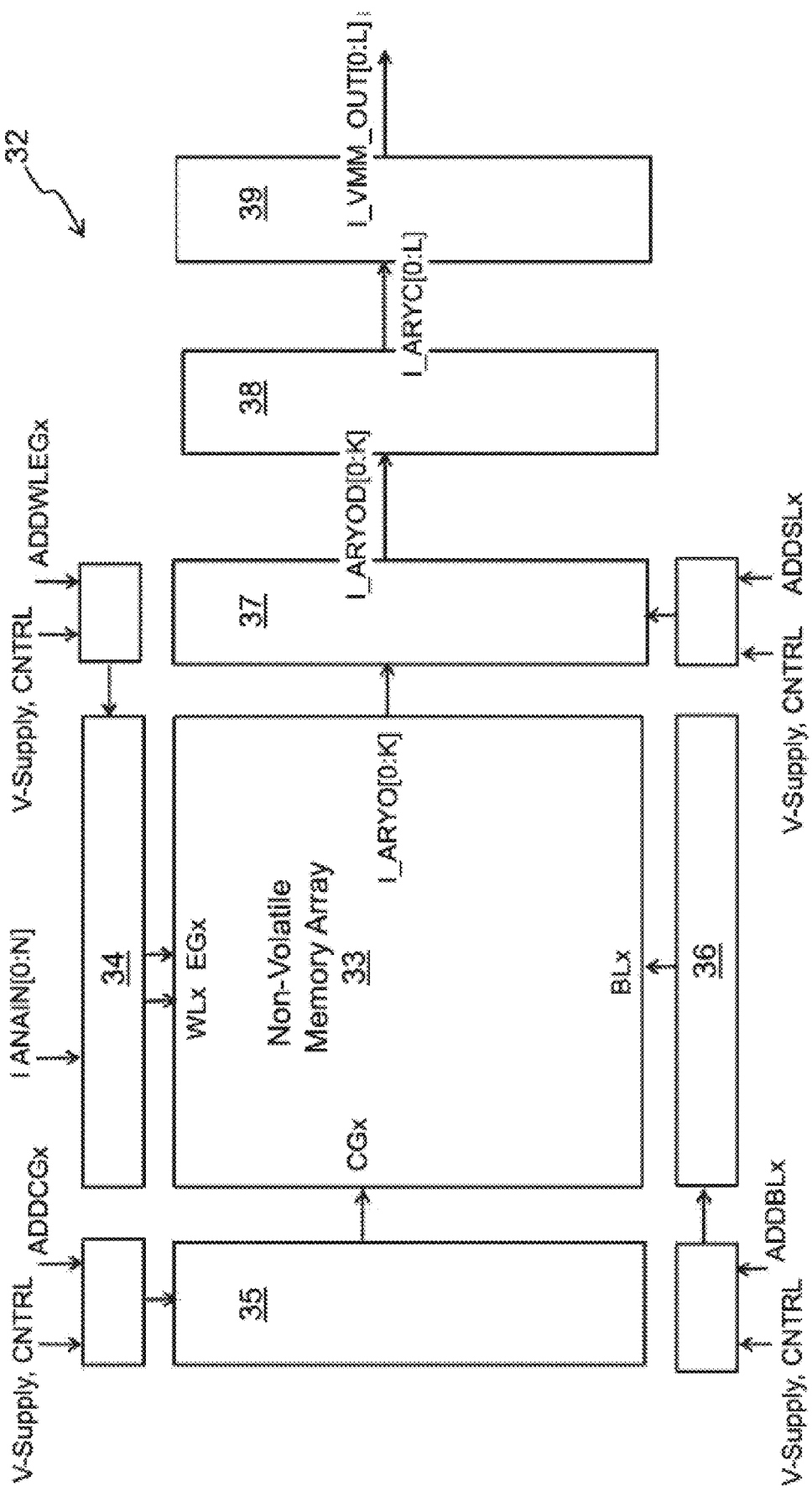
FIG. 7 is a block diagram illustrating a VMM system.
Figure 8:
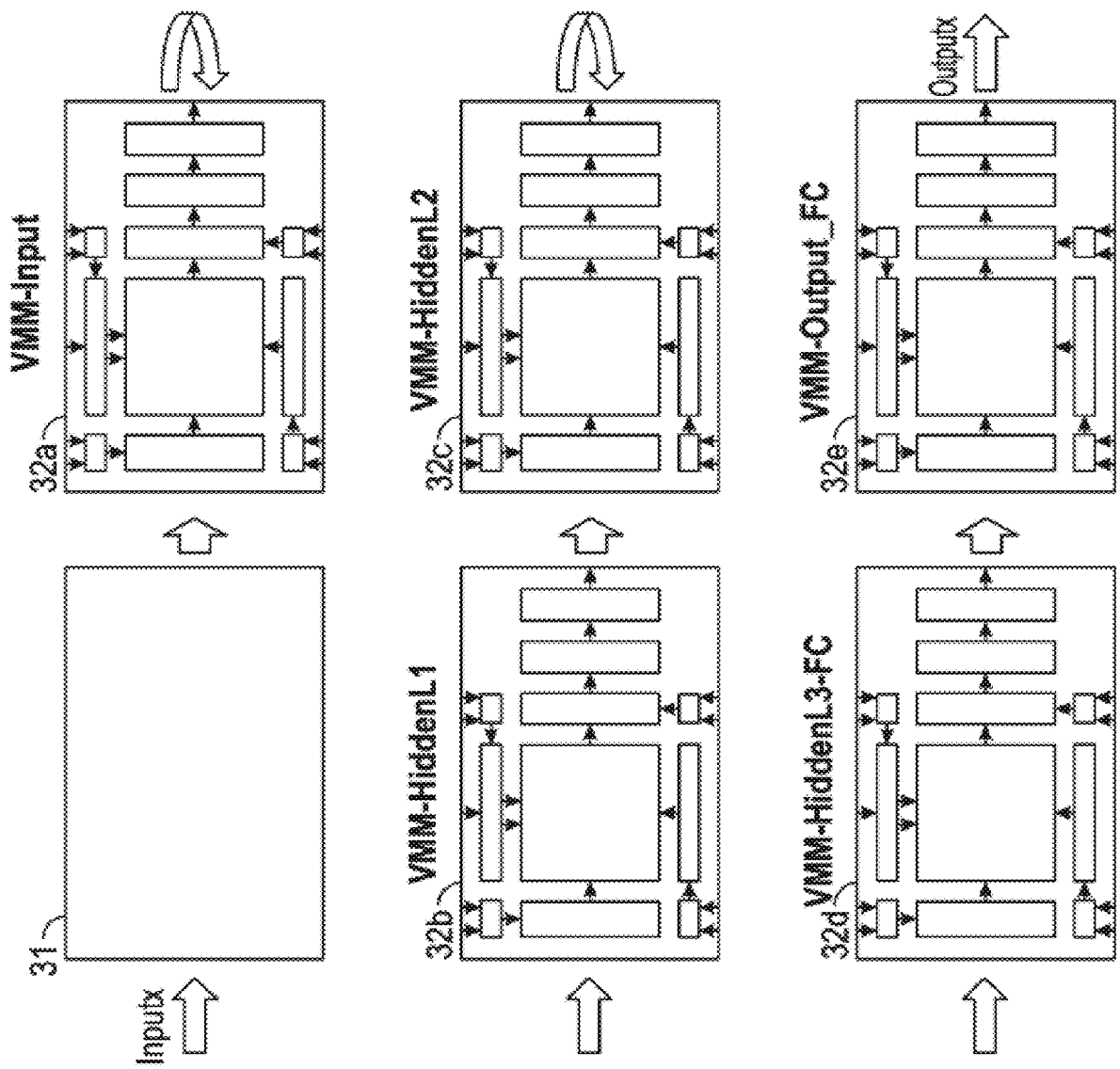
FIG. 8 is a block diagram illustrates an example artificial neural network utilizing one or more VMM systems.
Figure 9:
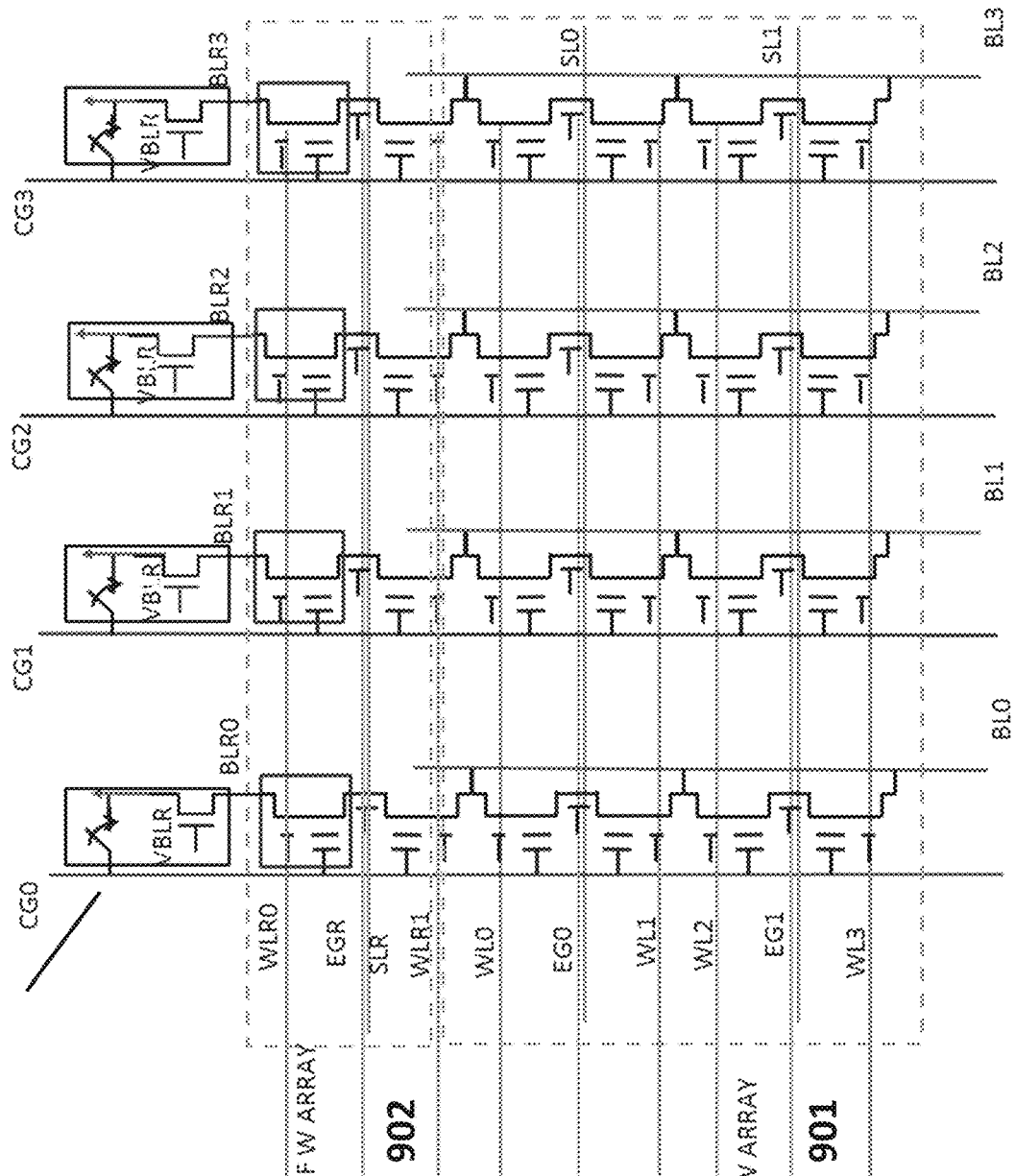
FIG. 9 depicts another example of a VMM system.
Figure 10:
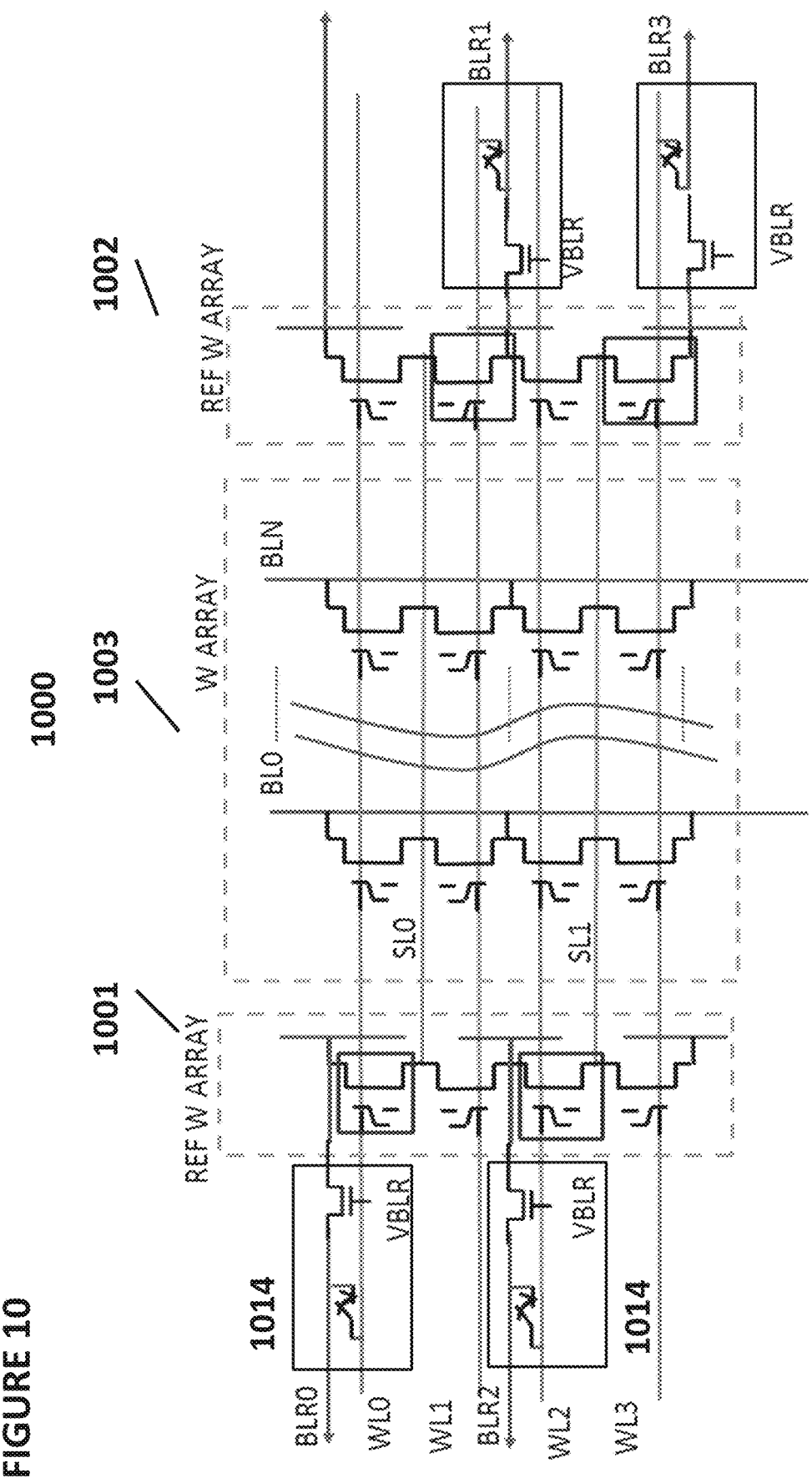
FIG. 10 depicts another example of a VMM system.
Figure 11:
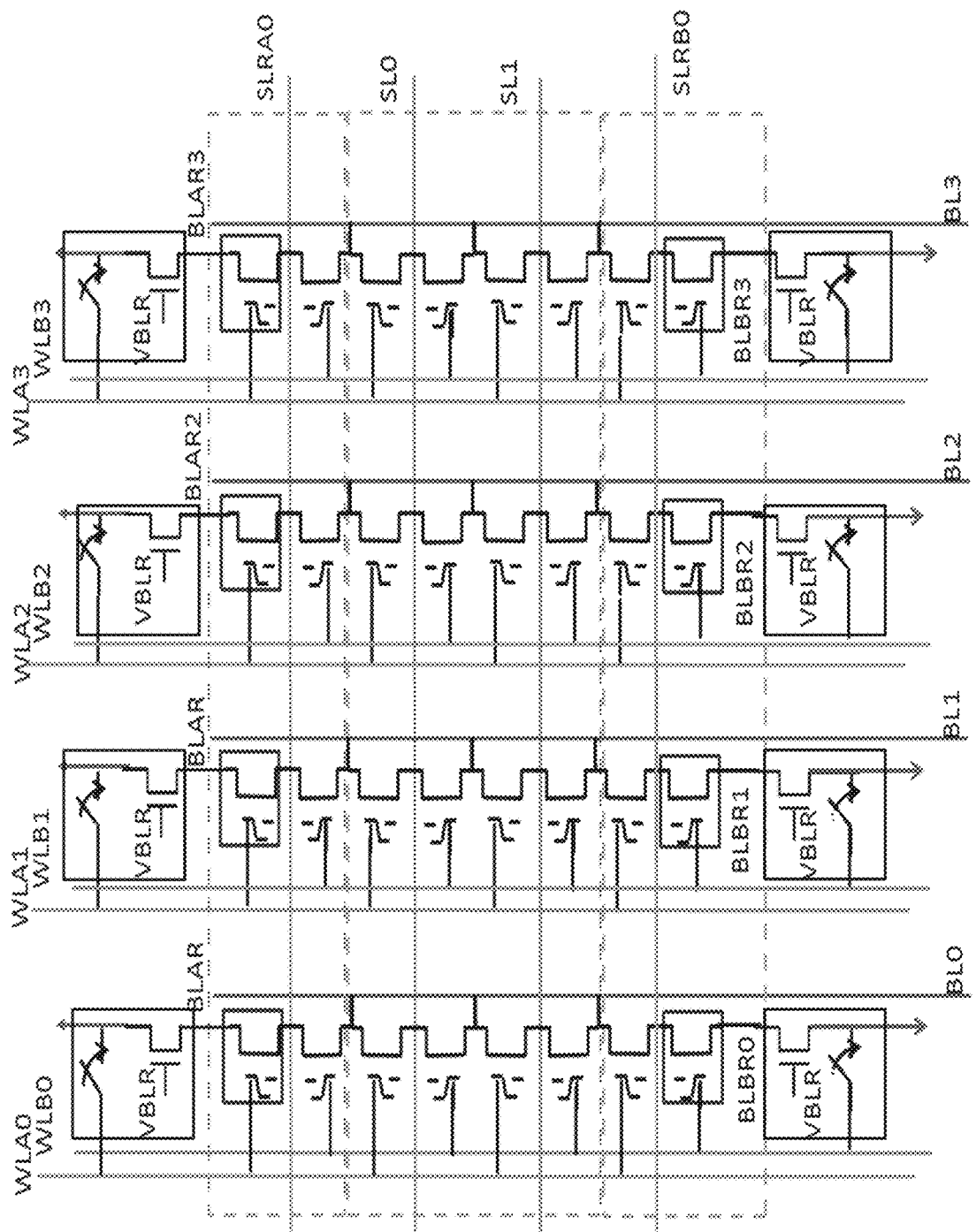
FIG. 11 depicts another example of a VMM system.
Figure 12:
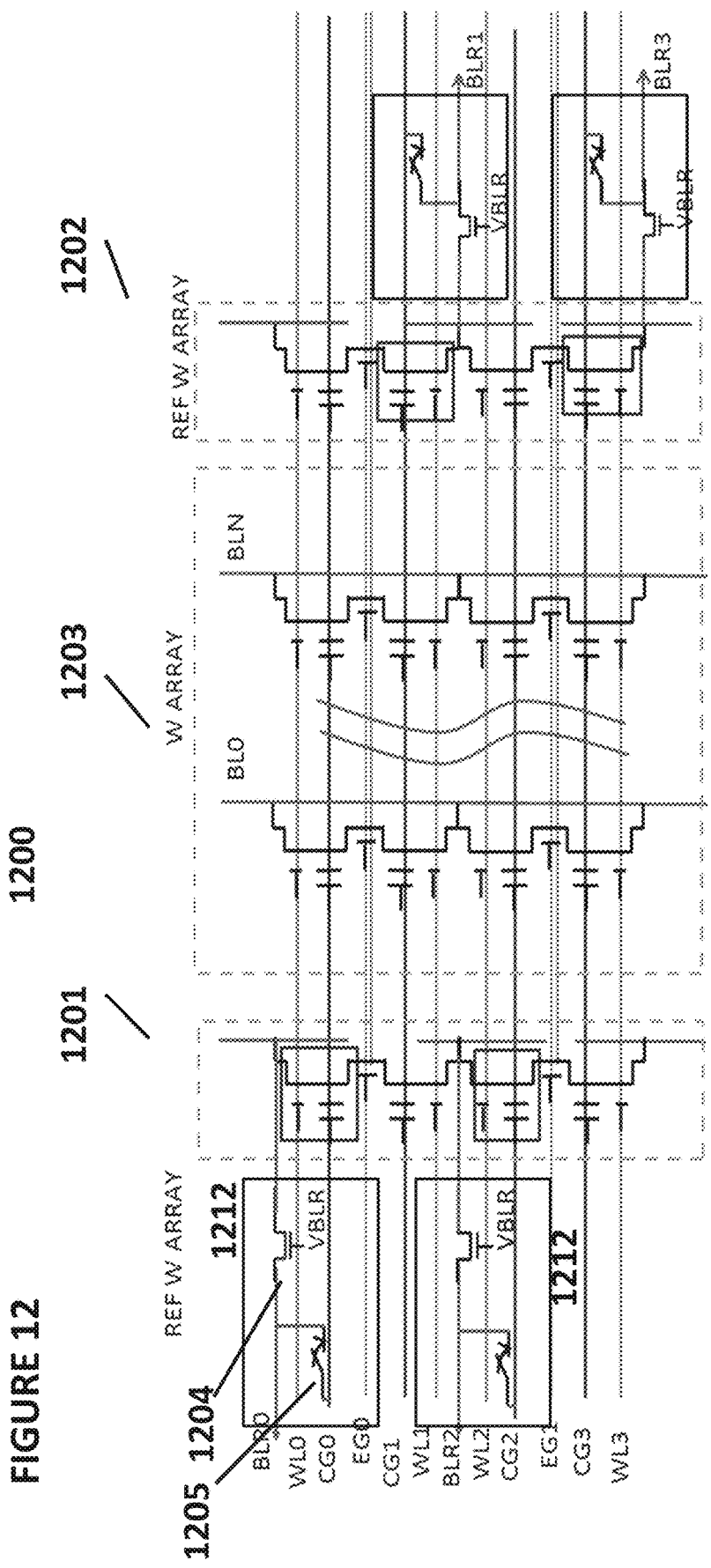
FIG. 12 depicts another example of a VMM system.
Figure 13:
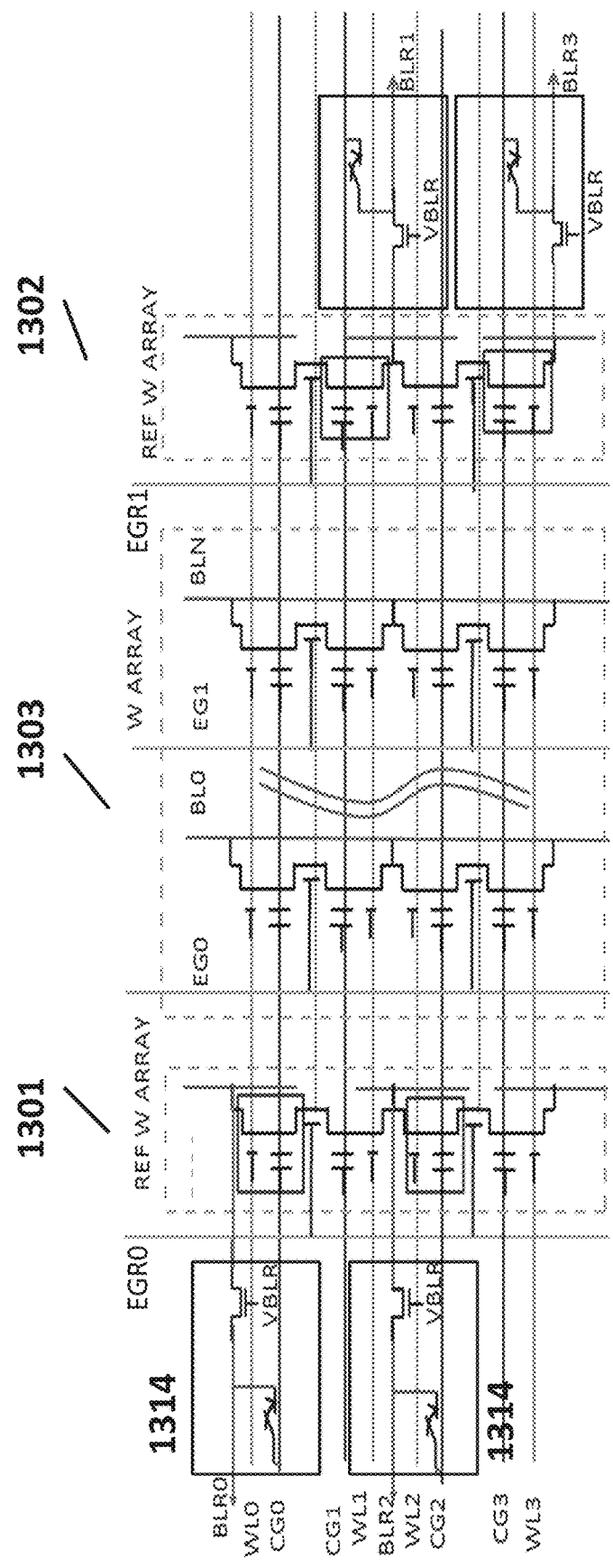
FIG. 13 depicts another example of a VMM system.
Figure 14:
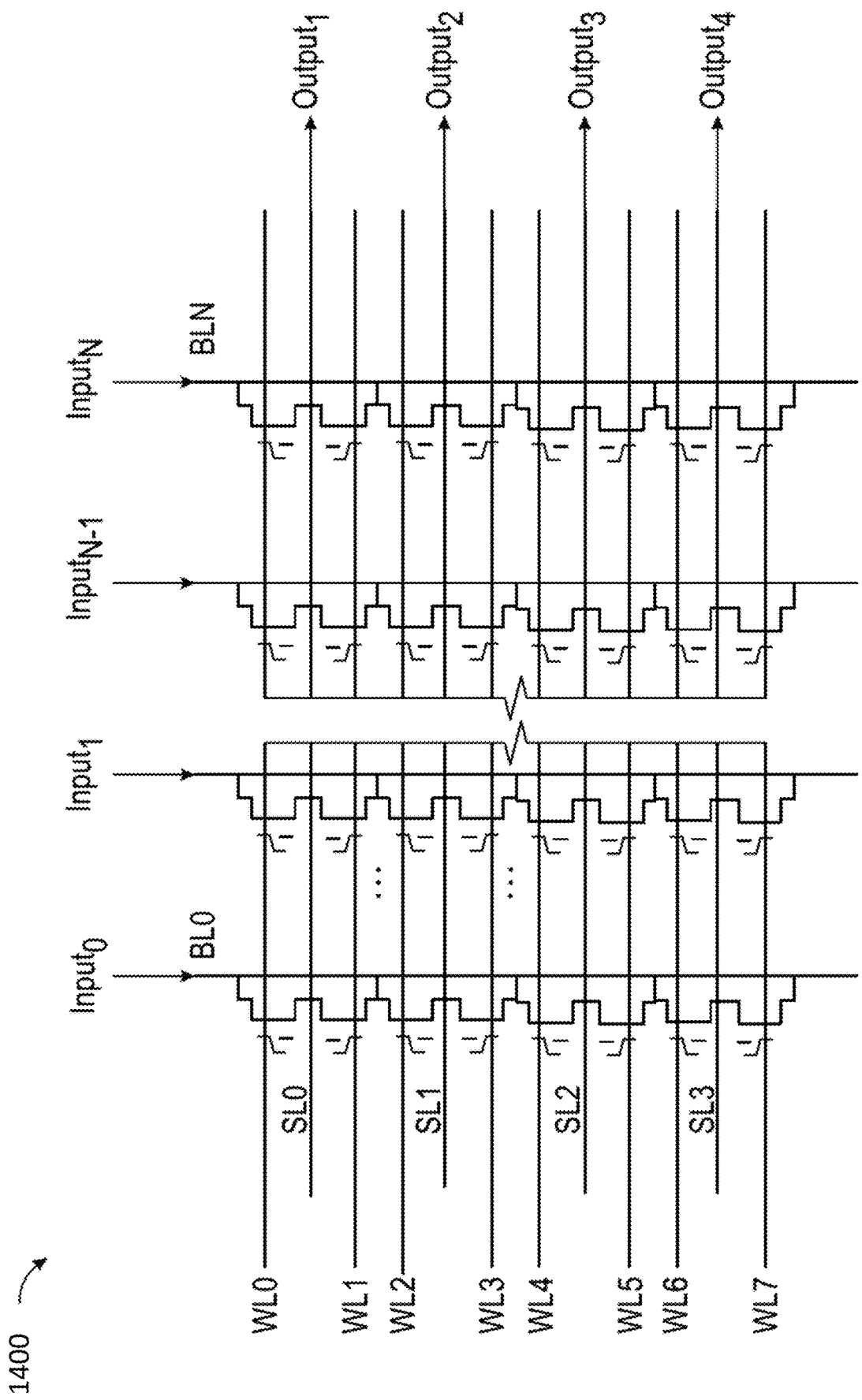
FIG. 14 depicts another example of a VMM array.
Figure 15:
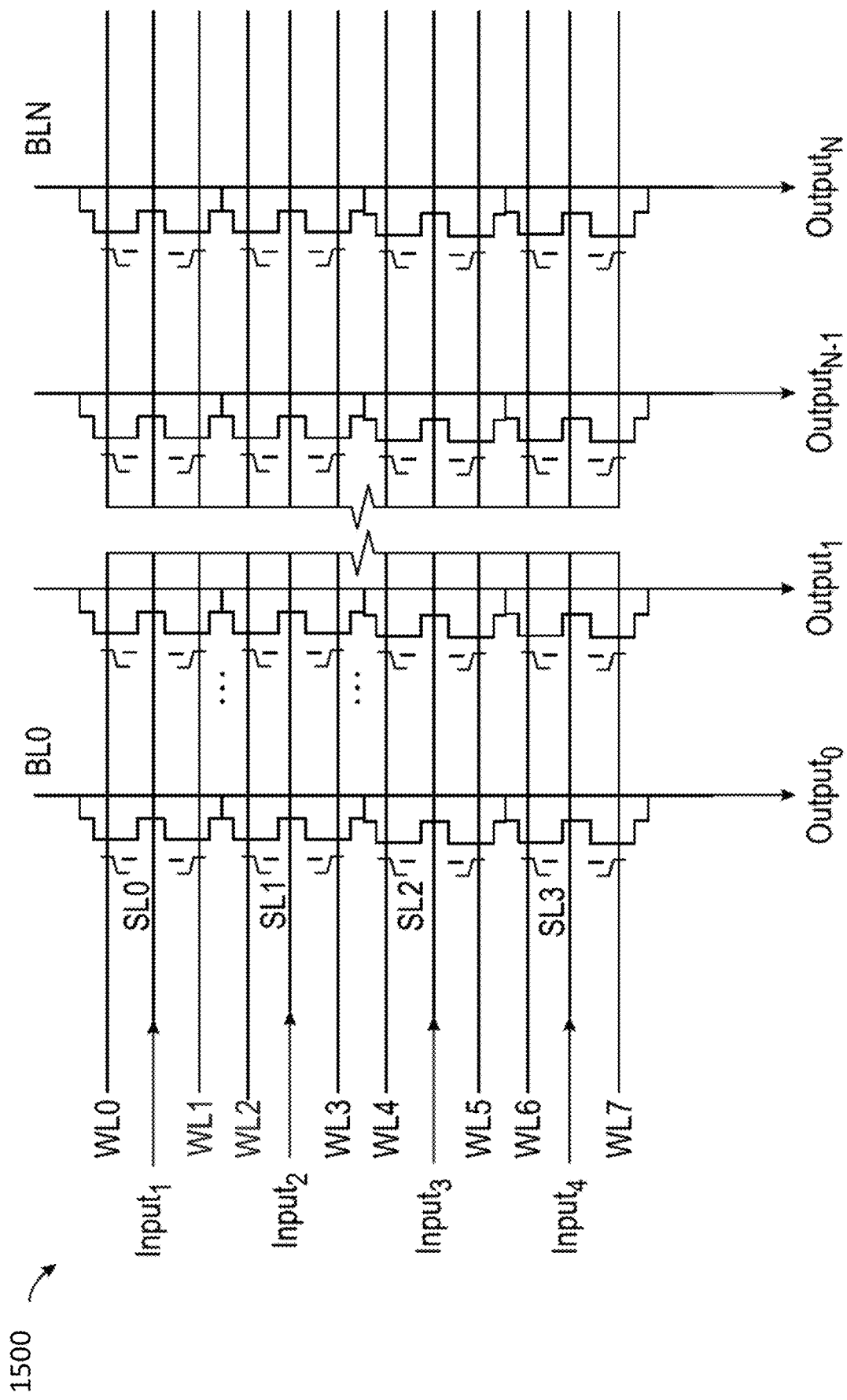
FIG. 15 depicts another example of a VMM array.
Figure 16:
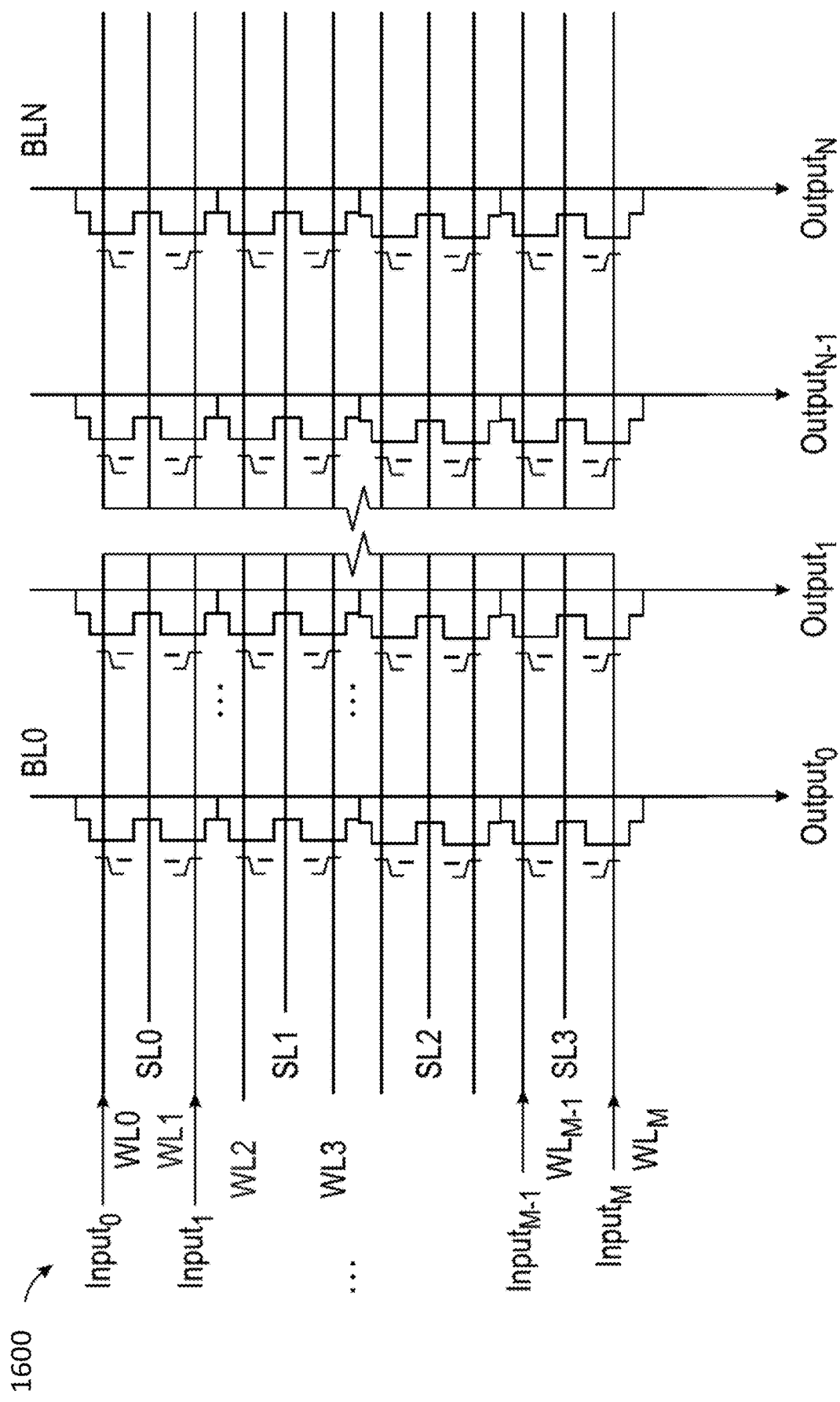
FIG. 16 depicts another example of a VMM array.
Figure 17:
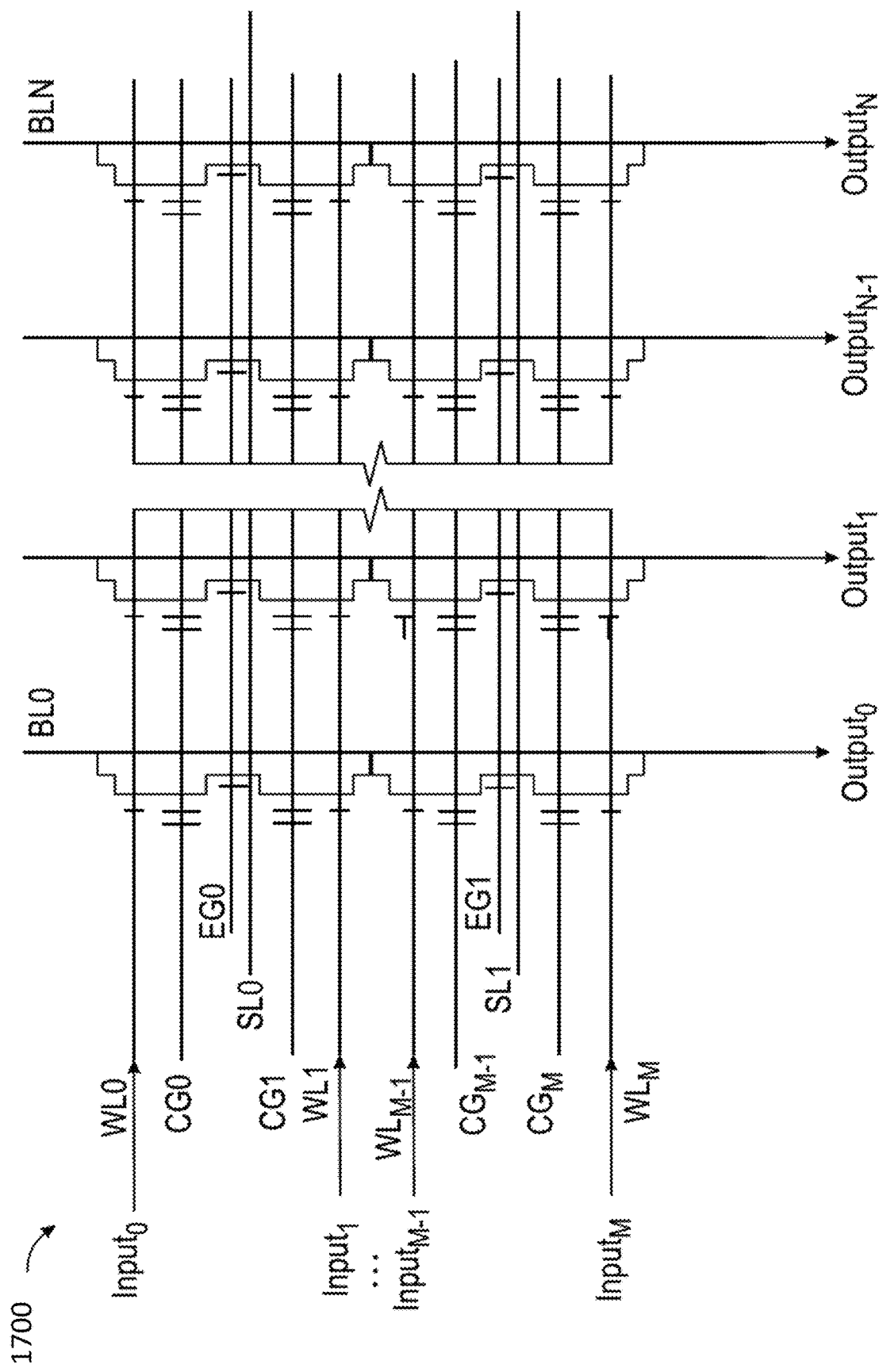
FIG. 17 depicts another example of a VMM array.
Figure 18:
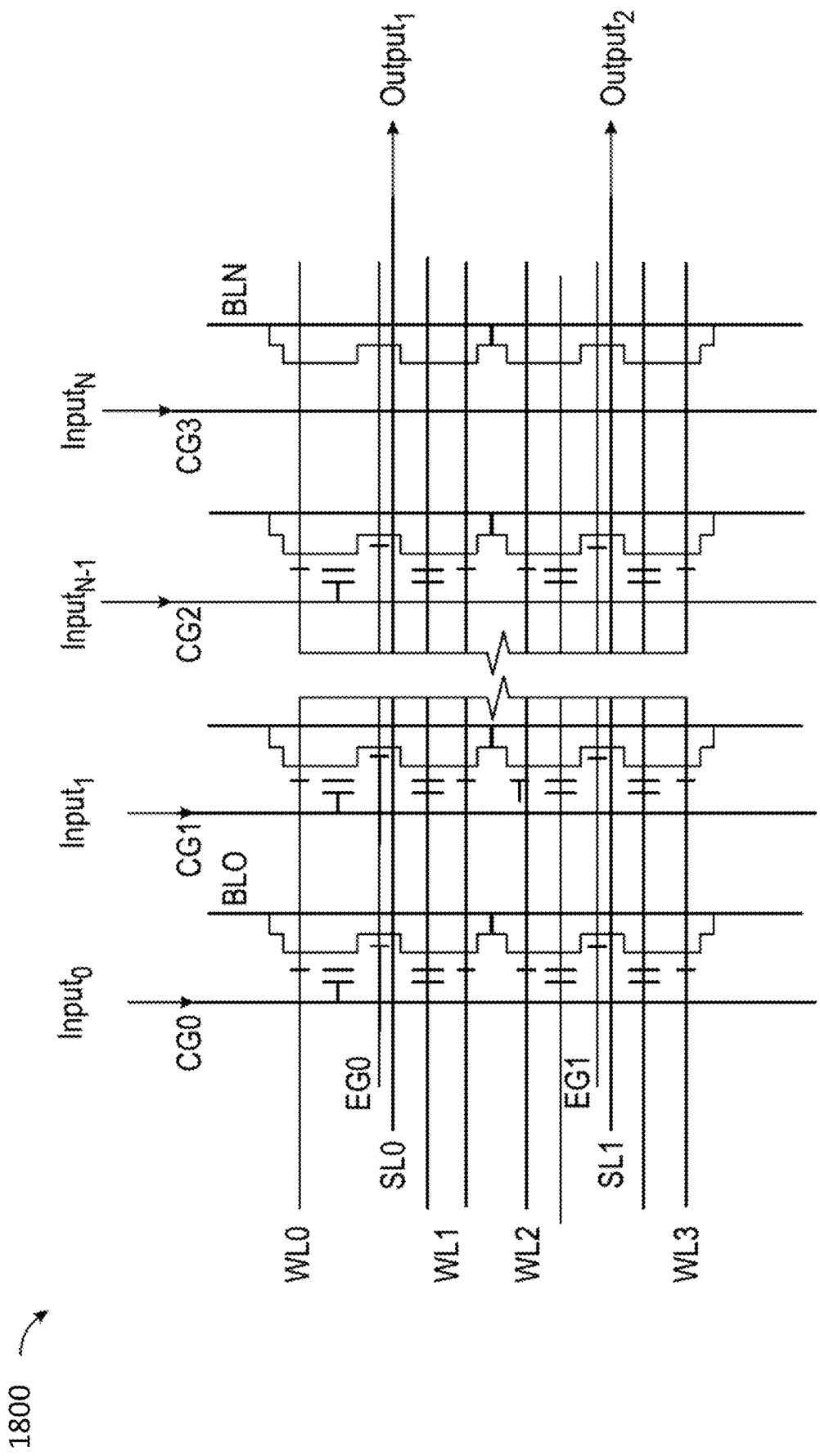
FIG. 18 depicts another example of a VMM array.
Figure 19:
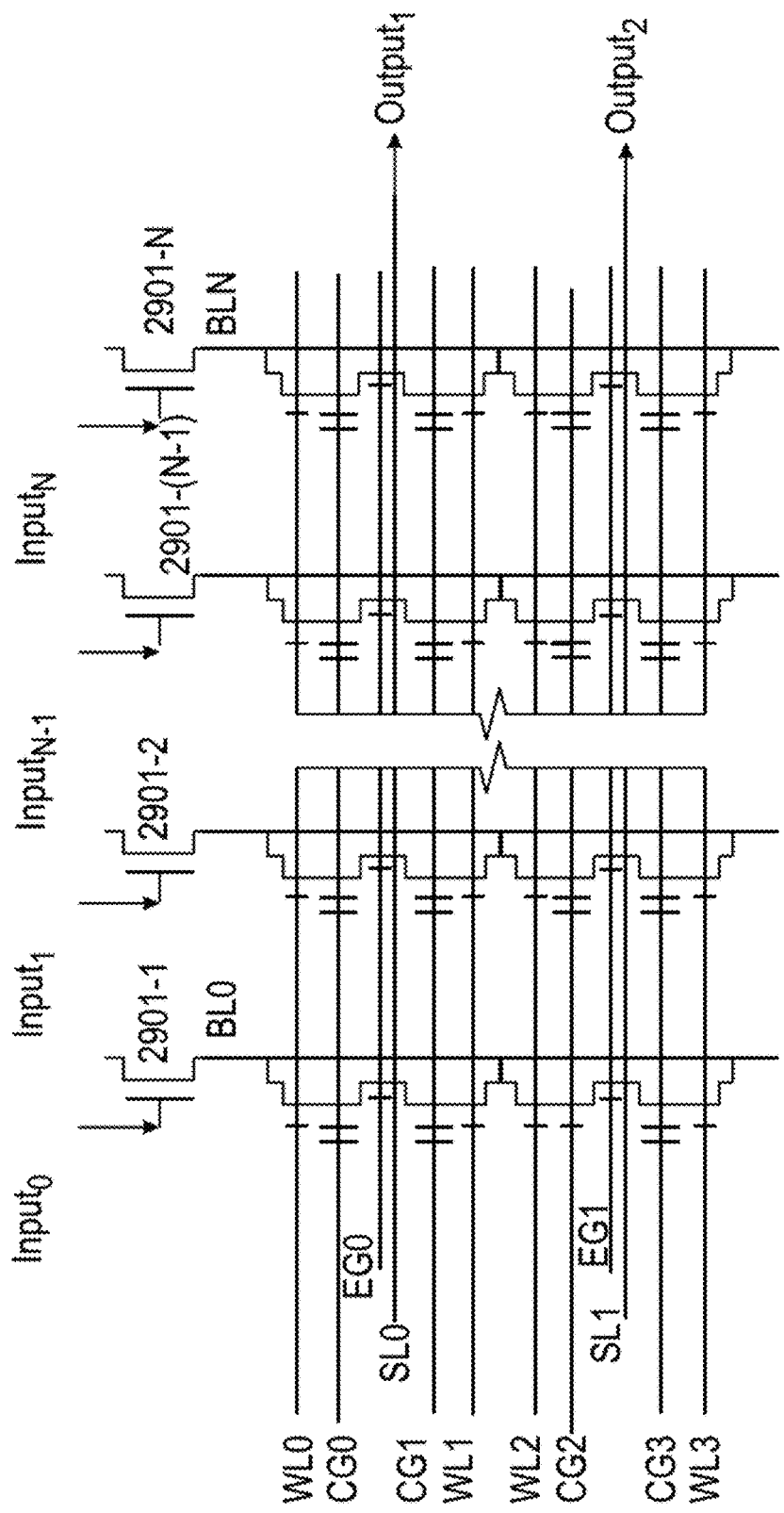
FIG. 19 depicts another example of a VMM system.
Figure 20:
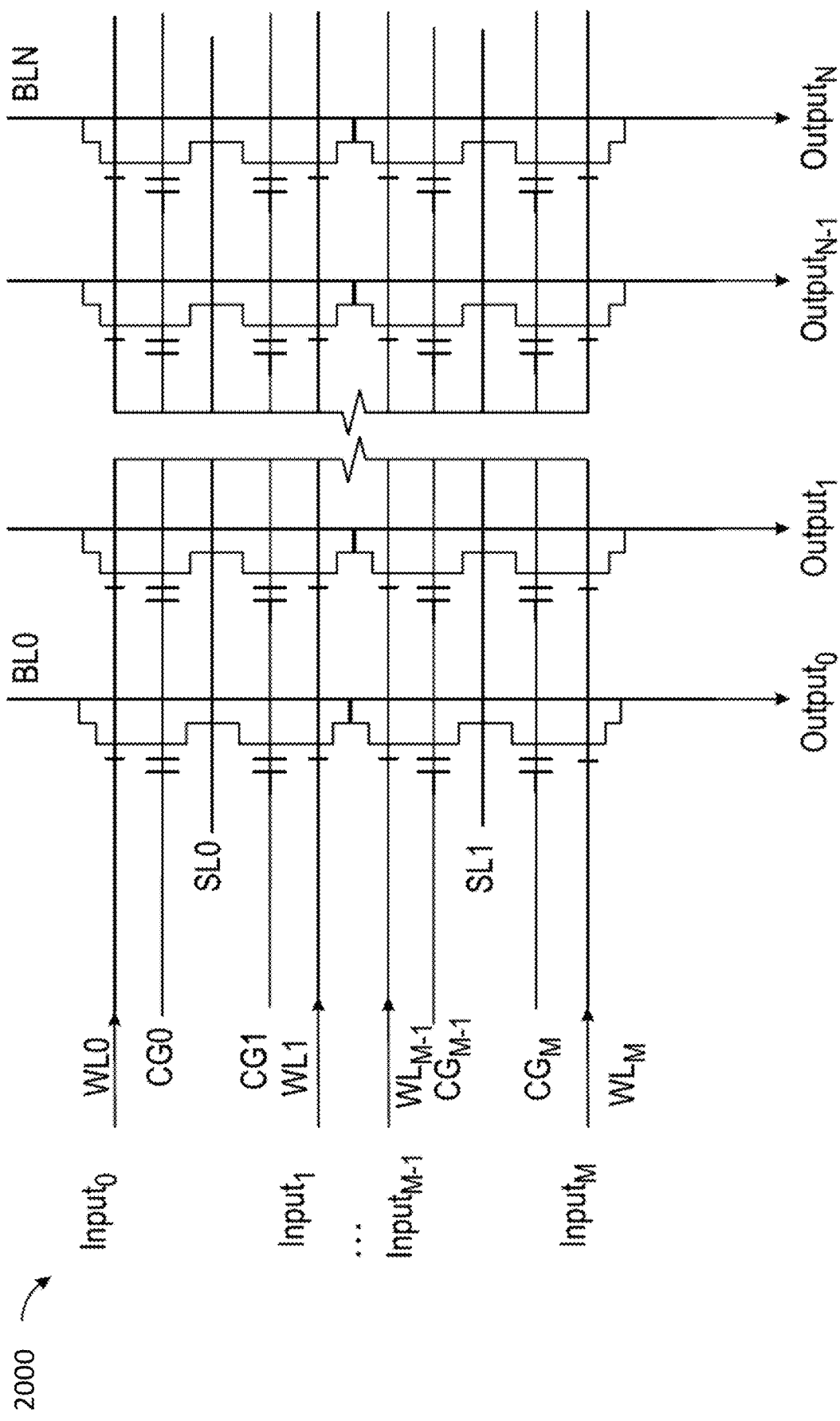
FIG. 20 depicts another example of a VMM array.
Figure 21:
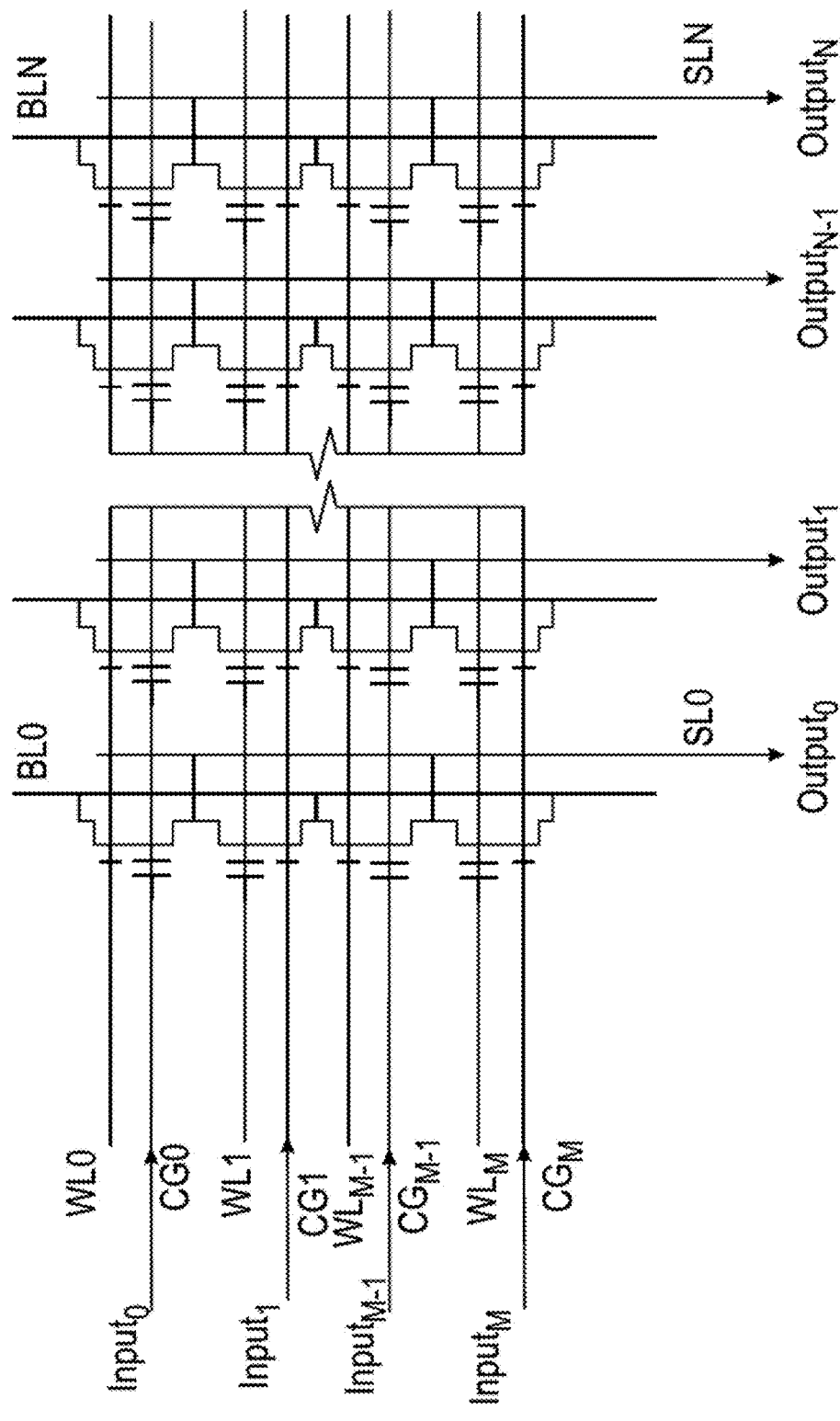
FIG. 21 depicts another example of a VMM array.
Figure 22:
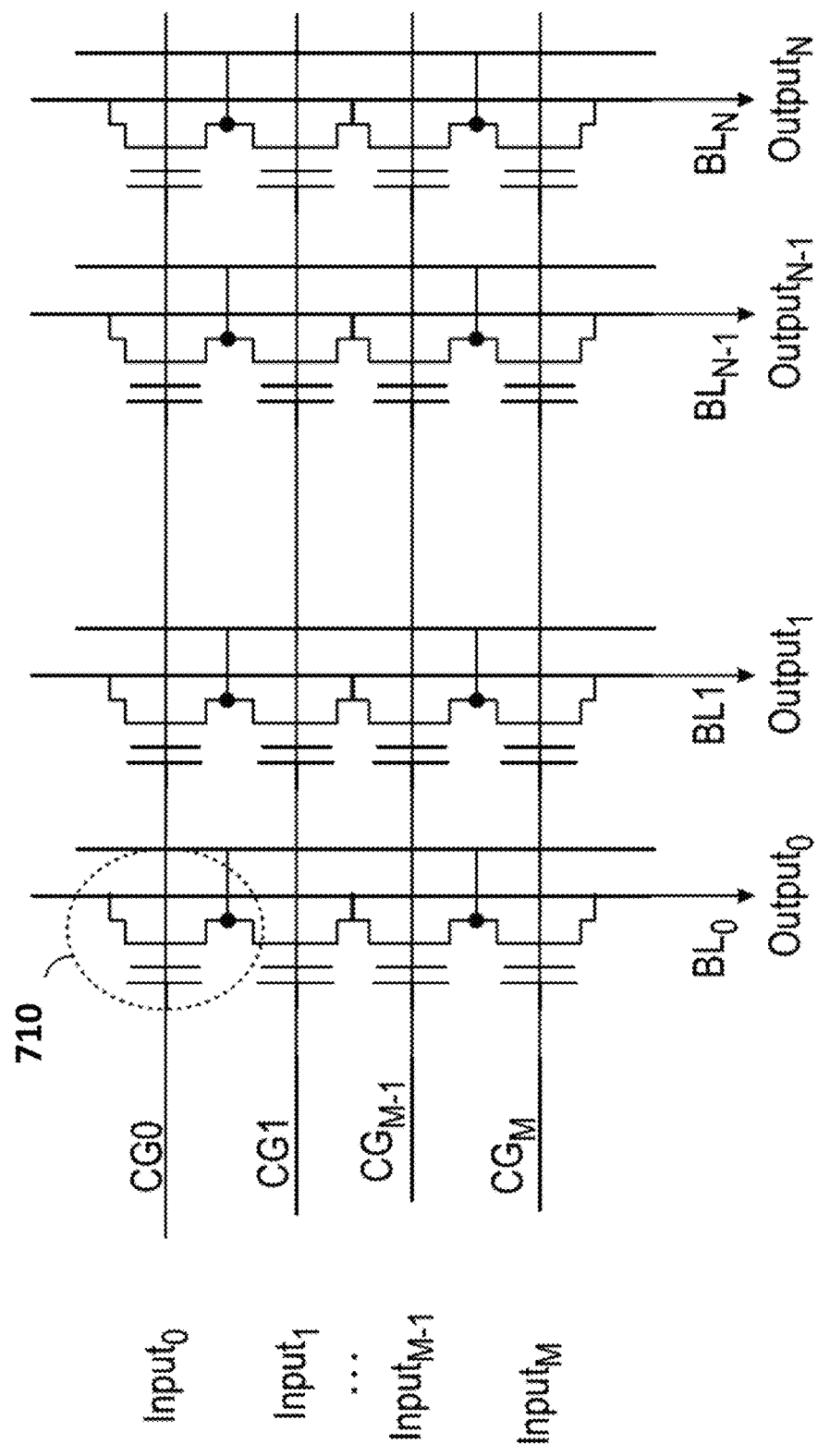
FIG. 22 depicts another example of a VMM array.
Figure 23:
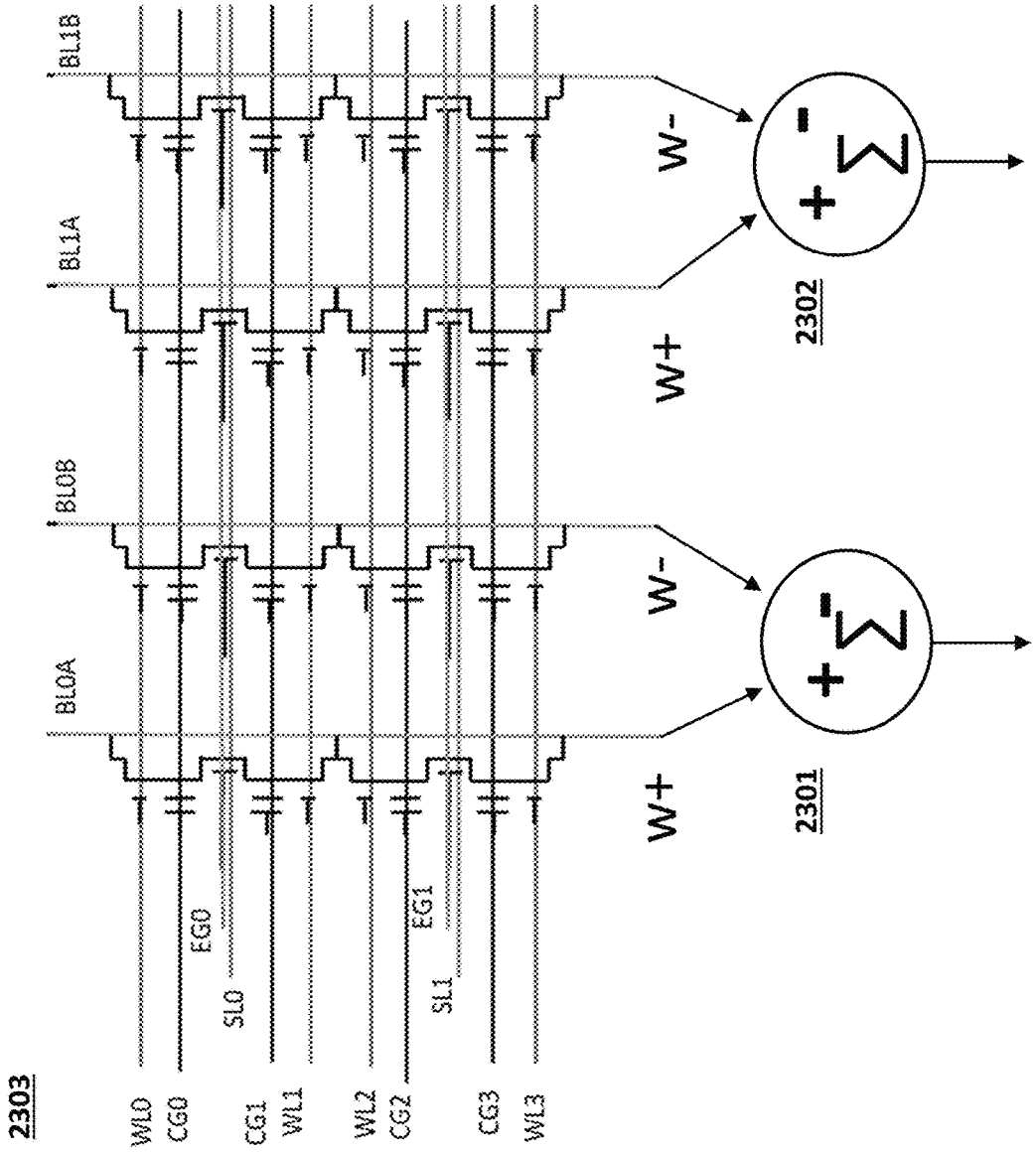
FIG. 23 depicts another example of a VMM system.
Figure 24:
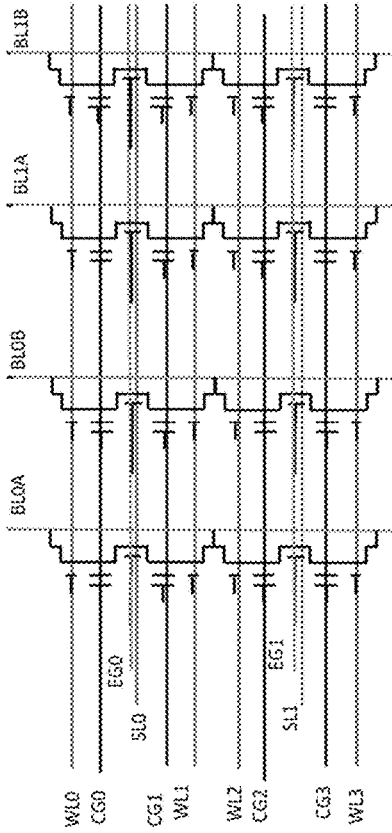
FIG. 24 depicts another example of a VMM system.
Figure 24:
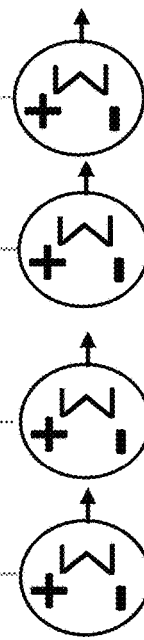
Figure 24:
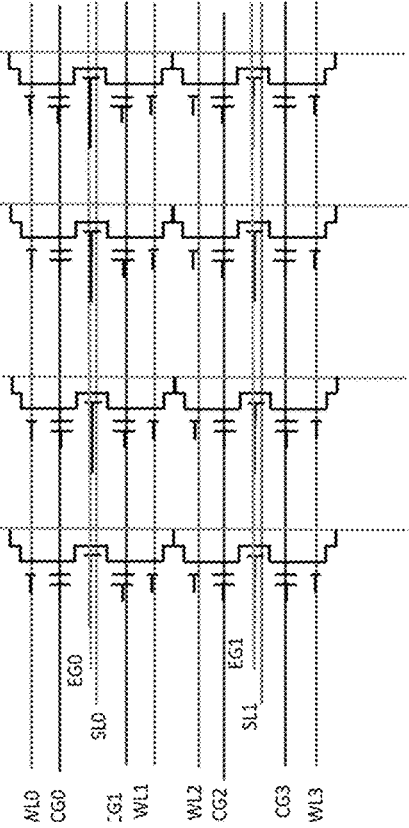
Figure 25:
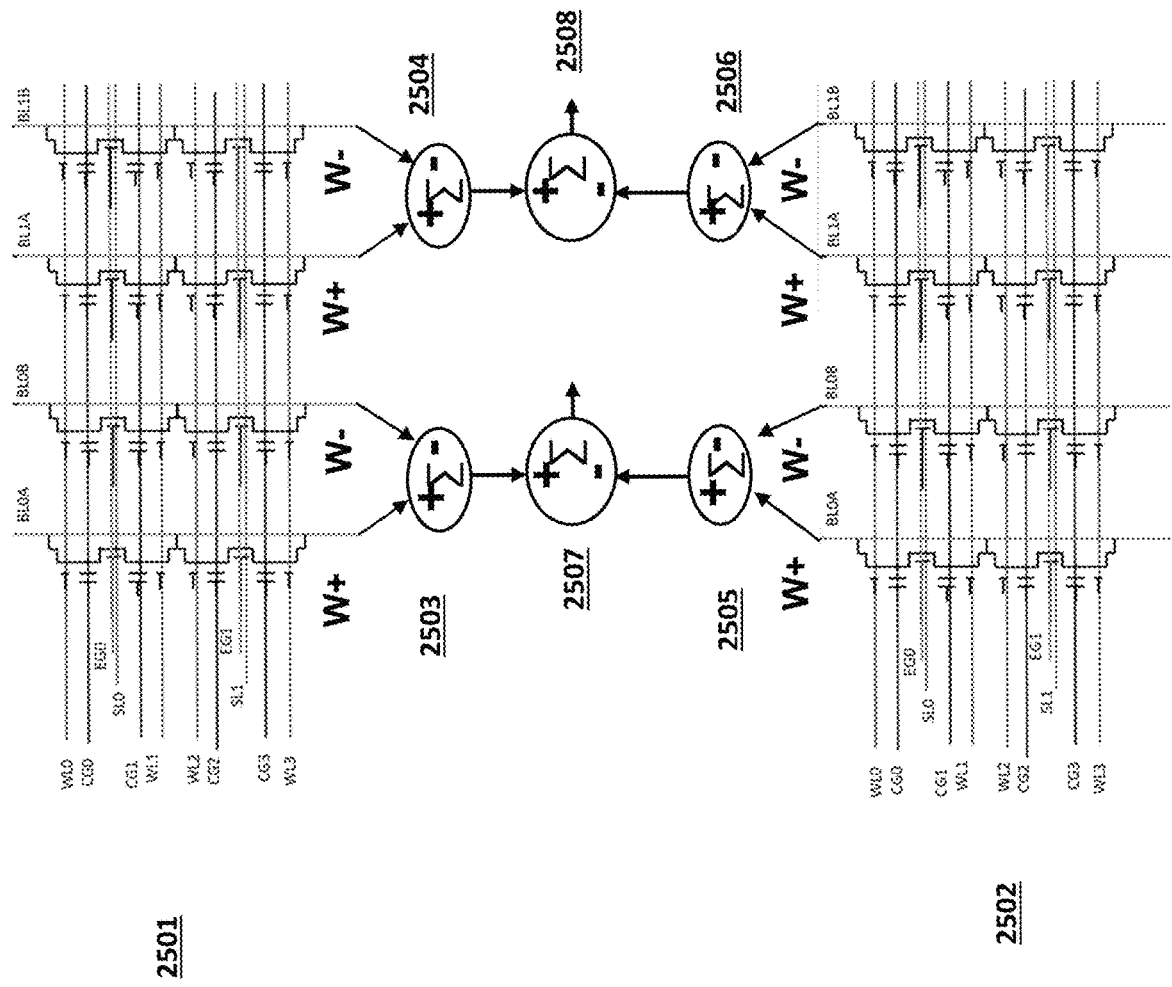
FIG. 25 depicts another example of a VMM system.
Figure 26:
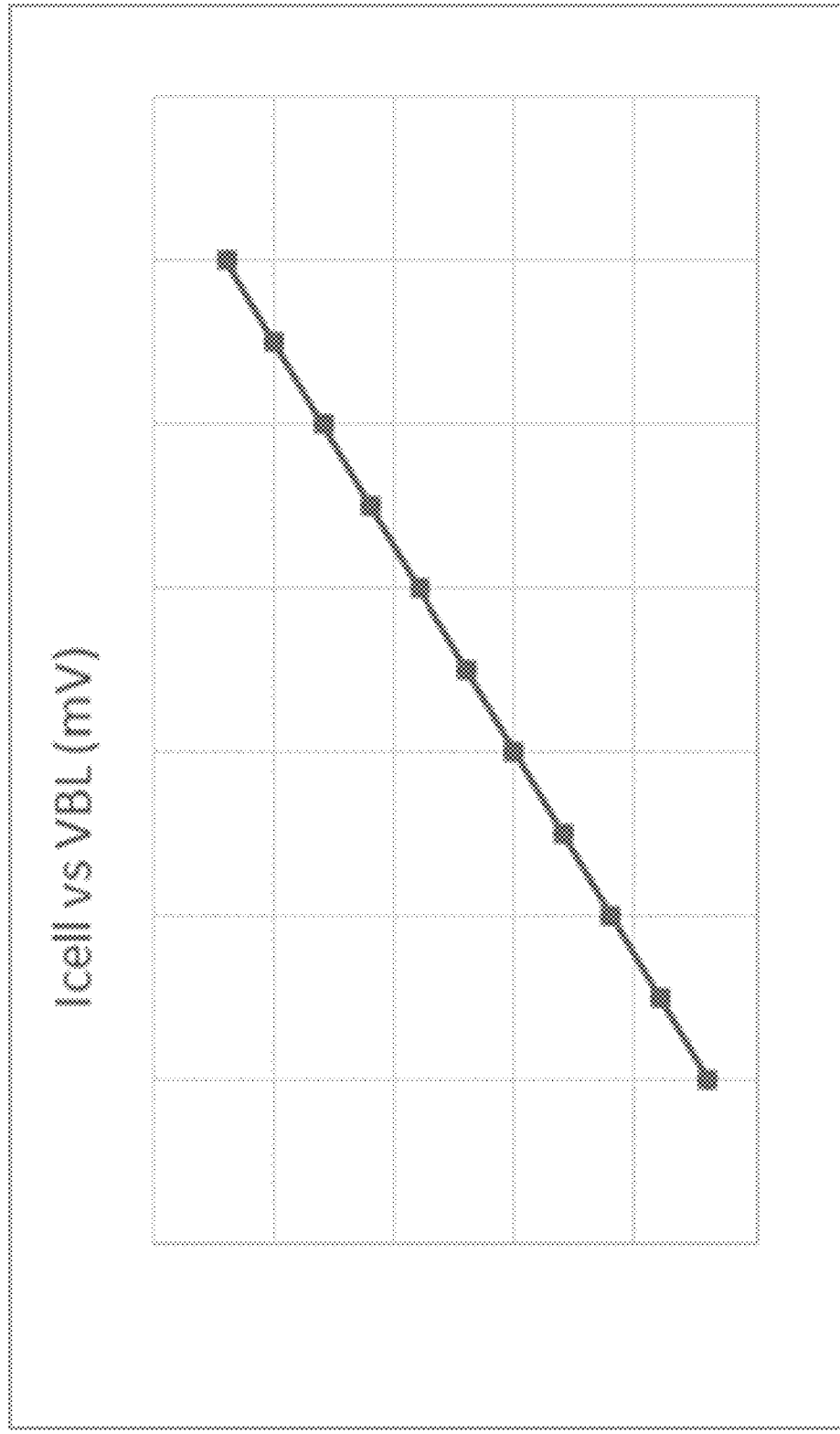
FIG. 26 depicts changes in voltage of a prior art bitline as bitline current changes.

Common mode circuit 3713 is decoupled from bitlines BL+ and BL−, specifically, by NMOS transistors 3711 and 3712 (which may be called bitline regulating transistors or bitline isolation transistors). Common mode circuit 3713 will cause the voltages provided to the inverting and non-inverting inputs of operational amplifier 3714 to be equal. By contrast, without BL+ regulation circuit 3720A, BL− regulation circuit 3720B, and common mode circuit 3713, the voltages on the lines carrying BL+ and BL− would change as the current through each line changes based on the values in the attached memory cells, as shown in the characterization shown in FIG. 26. The use of BL+ regulation circuit 3720A, BL− regulation circuit 3720B, and common mode circuit 3713 results in greater precision in the generation of voltages V+ and V− from the currents BL+ and BL−. It also decreases the asymmetry that would otherwise be present between a verify operation (where one or a handful of memory cells draw current) and a neural read operation (where many, or all, memory cells may draw current).

Figure 38:
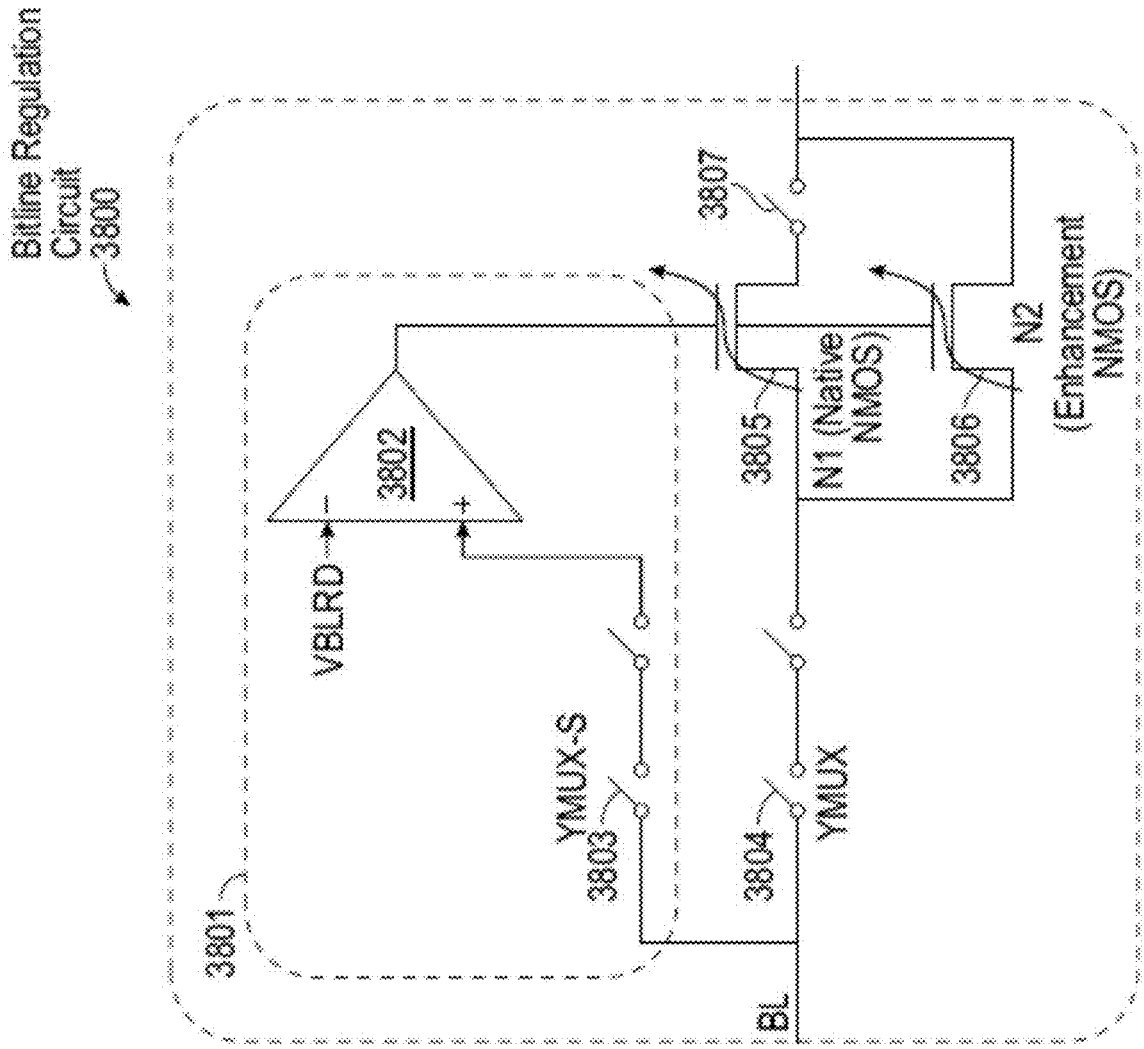
FIG. 38 depicts a bitline regulation circuit.

FIG. 38 depicts BL regulation circuit 3800, which can be used as an alternative to one or more of BL regulation circuit 3720A and BL regulation circuit 3970B in FIG. 37. BL regulation circuit 3800 comprises regulator 3801, switches 3804, native NMOS transistor 3805, enhancement mode NMOS transistor 3806, and switch 3807. Regulator 3801 comprises switches 3803 and operational amplifier 3802 (which is an example of a regulating circuit). Switches 3804 and 3803 are portions of a column multiplexor that selects this particular bitline. Specifically, the column multiplexor selects this bitline by closing switches 3804 and 3803. The native NMOS transistor 3805 and enhancement mode NMOS transistor 3806 are enabled by the output of operation amplifier 3802 and are used for different current ranges on the bitline. For example, enhancement mode NMOS transistor 3806 can be used for low current levels in the nA range such as during a verify operation to limit the leakage, and the native NMOS transistor 3805 can be used for high current level in the uA range such as during a neural read operation (where many rows in the VMM are enabled).

Figure 39:
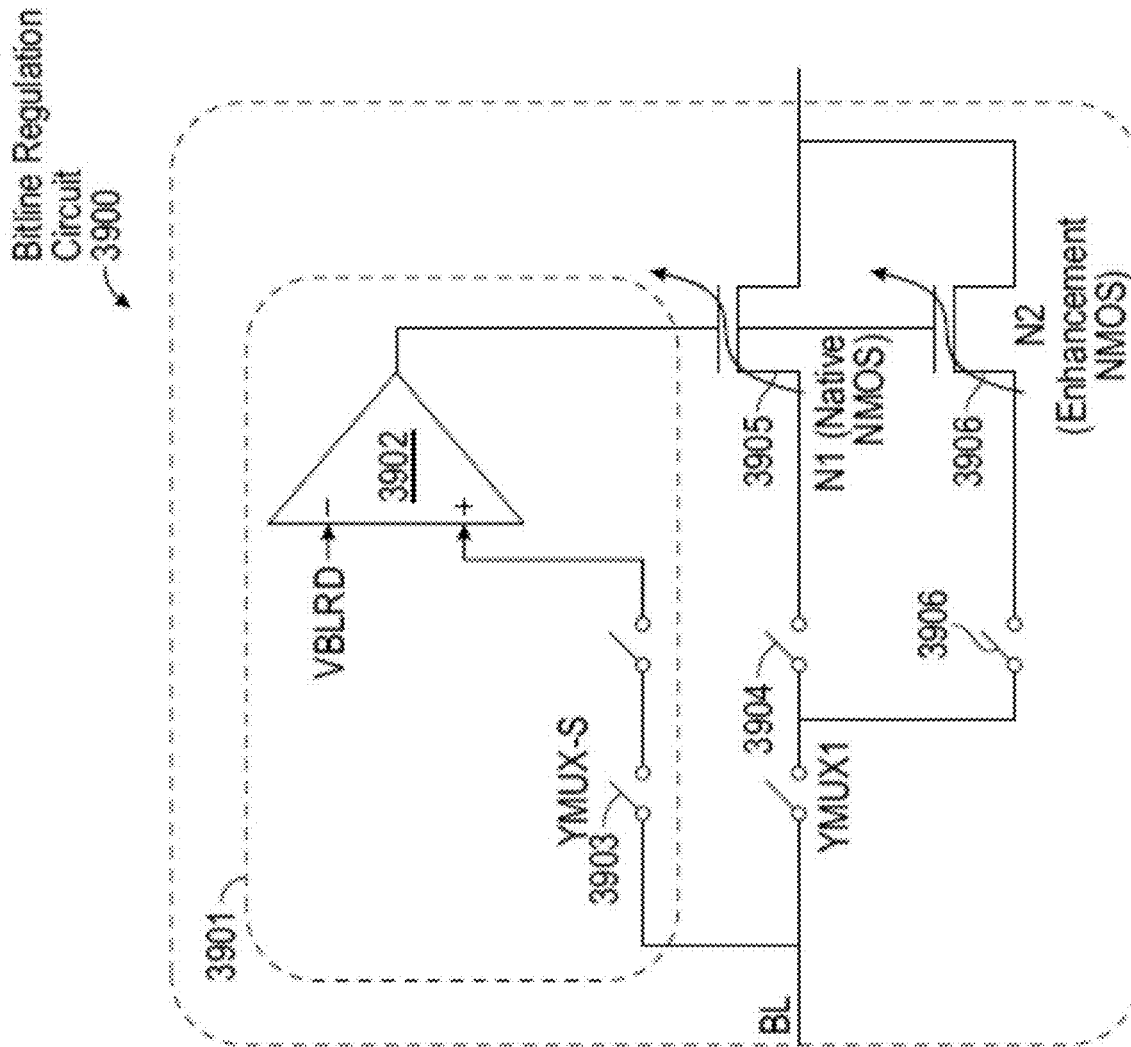
FIG. 39 depicts a bitline regulation circuit.

FIG. 39 depicts BL regulation circuit 3900, which can be used as an alternative to one or more of BL regulation circuit 3720A and BL regulation circuit 3970B in FIG. 37. BL regulation circuit 3900 comprises regulator 3901, switches 3904, native NMOS transistor 3905, enhancement mode NMOS 3906, and switch 3907. Regulator 3901 comprises switches 3903 and operational amplifier 3902 (which is an example of a regulating circuit). Switches 3904 and 3903 are portions of a column multiplexor that selects this particular bitline. Specifically, the column multiplexor selects this bitline by closing switches 3904 and 3903. The native NMOS transistor 3905 and enhancement mode NMOS transistor 3906 are enabled by the output of operation amplifier 3902 and are used for different current ranges on the bitline. For example, enhancement mode NMOS transistor 3906 can be used for low current levels in the nA range such as during a verify operation to limit the leakage, and the native NMOS transistor 3905 can be used for high current level in the uA range such as during a neural read operation (where many rows in the VMM are enabled).

Figure 40:
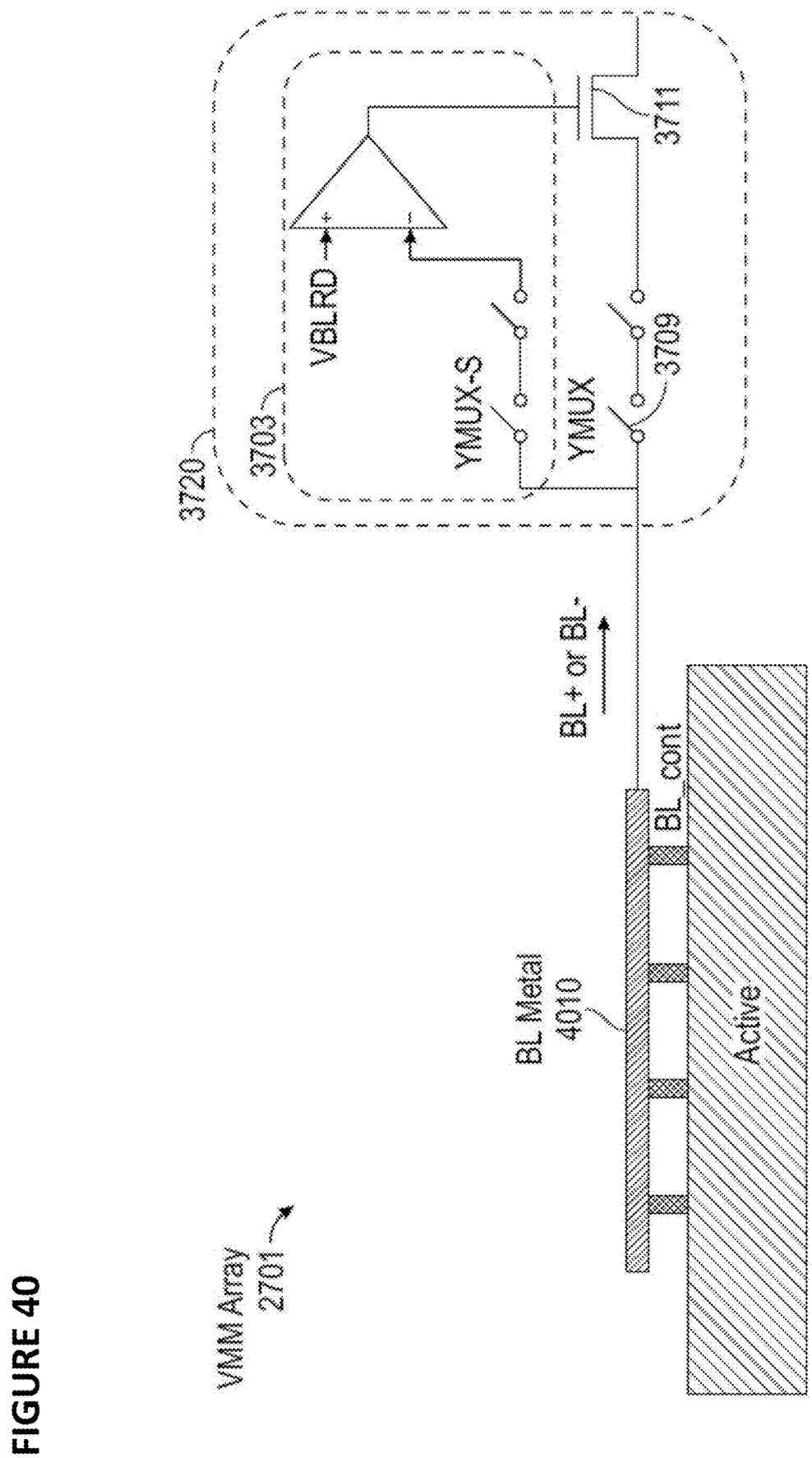
FIG. 40 depicts a bitline metal layer coupled to a current-to-voltage converter.

FIG. 40 depicts details regarding how the previous examples connect to bitlines in VMM array 2701. Here, a bitline metal layer 4010 in VMM array 2701 provides either BL+ or BL− to regulator 3703, switches 3709 and NMOS transistor 3711 shown in FIG. 37.

Figure 41:
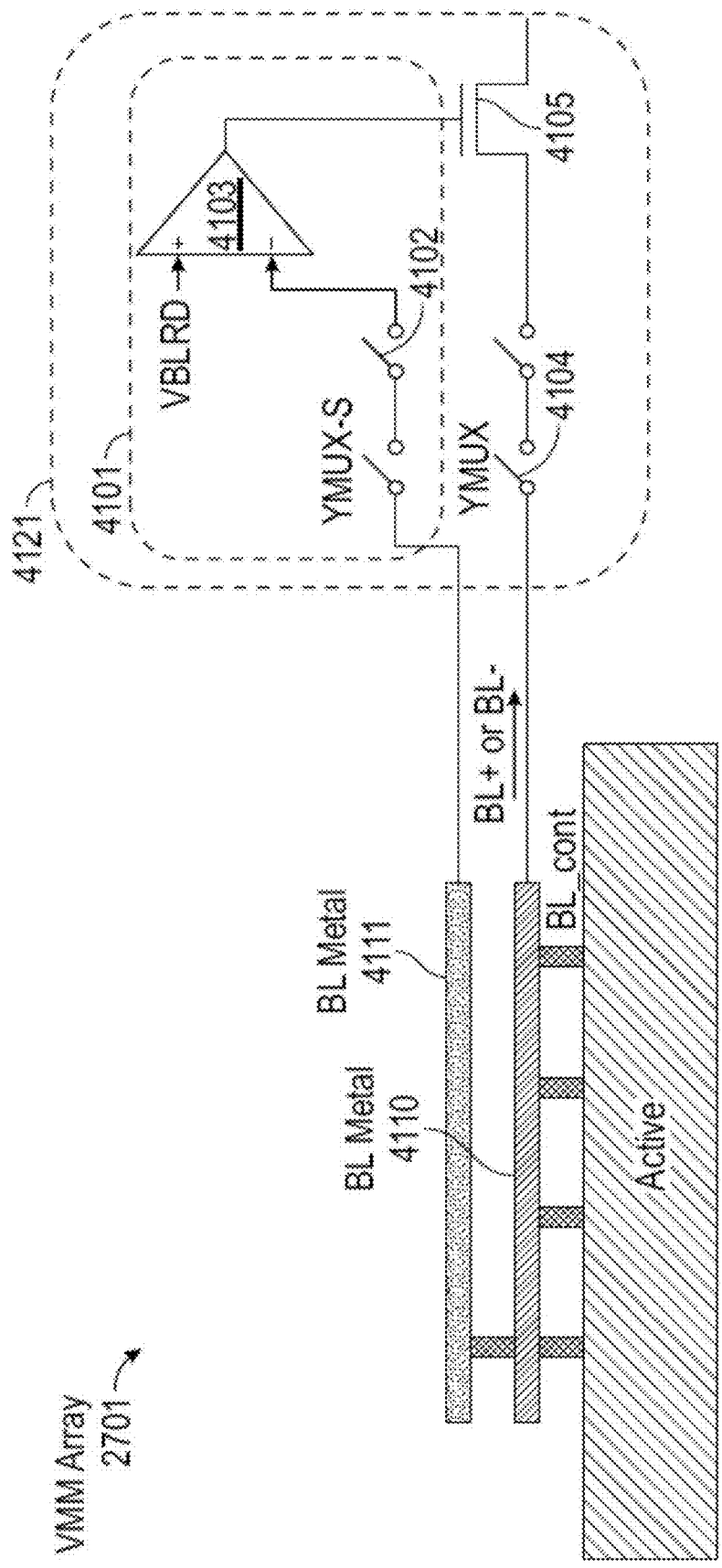
FIG. 41 depicts bitline metal layers coupled to a current-to-voltage converter.

FIG. 41 depicts details regarding a variation on how VMM array 2701 can be connected to the previous examples. Here a bitline sensing metal line 4111 carries no current due to the high input impedance of operational amplifier 4103 (which is an example of a regulating circuit) and is provided to accomplish precise bitline regulation. A bottom bitline metal layer 4110 (which is coupled to top bitline metal layer) provides current BL+ or BL− from the selected cell through switches 4104 to NMOS transistor 4105. Here, regulator 4101 (which comprises operational amplifier 4103 and switches 4102), switches 4104 and NMOS transistor 4105 are substituted for regulator 3703, switches 3709, and NMOS transistor 3711 in FIG. 37. Similar components are connected to BL− in FIG. 37.

Figure 42:
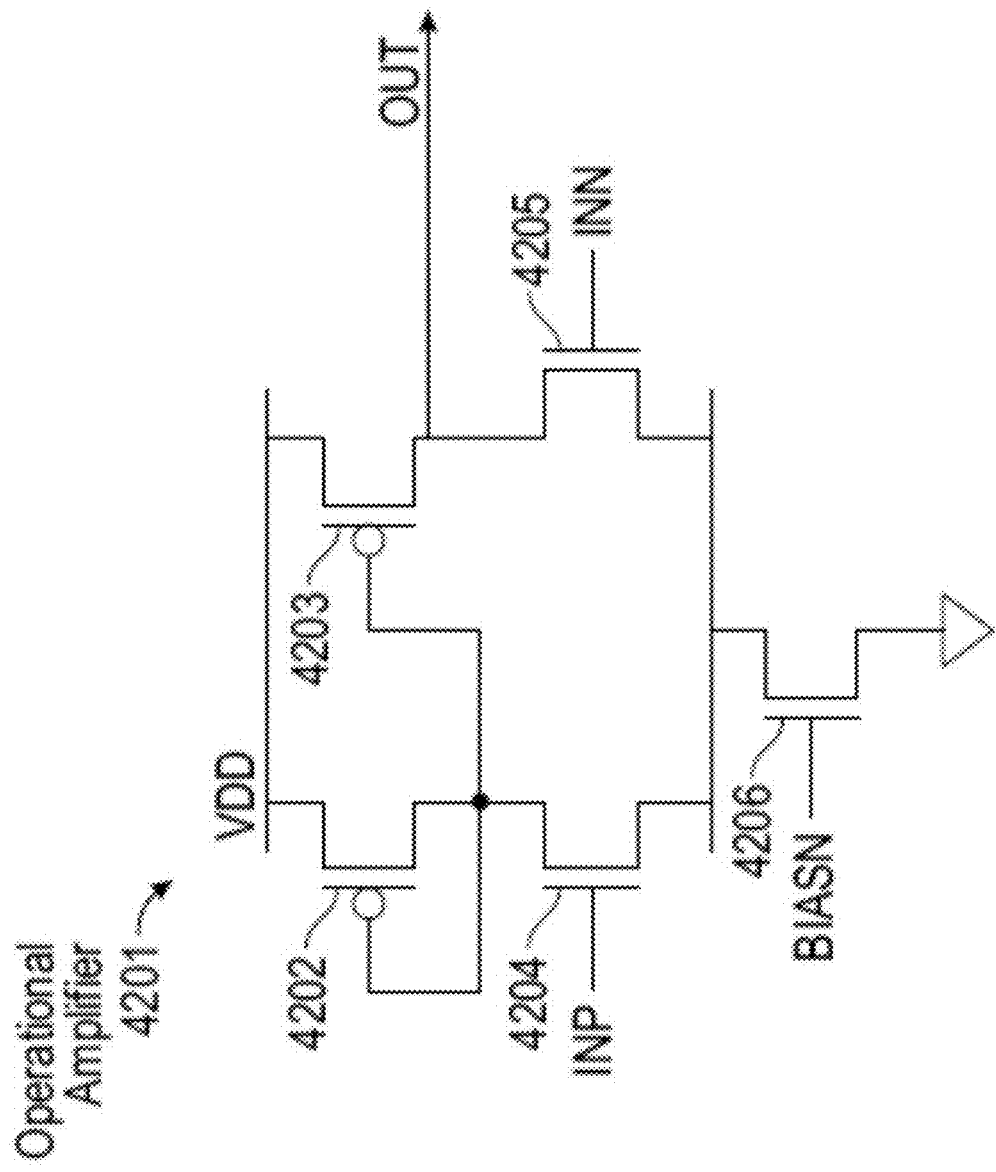
FIG. 42 depicts an operational amplifier.

FIG. 42 discloses operational amplifier 4201 (which is an example of a regulating circuit), which is an example of an operational amplifier that can be used for operational amplifiers 3705, 3707, and 3714 in FIG. 37, operational amplifiers 3802 and 3902 in FIGS. 38 and 39, and operational amplifier 4103 in FIG. 41. Operational amplifier 4201 comprises PMOS transistors 4202 and 4203 and NMOS transistors 4204, 4205, and 4206. The non-inverting input of operational amplifier 4201 is INP, the inverting input is INN, and the output is OUT.

Figure 43:
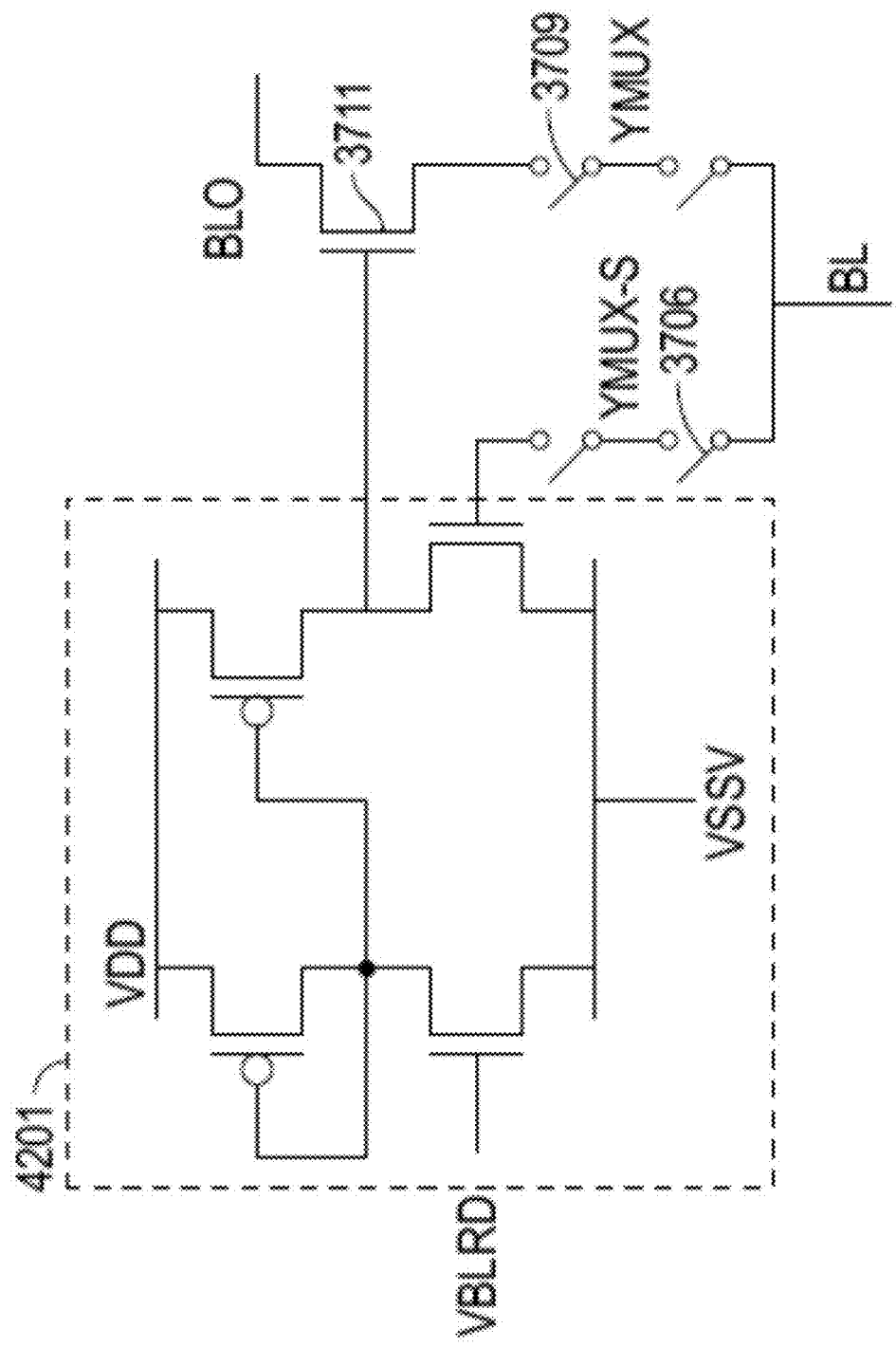
FIG. 43 depicts a portion of a current-to-voltage converter comprising an operational amplifier.

FIG. 43 discloses an example of how operational amplifier 4201 (which is an example of a regulating circuit) can be used in FIG. 37, here shown connecting to switches 3706 (sensing mux) and 3709 (current carrying mux) and transistor 3711 (BL regulating transistor) from FIG. 37.

Figure 44:
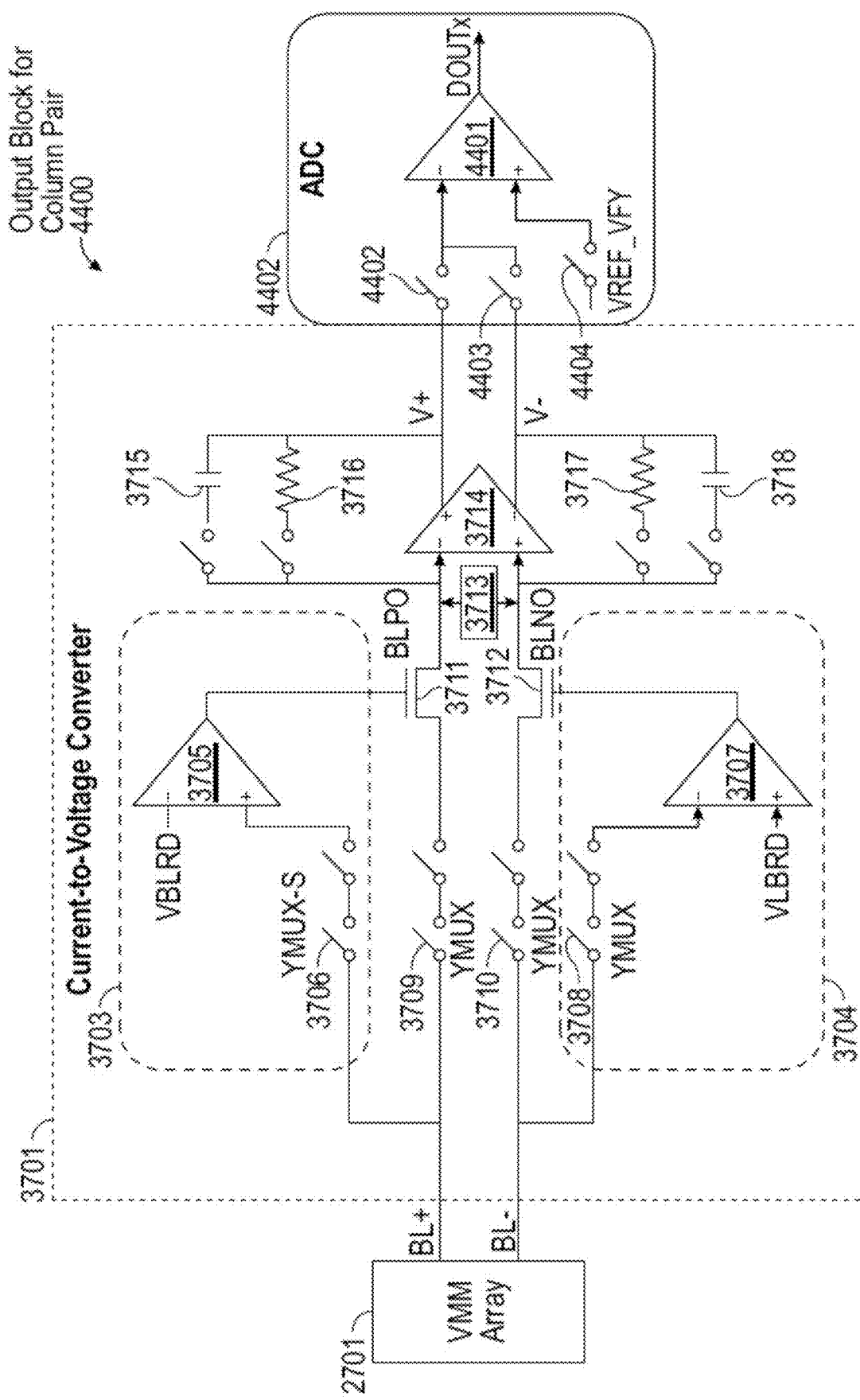
FIG. 44 depicts an output block.

FIG. 44 depicts an example output block for column pair 4400 that can be used during a verify operation or a read neural operation. Only one output block for column pair 4400 is shown, but it is to be understood that an instantiation of output block for column pair 4400 would be used for each pair of columns in VMM array 2701. Output block for column pair 4400 comprises current-to-voltage converter 3701 and analog-to-digital converter 3702, which was already described with reference to FIG. 37 and will not be described again here. Output block for column pair 4400 further comprises ADC 4402, which comprises comparator 4401 and switches 4403, 4404, and 4405. ADC 3702 is used for read neural operations, and ADC 4402 is used for verify operations. Optionally, ADC 3702 and ADC 4402 could share common components, such as comparator 4401, to save die space.

During a read neural operation, output block for column pair 4400 receives current BL+ from one column and current BL− from another column in VMM array 2701 and generates DOUTx, a digital output, from ADC 3702. Regulator 3703 (a first regulator) provides a first input to regulating circuit 3714 and regulating circuit 3704 (a second regulator) provides a second input to regulating circuit 3714.

During a verify operation of one or more cells coupled to BL+, regulator 3703 (a first regulator) provides a first input to regulating circuit 3714 and switch 4403 is closed and switch 4404 opened so that comparator 4401 compares V+ against VREF_VFY, which is the reference voltage against which verification is performed, with the output VER_OUT from ADC 4402 indicates if the verify operation is successful or not. During a verify operation of one or more cells coupled to BL−, regulator 3704 (a second regulator) provides a second input to regulating circuit 3714 and switch 4403 is opened and switch 4404 is closed so that comparator 4401 compares V− against VREF_VFY, with VER_OUT indicating if the verify operation was successful or not.

In this manner, any offset of the regulating circuit 3705 or 3707 are replicated during a verify operation to be the same as in a neural read operation for BL+ and BL− respectively. Various systems and methods for verification are disclosed in U.S. patent application Ser. No. 18/080,545, filed on Dec. 13, 2022, and titled, "Verification Method and System in Artificial Neural Network Array," which is incorporated by reference herein.

Figure 45:
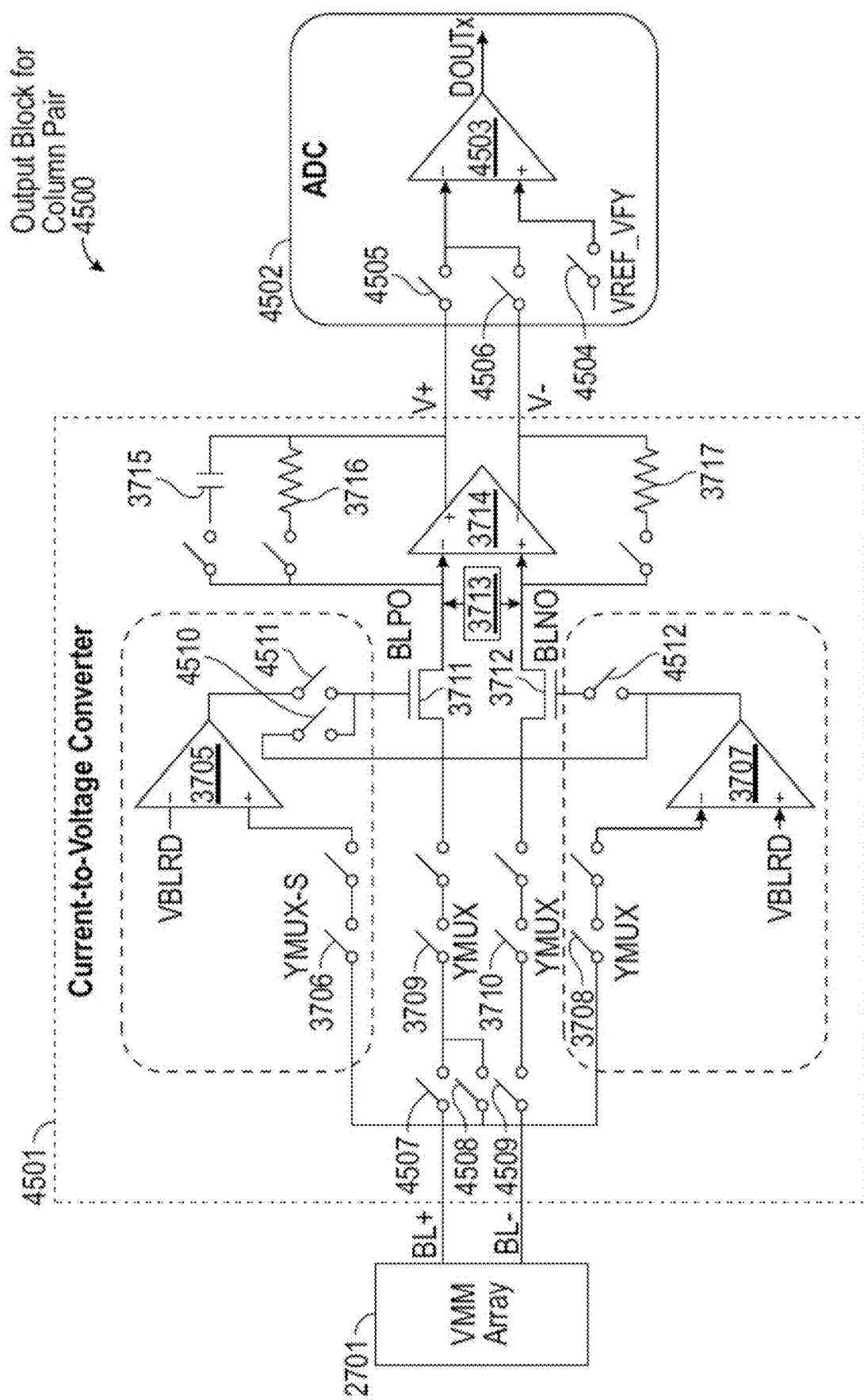
FIG. 45 depicts an output block.

FIG. 45 depicts an example output block for column pair 4500 that is used during a verify operation. Only one output block for column pair 4500 is shown, but it is to be understood that an instantiation of output block for column pair 4500 would be used for each pair of columns in VMM array 2701. Output block for column pair 4500 receives current BLW+ (a first current) from one column and current BLW− (a second current) from another column in VMM array 2701 and generates DOUTx, a digital output. Output block for column pair 4500 comprises current-to-voltage converter 4501, ADC 3702 (as described with reference to FIG. 37), and ADC 4502. Current-to-voltage converter 4501 comprises many of the same components as current-to-voltage converter 3701. Those components have the same function as in current-to-voltage converter 3701 and will not be describe again for efficiency's sake. Current-to-voltage converter 4501 further comprises switches 4507, 4508, 4509, 4510, 4511, and 4512. ADC 3702 is used during a read neural operation, and ADC 4502 is used during a verify operation. ADC 4502 comprises comparator 4503 and switch 4504. Optionally, ADC 3702 and ADC 4502 could share common components, such as comparator 4503, to save die space. Alternatively, ADC 3702 in FIG. 44 or 45 can be used for a verify operation. In this case, the digital output bits, DOUTx, of ADC 3702 is used as a verify target.

During a read neural operation, output block for column pair 4500 receives current BL+ from one column and current BL− from another column in VMM array 2701 and generates DOUTx, a digital output, from ADC 3702. Regulator 4521 (a first regulator) provides a first input to regulating circuit 3714 and regulator 4522 (a second regulator) provides a second input to regulating circuit 3714.

During a verify operation of one or more cells coupled to BL+, regulator 4521 (a first regulator) provides a first input to regulating circuit 3714 and switches 4504, 4505, 4507, 4508, and 4511, and 4512 are closed, and switches 4506, 4509, and 4510 are opened so that comparator 4503 compares V+ against VREF_VFY, which is the reference voltage against which verification is performed, with the output VER_OUT from ADC 4502 indicates if the verify operation is successful or not.

During a verify operation of one or more cells coupled to BL−, regulator 4522 (a second regulator) provides a second input to regulating circuit 3714 and switches 4504, 4506, 4508, 4509, 4510, and 4512 are closed and switches 4505, 4507, and 4511 are opened so that comparator 4503 compares V− against VREF_VFY, with VER_OUT indicating if the verify operation was successful or not.

It should be noted that, as used herein, the terms "over" and "on" both inclusively include "directly on" (no intermediate materials, elements or space disposed therebetween) and "indirectly on" (intermediate materials, elements or space disposed therebetween). Likewise, the term "adjacent" includes "directly adjacent" (no intermediate materials, elements or space disposed therebetween) and "indirectly adjacent" (intermediate materials, elements or space disposed there between), "mounted to" includes "directly mounted to" (no intermediate materials, elements or space disposed there between) and "indirectly mounted to" (intermediate materials, elements or spaced disposed there between), and "electrically coupled" includes "directly electrically coupled to" (no intermediate materials or elements there between that electrically connect the elements together) and "indirectly electrically coupled to" (intermediate materials or elements there between that electrically connect the elements together). For example, forming an element "over a substrate" can include forming the element directly on the substrate with no intermediate materials/elements therebetween, as well as forming the element indirectly on the substrate with one or more intermediate materials/elements there between.

What is claimed is:

1. A system comprising:
   a current-to-voltage converter to generate differential voltages from differential currents comprising a first current and a second current, the current-to-voltage converter comprising:
   a first bitline to provide the first current;
   a second bitline to provide the second current;
   a first regulator to apply a first voltage to the first bitline;
   a second regulator to apply a second voltage to the second bitline;
   a regulating circuit comprising a first input terminal, a second input terminal, a first output terminal, and a second output terminal, the first output terminal and the second output terminal providing the differential voltages; and
   a common mode circuit comprising a first terminal coupled to the first bitline and the first input terminal of the regulating circuit and a second terminal coupled to the second bitline and the second input terminal of the regulating circuit, wherein the common mode circuit maintains a same voltage on the first terminal and the second terminal.

2. The system of claim 1 comprising:
   an analog-to-digital converter to convert the generated differential voltages into a digital output.

3. The system of claim 1, wherein the regulating circuit is an operational amplifier.

4. The system of claim 3, comprising:
   a first resistor coupled between the first input terminal of the operational amplifier and the first output terminal of the operational amplifier; and
   a second resistor coupled between the second input terminal of the operational amplifier and the second output terminal of the operational amplifier.

5. The system of claim 4, wherein the first resistor is a fixed resistor and the second resistor is a fixed resistor.

6. The system of claim 4, wherein the first resistor is a first variable resistor and the second resistor is a second variable resistor.

7. The system of claim 4, comprising:
   a first capacitor coupled between the first input terminal of the operational amplifier and the first output terminal of the operational amplifier; and
   a second capacitor coupled between the second input terminal of the operational amplifier and the second output terminal of the operational amplifier.

8. The system of claim 7, wherein the first capacitor is a first fixed capacitor and the second capacitor is a second fixed capacitor.

9. The system of claim 7, wherein the first capacitor is a first variable capacitor and the second capacitor is a second variable capacitor.

10. The system of claim 3, comprising:
    a first capacitor coupled between the first input terminal of the operational amplifier and the first output terminal of the operational amplifier; and
    a second capacitor coupled between the second input terminal of the operational amplifier and the second output terminal of the operational amplifier.

11. The system of claim 10, wherein the first capacitor is a first fixed capacitor and the second capacitor is a second fixed capacitor.

12. The system of claim 10, wherein the first capacitor is a first variable capacitor and the second capacitor is a second variable capacitor.

13. The system of claim 1, wherein the common mode circuit comprises a first current source to receive a bias voltage and a second current source to receive the bias voltage.

14. The system of claim 1, wherein the common mode circuit comprises a first variable resistor and a second variable resistor, the first variable resistor and the second variable resistor to receive a bias voltage.

15. The system of claim 1, wherein the common mode circuit comprises a first PMOS transistor and a second PMOS transistor, the first PMOS transistor and the second PMOS transistor to receive a bias voltage.

16. The system of claim 1, wherein the common mode circuit comprises a first NMOS transistor and a second NMOS transistor, the first NMOS transistor and the second NMOS transistor to receive a bias voltage.

17. The system of claim 1, wherein the common mode circuit comprises a first capacitor and a second capacitor, the first capacitor and the second capacitor to receive a bias voltage.

* * * * *